United States Patent
Park et al.

(10) Patent No.: US 12,520,383 B2
(45) Date of Patent: *Jan. 6, 2026

(54) BASE STATION BACKHAUL LINK INFORMATION

(71) Applicant: Ofinno, LLC, Reston, VA (US)

(72) Inventors: Kyungmin Park, Vienna, VA (US); Esmael Hejazi Dinan, McLean, VA (US); Hua Zhou, Vienna, VA (US); Ali Cagatay Cirik, Chantilly, VA (US); Hyoungsuk Jeon, Centreville, VA (US); Alireza Babaei, Fairfax, VA (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/384,588

(22) Filed: Oct. 27, 2023

(65) Prior Publication Data

US 2024/0064595 A1 Feb. 22, 2024

Related U.S. Application Data

(63) Continuation of application No. 17/747,650, filed on May 18, 2022, now Pat. No. 11,818,618, which is a
(Continued)

(51) Int. Cl.
*H04W 88/14* (2009.01)
*H04W 24/10* (2009.01)
(Continued)

(52) U.S. Cl.
CPC .......... *H04W 88/14* (2013.01); *H04W 24/10* (2013.01); *H04W 76/11* (2018.02); *H04W 76/27* (2018.02);
(Continued)

(58) Field of Classification Search
CPC ..... H04W 88/14; H04W 24/10; H04W 76/11; H04W 76/27; H04W 80/02; H04W 80/08; H04W 36/085; H04W 36/0055
See application file for complete search history.

(56) References Cited

U.S. PATENT DOCUMENTS

| 10,701,621 B2 | 6/2020 | Wang |
| 2013/0196666 A1 | 8/2013 | Zhang et al. |

(Continued)

FOREIGN PATENT DOCUMENTS

WO 2019/142175 A1 7/2019

OTHER PUBLICATIONS

R1-1813975; 3GPP TSG RAN WG1 Meeting #95; Spokane, USA, Nov. 12-16, 2018; Agenda Item: 7.2.3.1; Source: AT&T; Title: Summary of 7.2.3.1 Enhancements to support NR backhaul links; Document for: Discussion/Approval.
(Continued)

*Primary Examiner* — Will W Lin
(74) *Attorney, Agent, or Firm* — Matthew Fernandez; Kavon Nasabzadeh; Jacob L. Mangan

(57) ABSTRACT

A second access node sends, to a first access node, at least one message comprising: an identifier indicating a first cell of a third access node, wherein the second access node communicates with the third access node via a parent node of the third access node; and at least one parameter indicating that the second cell is of the parent node of the third access node, wherein the at least one parameter comprises an identifier indicating a second cell. The second access node receives, from the first access node, a message requesting a handover of a wireless device to the first cell.

20 Claims, 43 Drawing Sheets

Related U.S. Application Data continuation of application No. 16/783,752, filed on Feb. 6, 2020, now Pat. No. 11,343,737.

(60) Provisional application No. 62/801,851, filed on Feb. 6, 2019.

(51) Int. Cl.
*H04W 76/11* (2018.01)
*H04W 76/27* (2018.01)
*H04W 80/02* (2009.01)
*H04W 80/08* (2009.01)
*H04W 36/08* (2009.01)

(52) U.S. Cl.
CPC ........... *H04W 80/02* (2013.01); *H04W 80/08* (2013.01); *H04W 36/085* (2023.05)

(56) References Cited

U.S. PATENT DOCUMENTS

| | | | |
|---|---|---|---|
| 2013/0303081 A1 | 11/2013 | Chang et al. | |
| 2016/0157147 A1* | 6/2016 | Saghir | H04W 36/0072 |
| | | | 455/444 |
| 2016/0262059 A1* | 9/2016 | Butala | H04W 36/0033 |
| 2018/0027455 A1 | 1/2018 | Lei et al. | |
| 2018/0192412 A1 | 7/2018 | Novlan et al. | |
| 2019/0159277 A1 | 5/2019 | Zhu et al. | |
| 2020/0092939 A1 | 3/2020 | Kim et al. | |
| 2020/0145860 A1 | 5/2020 | Koskela et al. | |
| 2020/0221329 A1 | 7/2020 | Kim | |
| 2020/0337115 A1 | 10/2020 | Qin et al. | |
| 2021/0195539 A1 | 6/2021 | Sheng et al. | |
| 2021/0235332 A1 | 7/2021 | Schmidt et al. | |
| 2021/0297895 A1 | 9/2021 | Lee et al. | |
| 2021/0321315 A1 | 10/2021 | Yi et al. | |
| 2021/0360496 A1* | 11/2021 | Ishii | H04W 36/362 |
| 2021/0377784 A1* | 12/2021 | Marco | H04L 47/12 |
| 2022/0053365 A1 | 2/2022 | Wu et al. | |
| 2022/0110179 A1* | 4/2022 | Sheng | B65D 5/4204 |

OTHER PUBLICATIONS

R1-1814060; 3GPP TSG RAN WG1 Meeting #95; Spokane, USA, Nov. 12-16, 2018; Agenda item: 7.2.3.2; Source: Samsung; Title: Evaluation Results for NR IAB; Document for: Discussion and Decision.

R1-1814090; 3GPP TSG-RAN WG1 Meeting #95; Spokane, U.S., Nov. 12-16, 2018; Agenda Item: 7.2.3.3; Source: Ericsson; Title: IAB resource allocation and multiplexing (revision of R1-1813566); Document for: Discussion.

R1-1814091; 3GPP TSG-RAN WG1 Meeting #95; Spokane, US, Nov. 12-16, 2018; Agenda Item: 7.2.3.1; Source: Ericsson; Title: IAB-Physical layer enhancements (revision of R1-1813572); Document for: Discussion and decision.

R1-1814127; 3GPP TSG RAN WG1 Meeting #95; Spokane, USA, Nov. 12-16, 2018; Agenda Item: 7.2.3.1; Source: AT&T; Title: Summary of 7.2.3.1 Enhancements to support NR backhaul links; Document for: Discussion/Approval.

R1-1814154; 3GPP TSG-RAN WG1 Meeting #95; Spokane, US, Nov. 12 - 16, 2018; Agenda Item: 7.2.3.3; Source: Ericsson; Title: Timing of IAB-node transmissions, revision of R1-1813568; Document for: Discussion and decision.

R1-1814190; 3GPP TSG RAN WG1 Meeting #95; Spokane, USA, Nov. 12-16, 2018; Agenda Item: 7.2.3; Source: AT&T; Title: TP for 38.874 on PHY Enhancements for NR IAB; Document for: Discussion/Approval.

R2-1817072; (Resubmission of R2-1814733); 3GPP TSG RAN WG2 Meeting #104; Spokane, USA, Nov. 12-16, 2018; Agenda Item: 11.1.2; Source: Sony; Title: Resource allocation in IAB; Document for: Discussion.

R2-1817617; 3GPP TSG RAN WG2 Meeting #104; Spokane, USA, Nov. 12-16, 2018; Agenda item: 11.1.3; Source: Nokia, Nokia Shanghai Bell; Title: Resource allocation and coordination for IAB; WID/SID: FS_NR_IAB; Document for: Discussion and Decision.

3GPP TR 38.874 1.0.0 (Dec. 2018); Technical Report; 3rd Generation Partnership Project; Technical Specification Group Radio Access Network; Study on Integrated Access and Backhaul; (Release 15).

R1-1812198; 3GPP TSG RAN WG1 Meeting #95; Spokane, USA, Nov. 12-16, 2018; Agenda Item: 7.2.3.1; Source: Huawei, HiSilicon; Title: Physical layer design for NR IAB; Document for: Discussion and Decision.

R1-1812199; 3GPP TSG RAN WG1 Meeting #95; Spokane, USA, Nov. 12-16, 2018; Agenda Item: 7.2.3.2; Source: Huawei, HiSilicon; Title: System performance evaluation in multi-hop IAB network; Document for: Discussion and Decision.

R1-1812200; 3GPP TSG RAN WG1 Meeting #95; Spokane, USA, Nov. 12-16, 2018; Agenda Item: 7.2.3.3; Source: Huawei, HiSilicon; Title: On frame structure in IAB; Document for: Discussion and Decision.

R1-1812201; 3GPP TSG RAN WG1 Meeting #95; Spokane, USA, Nov. 12-16, 2018; Agenda Item: 7.2.3.3; Source: Huawei, HiSilicon; Title: On resource coordination and dynamic scheduling in IAB; Document for: Discussion and decision.

R1-1812202; 3GPP TSG RAN WG1 Meeting #95; Spokane, USA, Nov. 12-16, 2018; Agenda Item: 7.2.3.3; Source: Huawei, HiSilicon; Title: On IAB node synchronization and timing alignment; Document for: Discussion and Decision.

R1-1812203; 3GPP TSG RAN WG1 Meeting #95; Spokane, USA, Nov. 12-16, 2018; Agenda Item: 7.2.3.3; Source: Huawei, HiSilicon; Title: Consideration on cross-link interference in IAB; Document for: Discussion and Decision.

R1-1812204; 3GPP TSG RAN WG1 Meeting #95; Spokane, USA, Nov. 12-16, 2018; Agenda Item: 7.2.3.3; Source: Huawei, HiSilicon; Title: On high order modulation in IAB; Document for: Discussion and decision.

R1-1812305; 3GPP TSG RAN WG1 Meeting #95; Spokane, USA, Nov. 12-16, 2018; Source: vivo; Title: Enhancements to support NR backhaul link; Agenda Item: 7.2.3.1; Document for: Discussion and Decision.

R1-1812486; 3GPP TSG RAN WG1 #95; Nov. 12-Nov. 16, 2018; Spokane, USA; Agenda item: 7.2.3.1; Source: Intel Corporation; Title: PHY layer enhancements for NR IAB; Document for: Discussion and decision.

R1-1812487; 3GPP TSG RAN WG1 #95; Nov. 12-Nov. 16, 2018; Spokane, USA; Agenda item: 7.2.3.2; Source: Intel Corporation; Title: Evaluation methodology and results on NR IAB; Document for: Discussion and decision.

R1-1812564; 3GPP TSG RAN WG1 Meeting #95; Spokane, USA, Nov. 12-16, 2018; Agenda Item: 7.2.3.1; Source: LG Electronics; Title: Discussions on mechanisms to support NR IAB scenarios; Document for: Discussion and decision.

R1-1812565; 3GPP TSG RAN WG1 Meeting #95; Spokane, USA, Nov. 12-16, 2018; Agenda Item: 7.2.3.3; Source: LG Electronics; Title: Discussions on detection and measurement among IAB nodes; Document for: Discussion and decision.

R1-1812566; 3GPP TSG RAN WG1 Meeting #95; Spokane, US, Nov. 12-16, 2018; Agenda Item: 7.2.3.3; Source: LG Electronics; Title: Discussions on access and backhaul link multiplexing and timing; Document for: Discussion and decision.

R1-1812567; 3GPP TSG RAN WG1 #95; Spokane, US Nov. 12-16, 2018; Agenda Item: 7.2.3.3; Source: LG Electronics; Title: Discussions on node behavior for IAB link management; Document for: Discussion and decision.

R1-1812568; 3GPP TSG RAN WG1 Meeting #95; Spokane, USA, Nov. 12-16, 2018; Agenda Item: 7.2.3.3; Source: LG Electronics; Title: Power control in IAB scenario; Document for: Discussion and decision.

R1-1812647; 3GPP TSG RAN WG1 Meeting #95; Spokane, US, Nov. 12-16, 2018; Agenda item: 7.2.3.1; Source: NEC; Title: Discussion on IAB; Document for: Discussion and Decision.

(56) References Cited

OTHER PUBLICATIONS

R1-1812675; 3GPP TSG RAN WG1 Meeting #95; Spokane, USA, Nov. 12-16, 2018; Agenda Item: 7.2.3.3; Source: Huawei, HiSilicon; Title: Text Proposal for sections 7 of TR 38.874; Document for: Discussion and decision.
R1-1812700; 3GPP TSG RAN WG1 Meeting #95; Spokane, WA, USA, Nov. 12-16, 2018; Agenda item: 7.2.3.1; Source: Nokia, Nokia Shanghai Bell; Title: NR enhancements to support IAB; Document for: Discussion and Decision.
R1-1812701; 3GPP TSG RAN WG1 Meeting #95; Spokane, USA, Nov. 12-16, 2018; Agenda item: 7.2.3.2; Source: Nokia, Nokia Shanghai Bell; Title: Evaluation of IAB; Document for: Discussion and Decision.
R1-1812702; 3GPP TSG RAN WG1 Meeting #95; Spokane, USA, Nov. 12-16, 2018; Agenda item: 7.2.3.3; Source: Nokia, Nokia Shanghai Bell; Title: Resource allocation/coordination between Parent BH and Child links; Document for: Discussion and Decision.
R1-1812703; 3GPP TSG RAN WG1 Meeting #95; Spokane, WA, USA, Nov. 12-16, 2018; Agenda item: 7.2.3.3; Source: Nokia, Nokia Shanghai Bell; Title: IAB Timing; Document for: Discussion and Decision.
R1-1812704; 3GPP TSG RAN WG1 Meeting #95; Spokane, WA, USA, Nov. 12-16, 2018; Agenda item: 7.2.3.3; Source: Nokia, Nokia Shanghai Bell; Title: Discovery and measurements for IAB; Document for: Discussion and Decision.
R1-1812705; 3GPP TSG RAN WG1 Meeting #95; Spokane, U.S.A, Nov. 12-16, 2018; Agenda item: 7.2.3.3; Source: Nokia, Nokia Shanghai Bell; Title: Enhancements on RACH for IAB; Document for: Discussion.
R1-1812706; 3GPP TSG RAN WG1 Meeting #95; Spokane, USA, Nov. 12-16, 2018; Agenda item: 7.2.3.3; Source: Nokia, Nokia Shanghai Bell; Title: Considerations of single panel vs. multi-panel operation for IAB node; Document for: Discussion and Decision.
R1-1812707; 3GPP TSG RAN WG1 Meeting #95; Spokane, USA, Nov. 12-16, 2018; Agenda item: 7.2.3.3; Source: Nokia, Nokia Shanghai Bell; Title: On Cross-link Interference Management; Document for: Discussion and Decision.
R1-1812729; 3GPP TSG RAN WG1 Meeting #95; Spokane, USA, Nov. 12-16, 2018; Source: ZTE, Sanechips; Title: Discussion on physical layer enhancements for NR IAB; Agenda item: 7.2.3.1; Document for: Discussion and Decision.
R1-1812786; 3GPP TSG RAN WG1 Meeting #95; Spokane, USA, Nov. 12-16, 2018; Agenda Item: 7.2.3.1; Source: Lenovo, Motorola Mobility; Title: Discussion on resource partitioning for IAB network; Document for: Discussion.
R1-1812787; 3GPP TSG RAN WG1 Meeting #95; Spokane, USA, Nov. 12-16, 2018; Agenda Item: 7.2.3.3; Source: Lenovo, Motorola Mobility; Title: Discussion on discovery and measurement for IAB network; Document for: Discussion.
R1-1812858; 3GPP TSG-RAN WG1 Meeting #95; Spokane, USA, Nov. 12-16, 2018; Title: TR 38.874, Version 0.6.0; Source: AT&T, Kddi, Qualcomm Incorporated, Samsung (Rapporteurs); Agenda item: 7.2.3—Study on Integrated Access and Backhaul for NR; Release: Rel-15; Document for: Information.
R1-1812859; 3GPP TSG RAN WG1 Meeting #95; Chengdu, China, Oct. 8-12, 2018; Agenda Item: 7.2.3.1; Source: AT&T; Title: Enhancements to support NR backhaul links; Document for: Discussion/Approval.
R1-1812860; 3GPP TSG RAN WG1 Meeting #95; Spokane, USA, Nov. 12 - 16, 2018; Agenda Item: 7.2.3.2; Source: AT&T; Title: Evaluation results for NR IAB; Document for: Discussion/Approval.
R1-1812878; 3GPP TSG RAN WG1 Meeting #95; Spokane, USA, Nov. 12-16, 2018; Agenda item: 7.2.3.1; Source: CMCC; Title: Discussions on enhancements to support NR Backhaul links; Document for: Discussion and Decision.
R1-1812981; 3GPP TSG RAN WG1 Meeting #95; Spokane, USA, Nov. 12-16, 2018; Agenda item: 7.2.3.1; Source: Samsung; Title: Necessary Enhancements for NR IAB; Document for: Discussion and Decision.
R1-1812982; 3GPP TSG RAN WG1 Meeting #95; Spokane, USA, Nov. 12-16, 2018; Agenda item: 7.2.3.2; Source: Samsung; Title: Evaluation Results for NR IAB; Document for: Discussion and Decision.
R1-1812983; 3GPP TSG RAN WG1 Meeting #95; Spokane, USA, Oct. 12-16, 2018; Agenda item: 7.2.3.3; Source: Samsung; Title: CLI management in IAB; Document for: Discussion.
R1-1813209; 3GP P TSG RAN WG1 Meeting #95; Spokane, USA, Nov. 12-16, 2018; Source: Sharp; Title: Enhancements to Robustize IAB Networks to Radio Link Failure; Agenda Item: 7.2.3.1; Document for: Discussion and Decision.
R1-1813224; 3GPP TSG RAN WG1 Meeting #95; Spokane, USA, Nov. 12-16, 2018; Agenda Item: 7.2.3.1; Source: InterDigital Inc.; Title: Discussion on Integrated Access and Backhaul Links in NR; Document for: Discussion and Decision.
R1-1813225; 3GPP TSG RAN WG1 Meeting #95; Spokane, USA, Nov. 12-16, 2018; Agenda Item: 7.2.3.3; Source: InterDigital Inc.; Title: On Integrated Access and Backhaul Enhancements in NR; Document for: Discussion and Decision.
R1-1813316; 3GPP TSG RAN WG1 Meeting #95; Spokane, USA, Nov. 12-16, 2018; Source: NTT Docomo, Inc.; Title: Discussion on enhancements to support NR backhaul links; Agenda Item: 7.2.3.1; Document for: Discussion and Decision.
R1-1813417; 3GPP TSG RAN WG1 Meeting #95; Spokane, USA, Nov. 12- Nov. 16, 2018; Agenda Item: 7.2.3.1; Source: Qualcomm Incorporated; Title: Enhancements to support NR backhaul links; Document for: Discussion and decision.
R1-1813418; 3GPP TSG-RAN WG1 Meeting RAN1 95; Spokane, USA; Nov. 12-Nov. 16, 2018; Agenda item: 7.2.3.2; Source: Qualcomm Incorporated; Title: System Level Simulation Results for IAB Networks; Document for: Discussion/Decision.
R1-1813419; 3GPP TSG RAN WG1 Meeting #95; Spokane, US, Nov. 12-16, 2018; Agenda Item: 7.2.3.3; Source: Qualcomm Incorporated; Title: Resource Management in IAB Network; Document for: Discussion and decision.
R1-1813420; 3GPP TSG RAN WG1 Meeting #95; Spokane, USA, Nov. 12-Nov. 16, 2018; Agenda Item: 7.2.3.3; Source: Qualcomm Incorporated; Title: Network synchronization for multi-hop IAB networks; Document for: Discussion and decision.
R1-1813504; 3GPP TSG RAN WG1 Meeting #95; Spokane, USA, Nov. 12-16, 2018; Agenda Item: 7.2.3.1; Source: CAICT; Title: Discussion on enhancement of IAB discovery and Resource allocation; Document for: Discussion and Decision.
R1-1813566; 3GPP TSG-RAN WG1 Meeting #95; Spokane, U.S., Nov. 12-16, 2018; Agenda Item: 7.2.3.3; Source: Ericsson; Title: IAB resource allocation and multiplexing; Document for: Discussion.
R1-1813568; 3GPP TSG-RAN WG1 Meeting #95; Spokane, US, Nov. 12-16, 2018; Agenda Item: 7.2.3.3; Source: Ericsson; Title: Timing of IAB-node transmissions; Document for: Discussion and decision.
R1-1813570; 3GPP TSG-RAN WG1 Meeting #95; Spokane, US, Nov. 12-16, 2018; Agenda Item: 7.2.3.3; Source: Ericsson; Title: Deriving Child Node Timing from Multiple Parent IAB Nodes; Document for: Discussion and decision.
R1-1813572; 3GPP TSG-RAN WG1 Meeting #95; Spokane, US, Nov. 12-16, 2018; Agenda Item: 7.2.3.1; Source: Ericsson; Title: IAB-Physical layer enhancements; Document for: Discussion and decision.
R1-1813573; 3GPP TSG-RAN WG1 Meeting #95; Spokane, U.S., Nov. 12-16, 2018; Agenda Item: 7.2.3.2; Source: Ericsson; Title: Evaluation of multi-hop IAB networks; Document for: Discussion.

\* cited by examiner

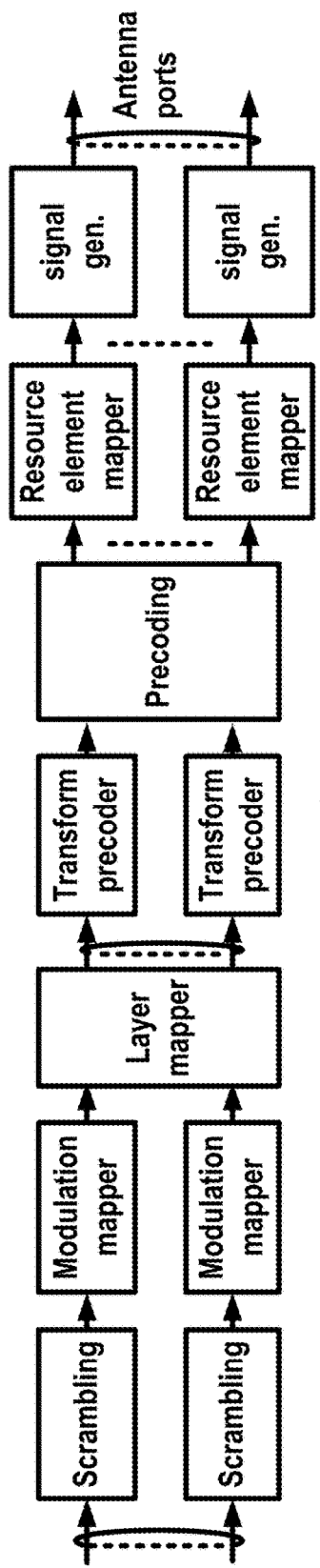
FIG. 4A
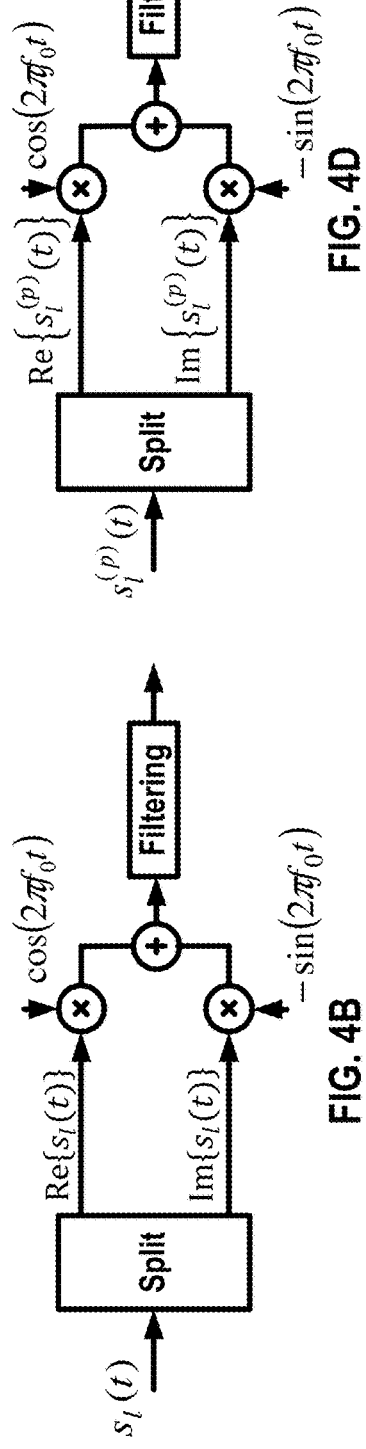
FIG. 4B
FIG. 4D
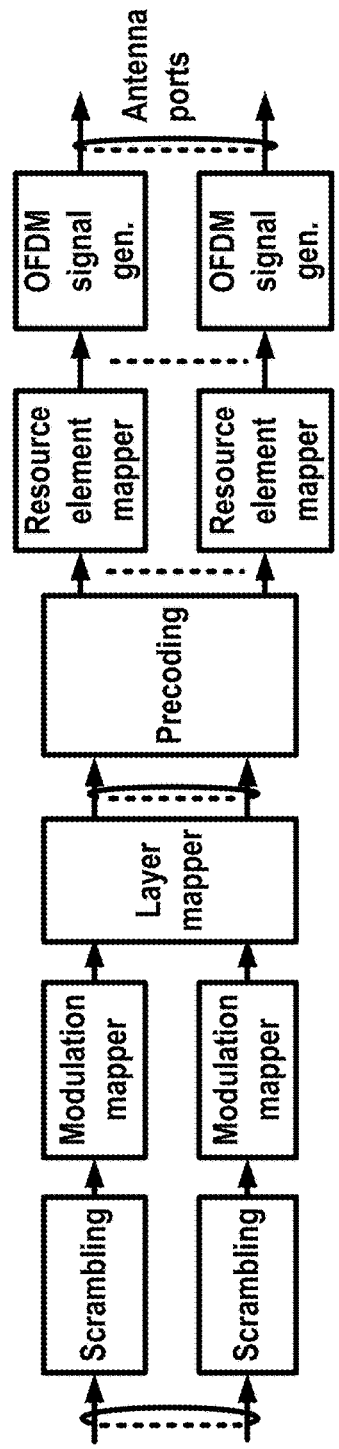
FIG. 4C

UE and IAB-node operate in SA

UE operates in NSA while IAB-node operates in SA

UE and IAB-node operate in NSA

Example of architecture 1a

Example of architecture 1b

Example of architecture 2a

Example of architecture 2b

Example of architecture 2c alternative 1 of architecture 1a alternative 2 of architecture 1a alternative 3 of architecture 1a alternative 4 of architecture 1a

BASE STATION BACKHAUL LINK INFORMATION

CROSS-REFERENCE TO RELATED APPLICATIONS

This application is a continuation of U.S. patent application Ser. No. 17/747,650, filed May 18, 2022, which is a continuation of U.S. patent application Ser. No. 16/783,752, filed Feb. 6, 2020, which claims the benefit of U.S. Provisional Application No. 62/801,851, filed Feb. 6, 2019, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

DETAILED DESCRIPTION OF EMBODIMENTS

Figure 1:
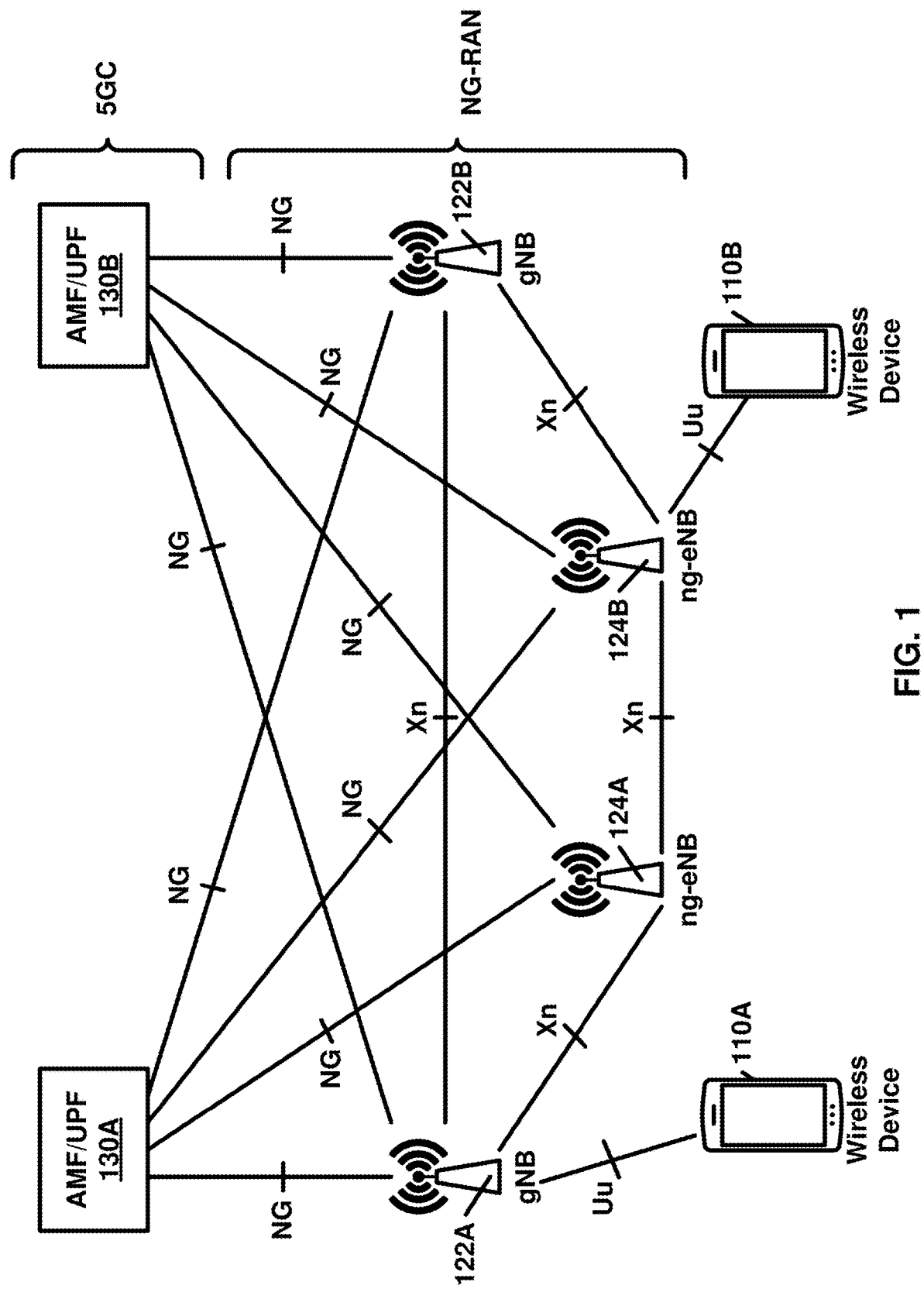
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to radio access networks in multi-carrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3 rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
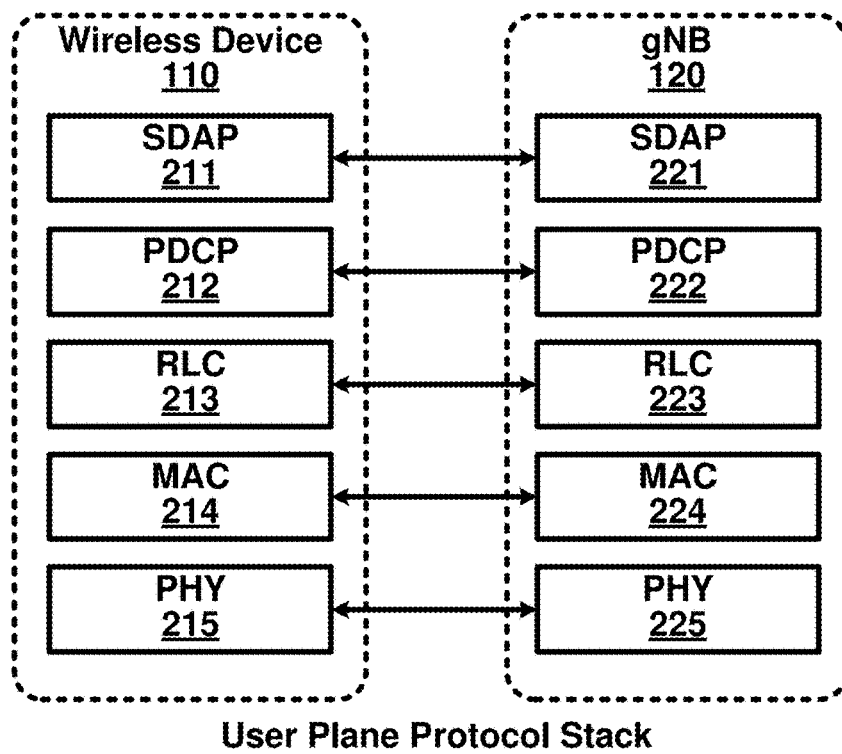
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
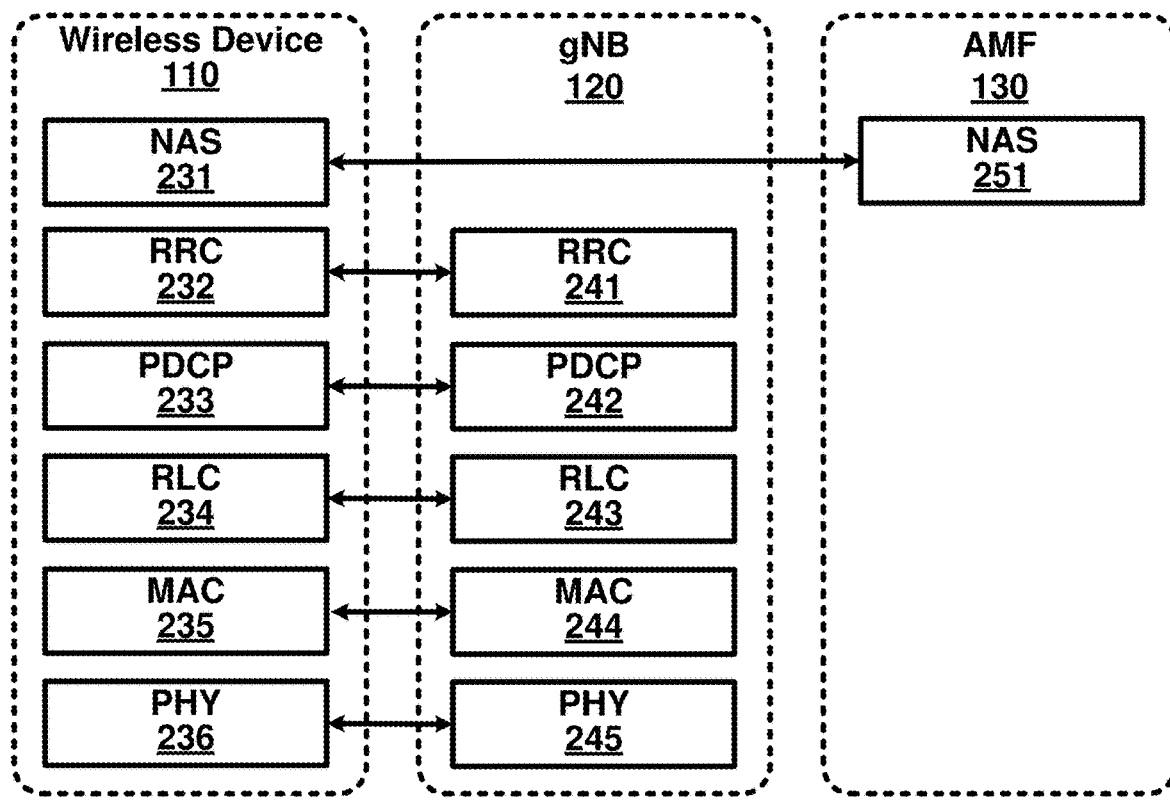
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
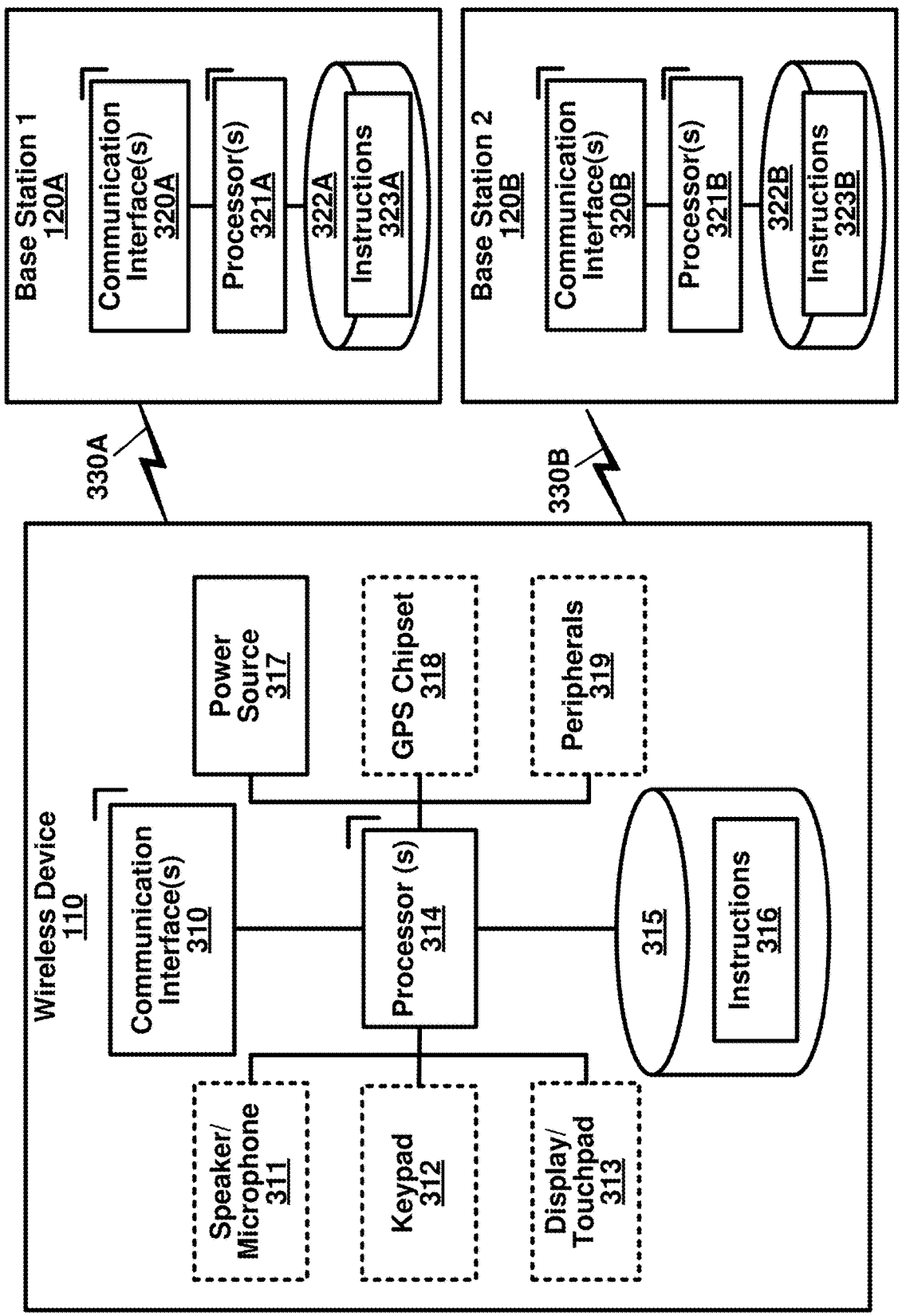
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). An other SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., only static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
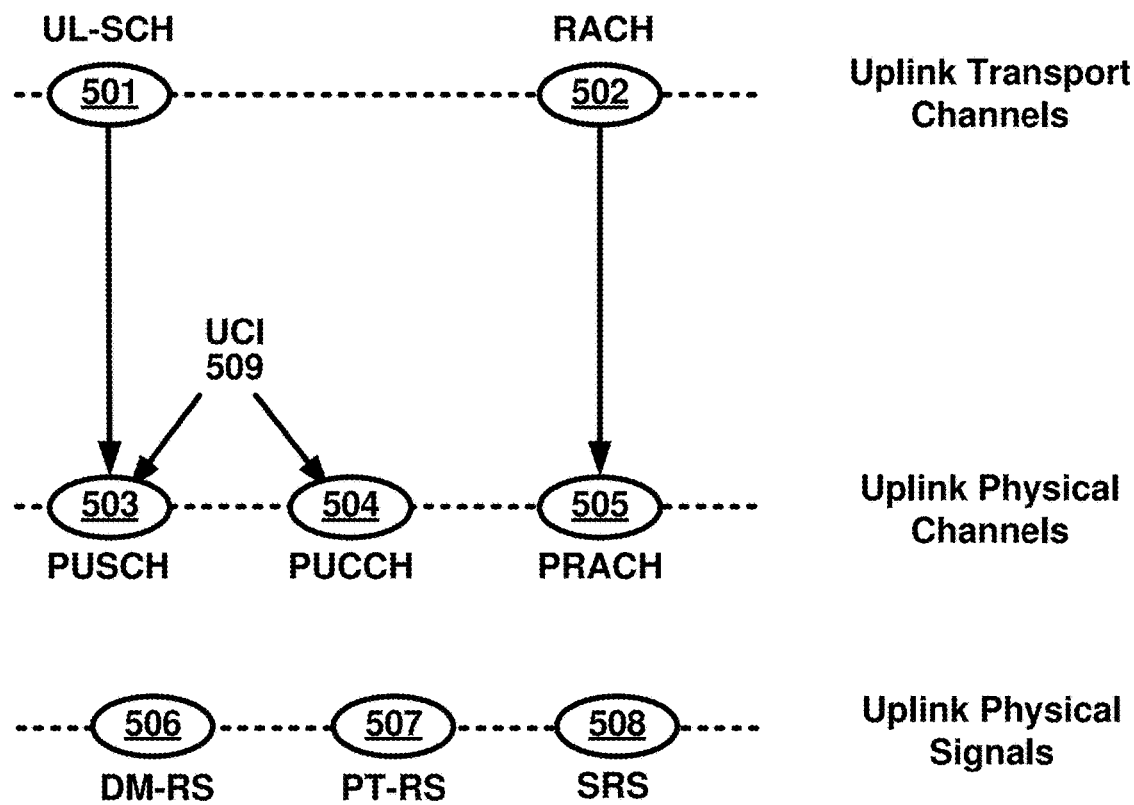
FIG. 5A is a diagram of an example uplink channel mapping and example uplink physical signals as per an aspect of an embodiment of the present disclosure.
Figure 5B:
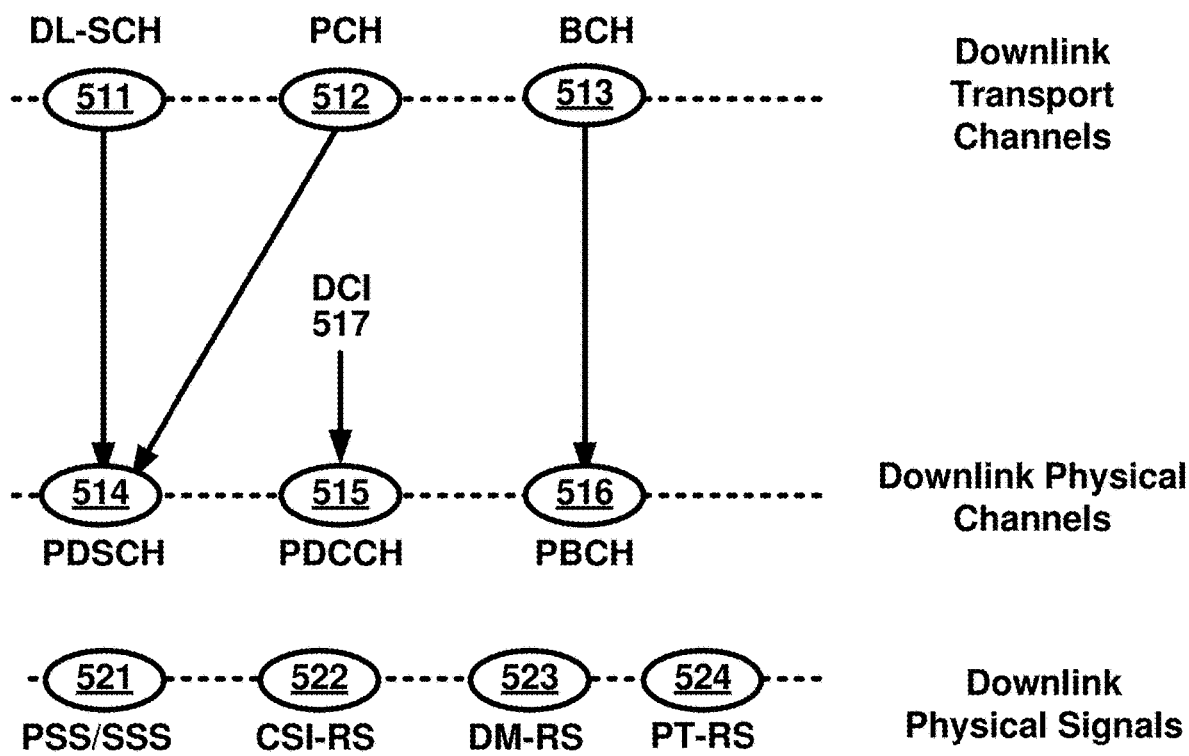
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and Control Resource Set (CORESET) when the downlink CSI-RS 522 and CORESET are spatially quasi co-located and resource elements associated with the downlink CSI-RS 522 are the outside of PRBs configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
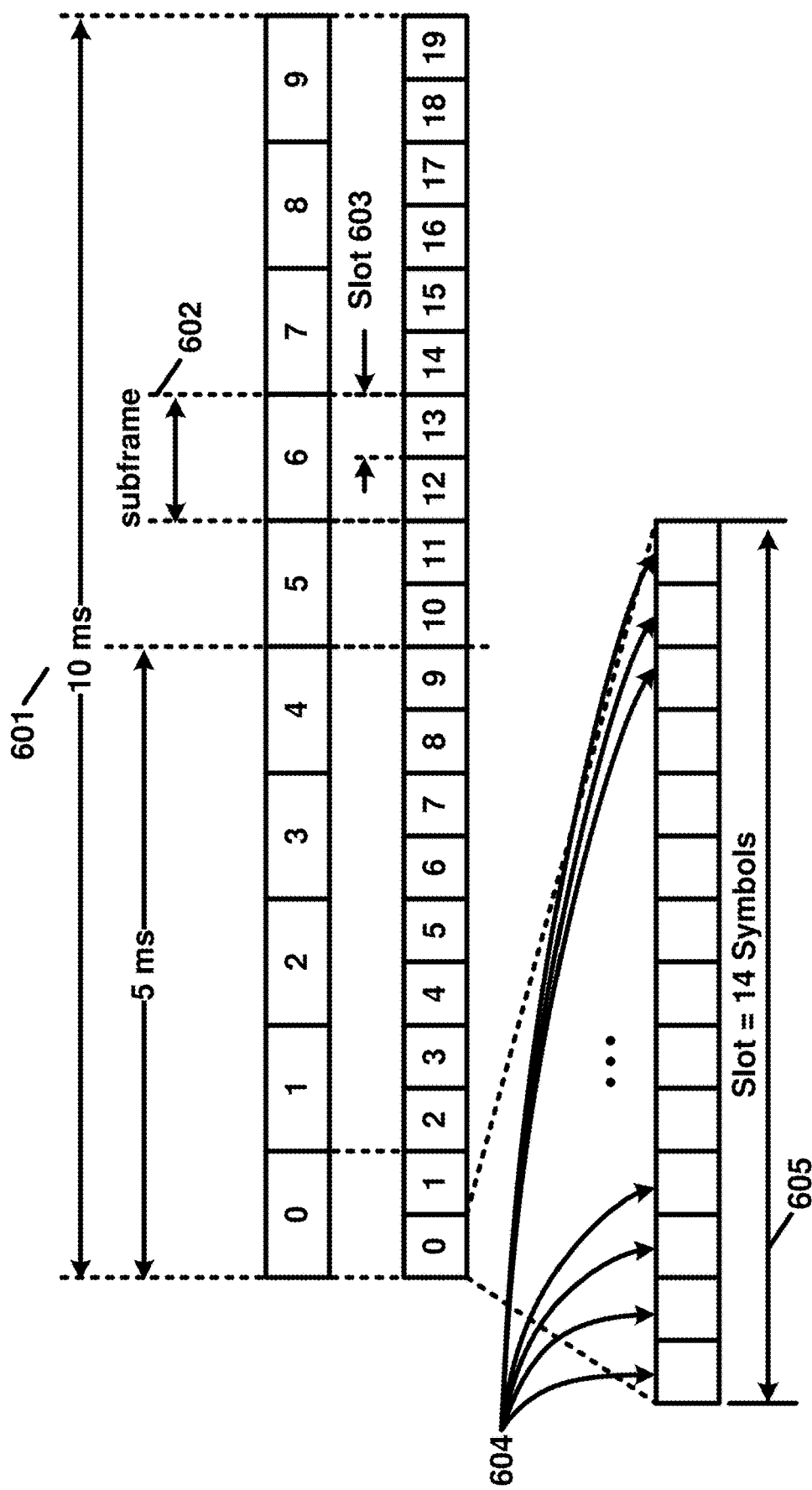
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
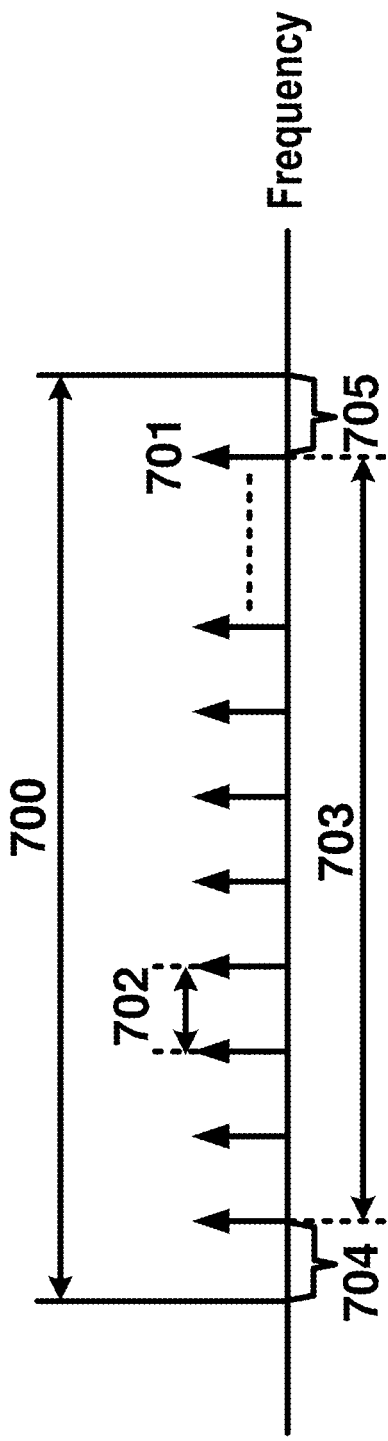
FIG. 7A and FIG. 7B are diagrams depicting example sets of OFDM subcarriers as per an aspect of an embodiment of the present disclosure.
Figure 7B:
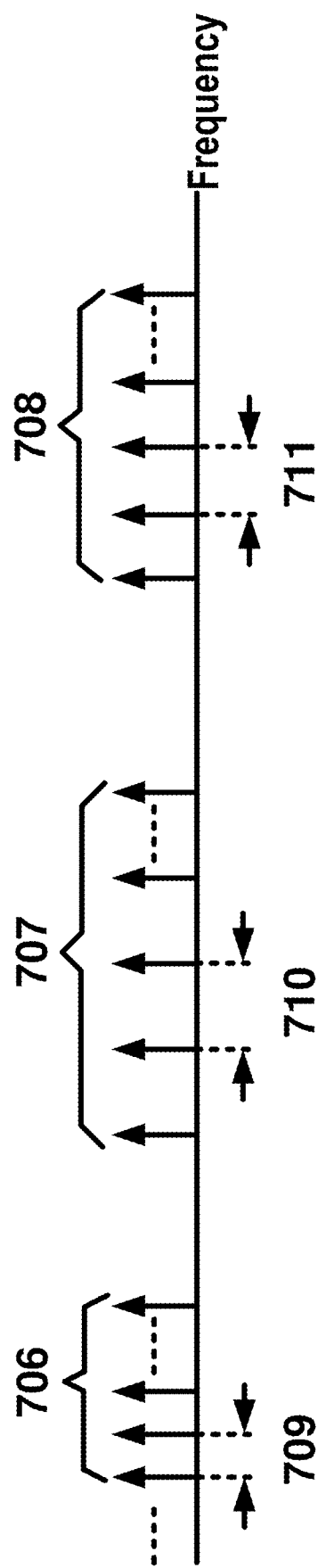

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG.

7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
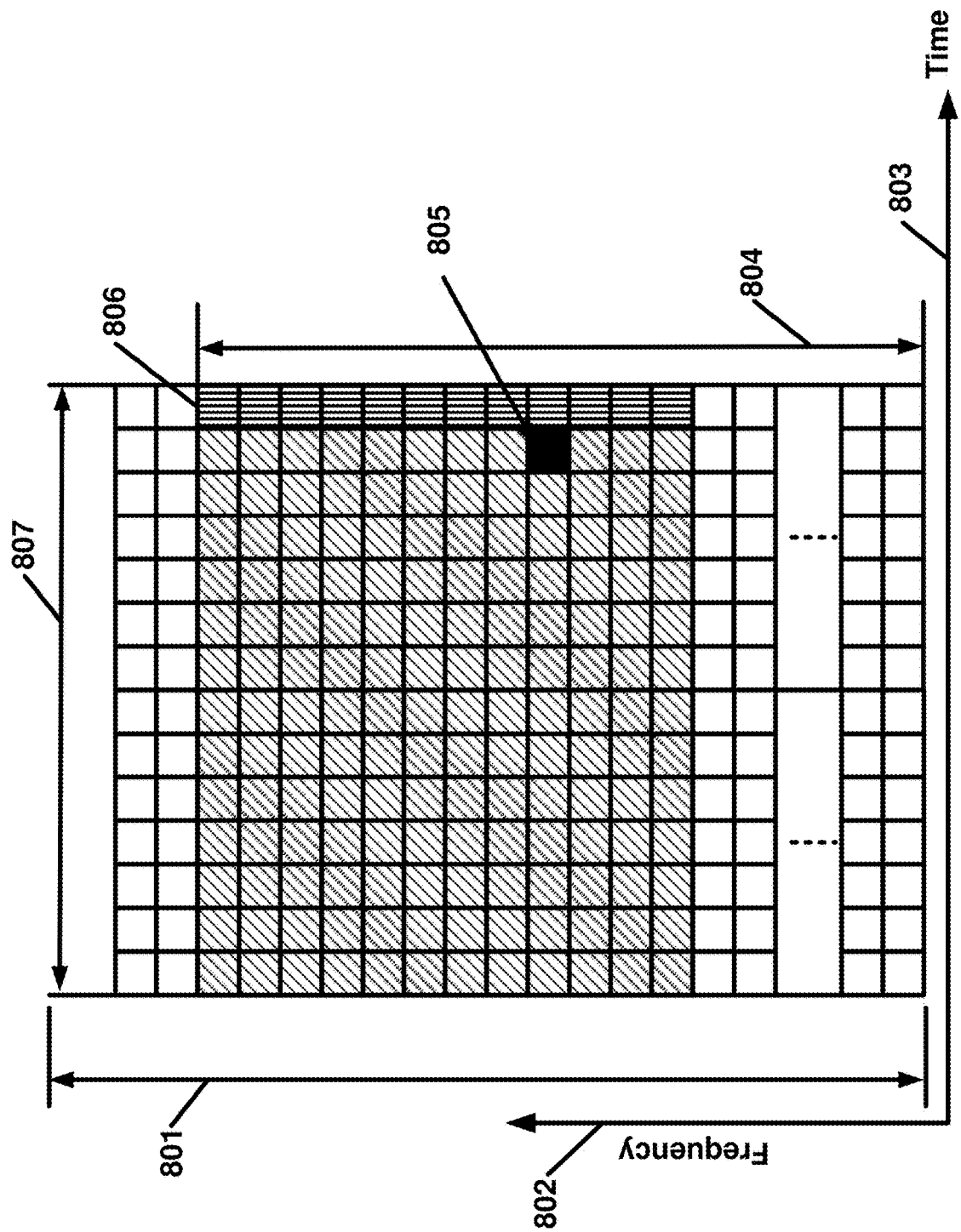
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
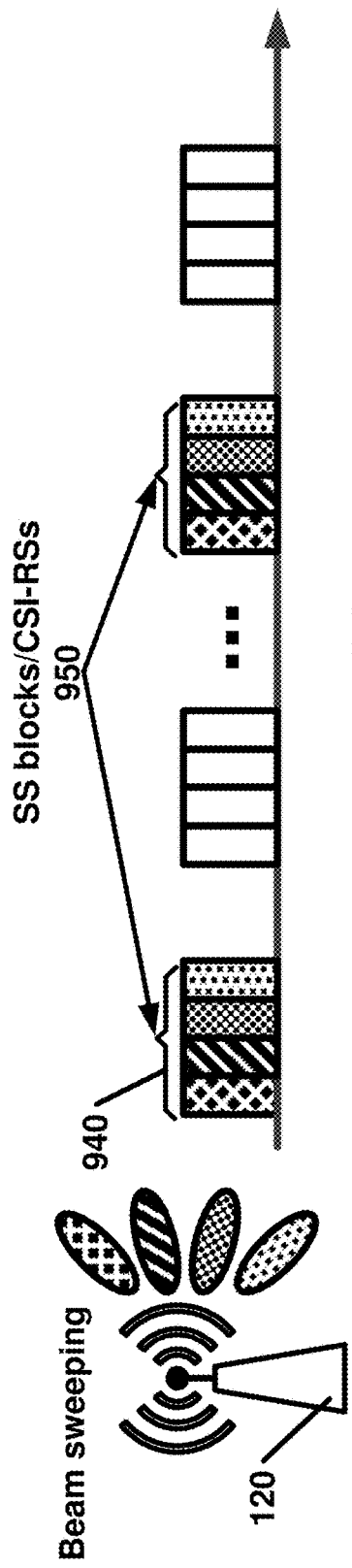
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
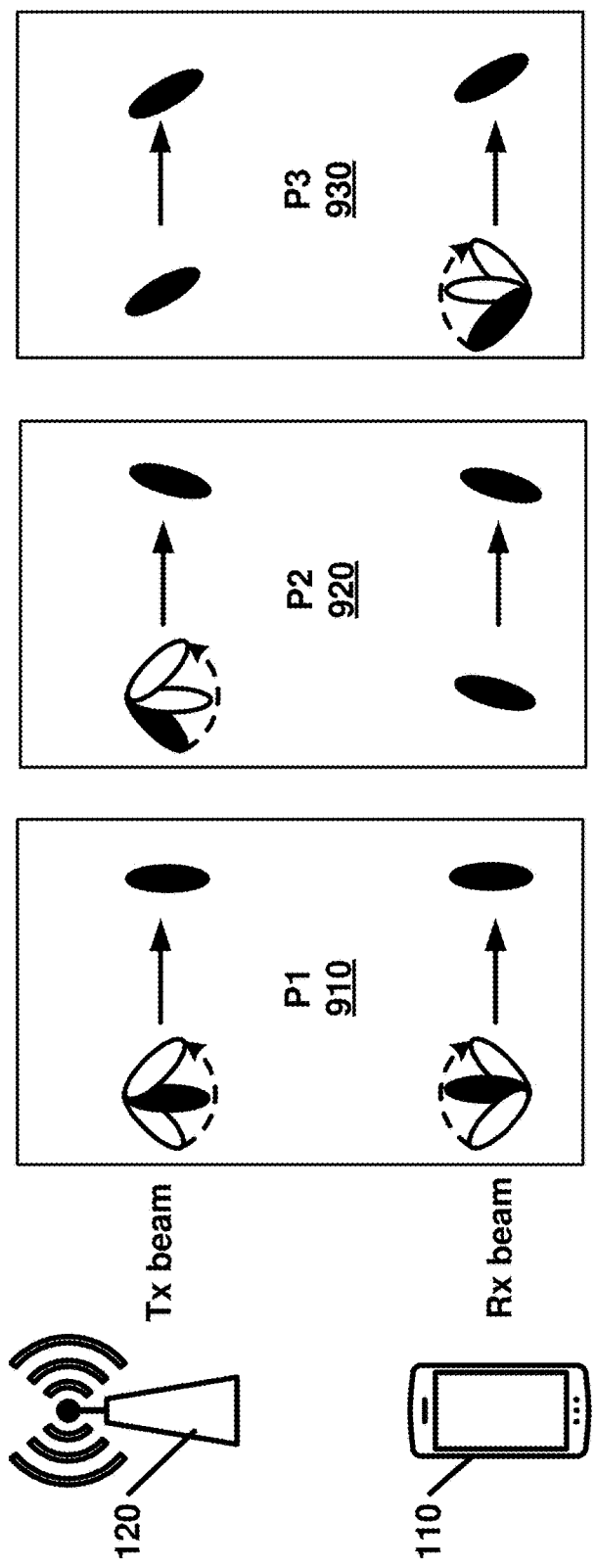
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
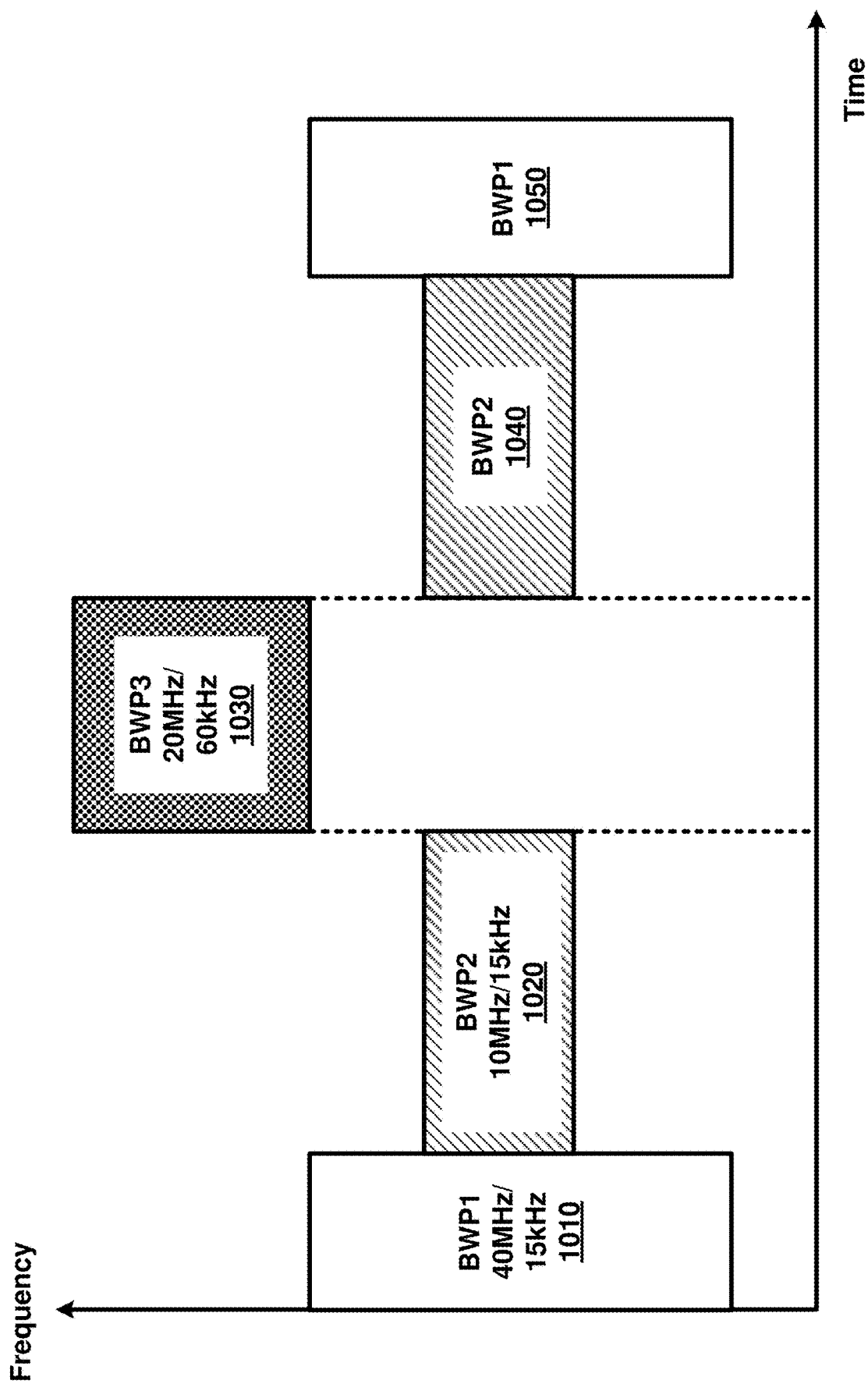
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
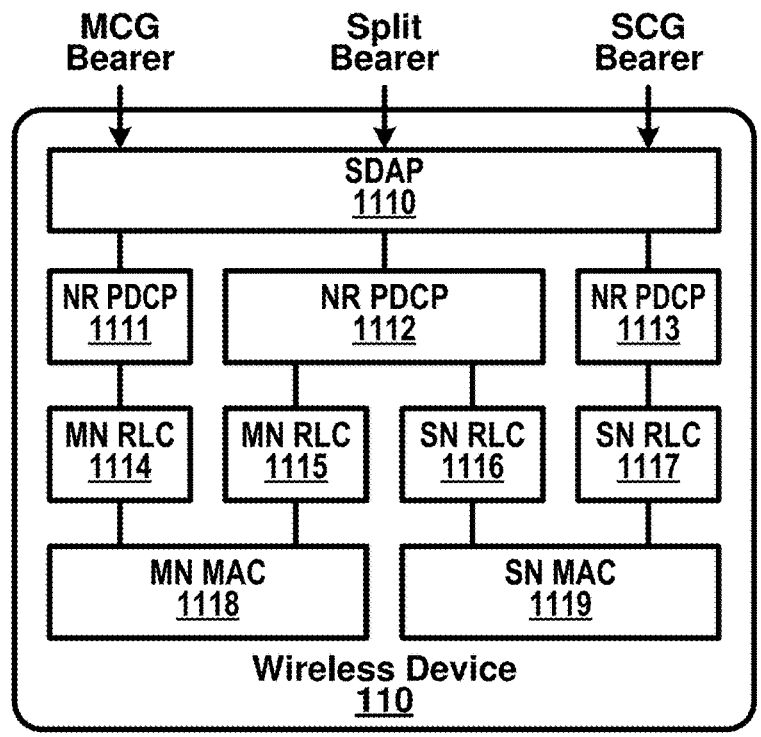
FIG. 11A, and FIG. 11B are diagrams of an example multi connectivity as per an aspect of an embodiment of the present disclosure.
Figure 11B:
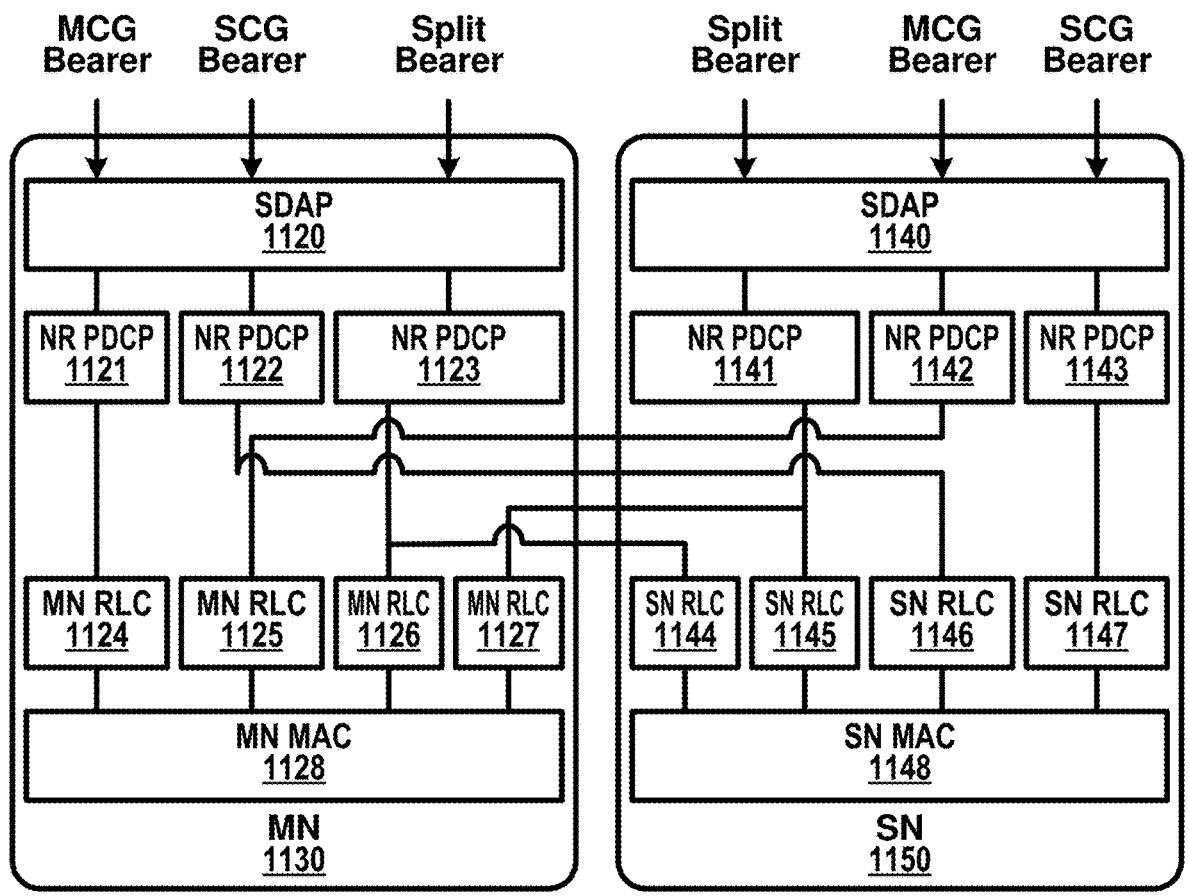

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
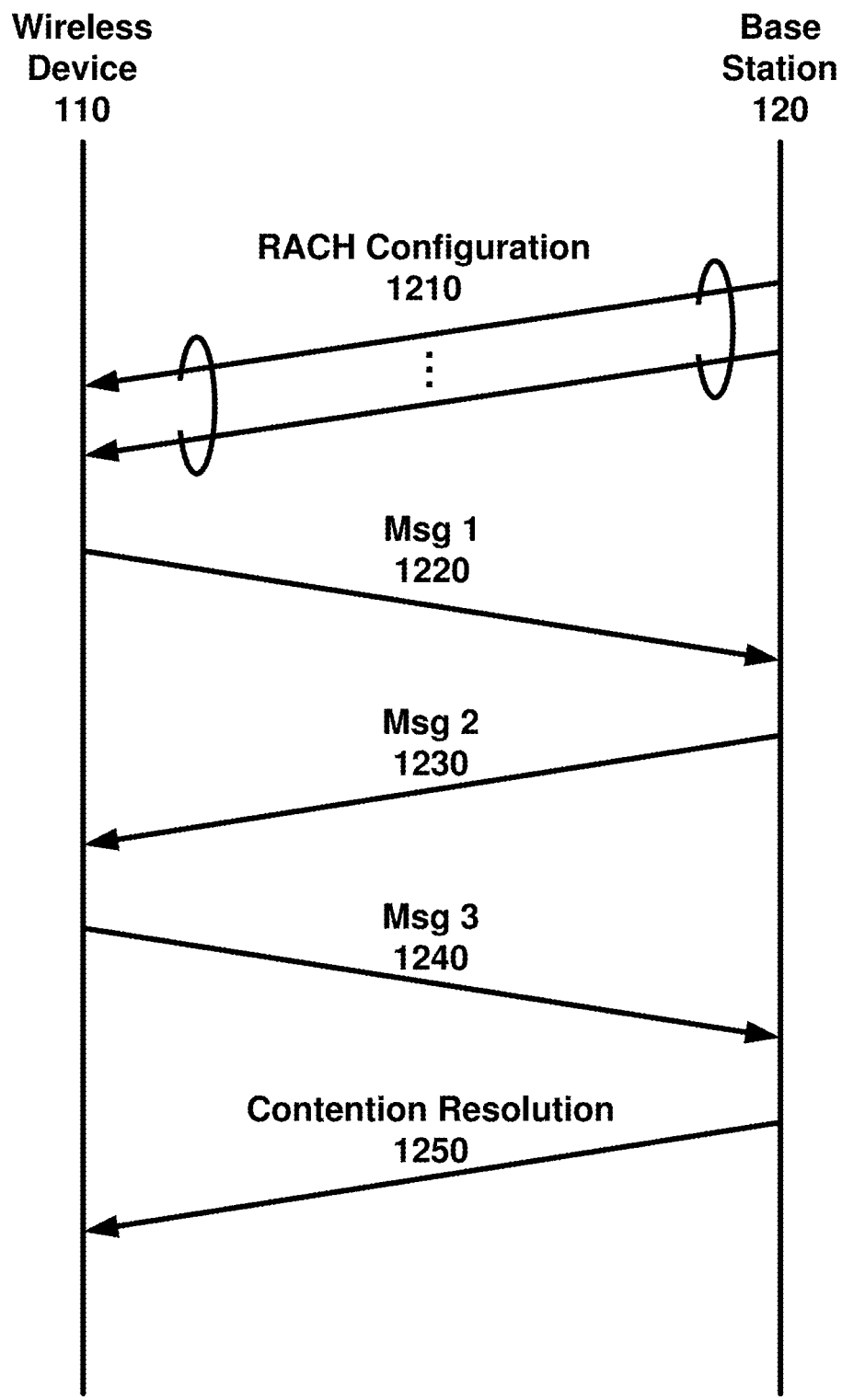
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronised, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises only a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
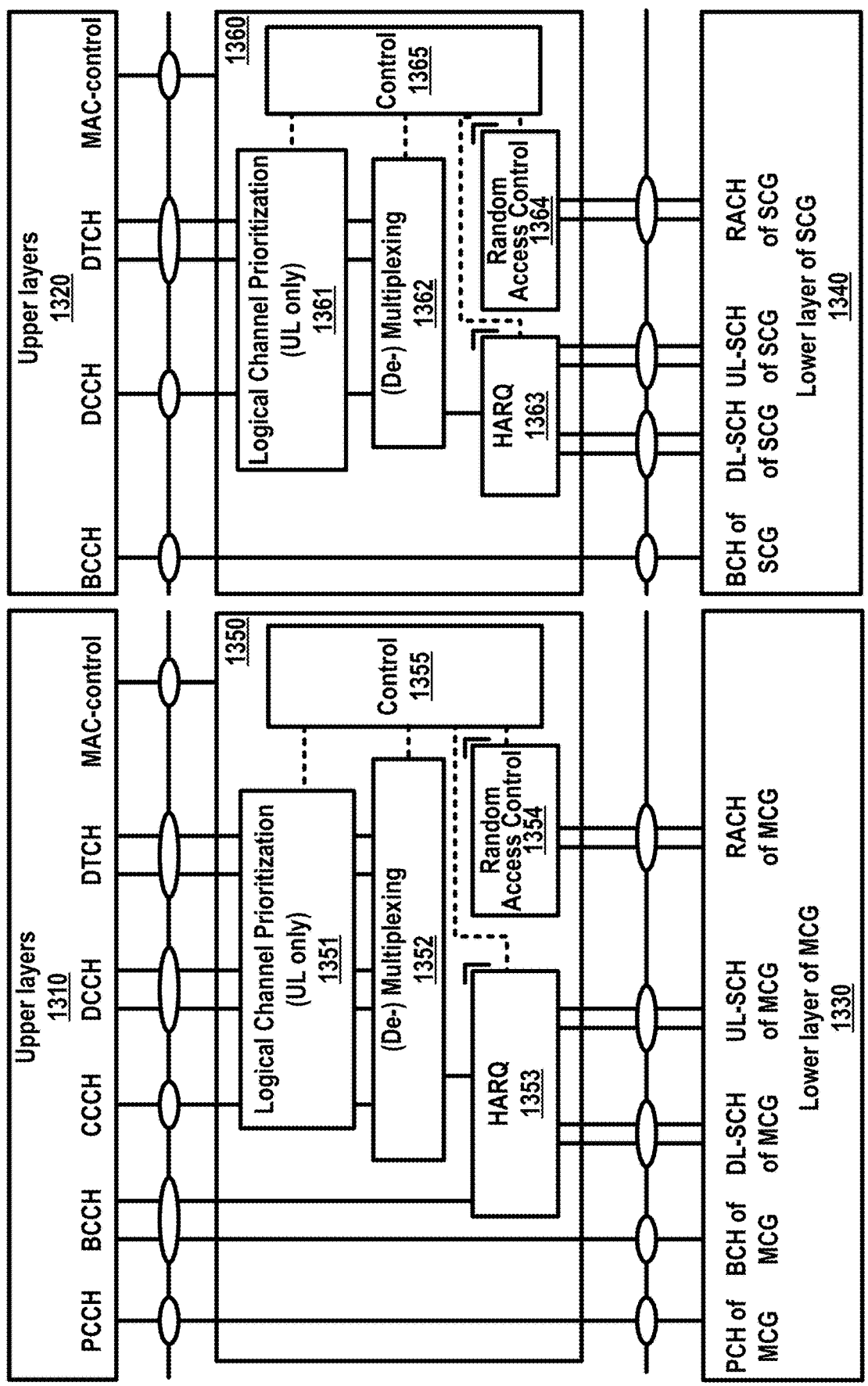
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
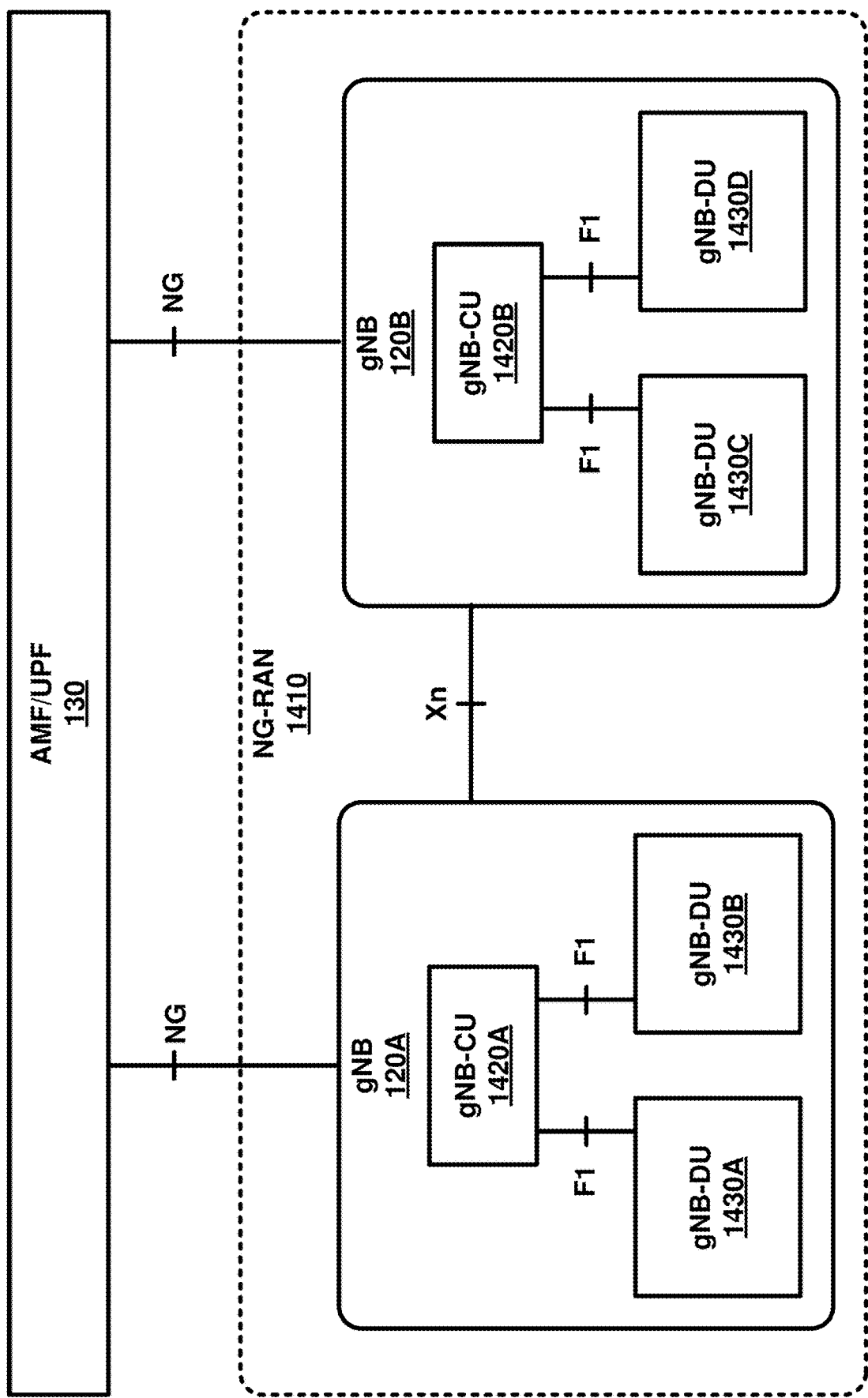
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
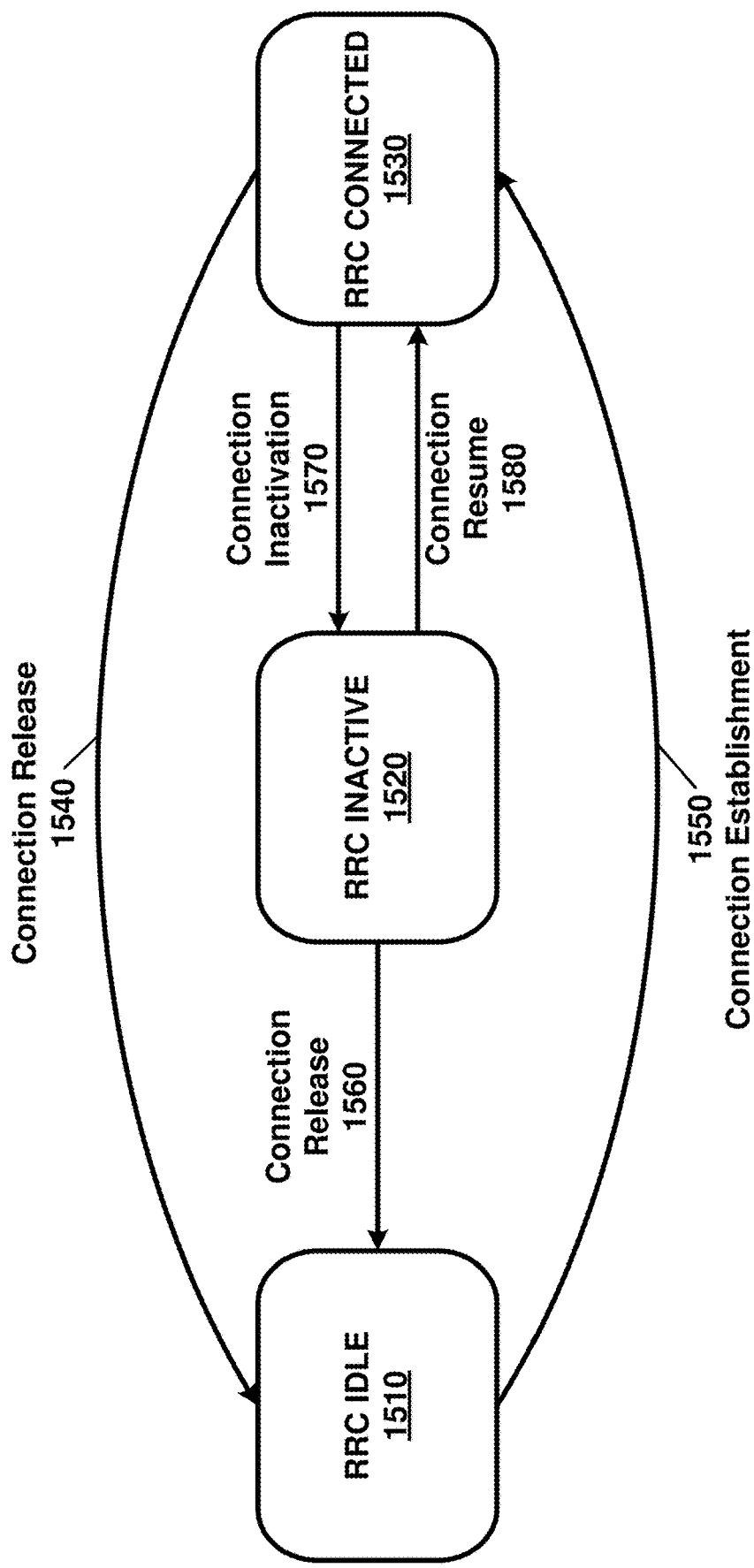
FIG. 15 is an example diagram of an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC_Inactive 1520, RRC_Inactive). In an example, in an RRC connected state, a wireless device may have at least one RRC connection with at least one base station (e.g. g NB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

INTRODUCTION

In an example, a cell may be served (e.g., controlled) by an access node (e.g., integrated access and backhaul (IAB) node, relay node, distributed unit, base station, gNB, eNB, etc.) connected to a donor access node (e.g., IAB-donor, donor base station, base station, gNB, eNB, central unit, etc.). The connection between the access node and the donor access node may comprise a backhaul link of the access node. The backhaul link between the access node and the donor access node may comprise one or more hops of one or more radio links and/or one or more intermediate access nodes. A number of hops and/or status of the backhaul link, may affect packet transmission latency and/or reliability of a wireless device. In an implementation of existing technologies, when a wireless device moves to a new cell that is served by an access node employing a backhaul link with many hops, the wireless device may experience decrease of service quality (e.g., higher latency and/or lower reliability). In an implementation of existing technologies, if a wireless device using an ultra-reliable and low latency communication (URLLC) service performs a handover to a new cell served by an access node with a backhaul link having multiple hops, the URLLC service may be interrupted in the new cell. An implementation of existing technologies may increase packet transmission latency and/or decrease service reliability when a wireless device moves to a new cell (e.g., after a handover to a new cell). An implementation of existing technologies may increase call drop rate of a wireless device during handover procedures.

Example embodiments may support sharing backhaul link information of cells between access nodes. Example embodiments may support an access node to receive backhaul link information of neighboring cells and/or neighboring access nodes and may support to determine whether to perform a handover of a wireless device based on the backhaul link information of neighboring cells and/or the neighboring access nodes. In an example embodiment, based on backhaul link information of neighboring cells and/or neighboring access nodes, an access node may decide a handover of a wireless device depending on service requirements of the wireless device. In an example, if a wireless device uses a service requiring low latency and/or high reliability (e.g., URLLC service), an access node may avoid initiating a handover of the wireless device to a cell having a backhaul link with multiple hops (e.g., more than 1 or 2 hops). In an example, if a wireless device uses a service that is insensitive to latency and/or reliability, an access node may initiate a handover to a cell having a backhaul link with multiple hops (e.g., when radio condition of the cell for the wireless device satisfies requirements; and/or in response to RSRP/RSRQ of the wireless device for the cell being higher than a threshold value and/or being offset better than RSRP/RSRQ of a current serving cell).

Integrated Backhaul and Access (IAB)

In an example, an integrated access and backhaul (IAB) may support a wireless backhaul connection for an access network node (e.g. distributed unit, gNB-DU, base station, gNB, IAB-node, relay node, mobile relay node, RAN node, and/or the like). In an example, an IAB-node may indicate a RAN node that may support wireless access to UEs and/or wirelessly backhauls access traffic. In an example, an IAB-donor may indicate a RAN node which may provide UE's interface to core network and/or wireless backhauling functionality to IAB nodes.

In an example, IAB may enable flexible and/or very dense deployment of cells without densifying the transport network proportionately. A diverse range of deployment scenarios may be envisioned including support for outdoor small cell deployments, indoors, and/or even mobile relays (e.g. on buses and/or trains). IAB may support physically fixed relays and/or mobile relays.

In example IAB deployment, in-band and/or out-of-band backhauling with respect to the access link may be supported. In-band backhauling may include scenarios, where access and backhaul link at least partially overlap in frequency creating half-duplexing or interference constraints. Half-duplexing constraint and/or interference constraints of in-band backhauling may imply that IAB node may not transmit and receive simultaneously on both links. In an example, out-of-band scenarios may not pose half-duplexing constraint and/or interference constraints. In in-band backhauling deployments, tighter interworking between access and backhaul in compliance with half-duplexing and interference constraints may be needed.

In an example, in-band IAB scenarios may support TDM/FDM/SDM of access and backhaul links subject to half-duplex constraint at the IAB node. In an example, in-band IAB scenario may support full duplex solutions. In an example, out-of-band IAB scenarios may be supported using the same set of RAN features designed for in-band scenarios.

In an example, IAB may support access and backhaul in above-6 GHz- and/or sub-6 GHz spectrum. Backhauling of access traffic over the same RAT backhaul links may be supported. Inter-RAT operation for backhauling and access may be supported.

UEs may transparently connect to an IAB-node via the same RAT. IAB architectures required for a first RAT access over a second RAT backhaul may be supported In an example, IAB may support stand-alone (SA) and/or non-stand-alone (NSA) deployments. For NSA, IAB-based relaying of UE's secondary cell group (SCG) path may be supported. IAB-based relaying of UE's master cell group (MCG) path be supported.

An IAB node may operate in SA and/or NSA mode. In an example, EN-DC and SA option 2 may be supported. In an example, EN-DC and SA option 2 for UEs and IAB-nodes may be supported. NSA deployment options and/or combinations of SA and NSA may be supported.

In an example, SA and/or NSA may be supported for access link. For an NSA access link, relaying may be applied to RAN node. In an example, both NSA and SA may be supported for backhaul link. Backhaul traffic over radio interface may be supported. In an example, for NSA access and backhaul links, EN-DC may be supported.

In an example, multi-hop backhauling may provide more range extension than single hop. Multi-hop backhauling may be beneficial for above-6 GHz frequencies due to their limited range. Multi-hop backhauling may enable backhauling around obstacles, e.g. buildings in urban environment for in-clutter deployments. In an example, the number of hops in IAB deployment may be expected to depend on many factors such as frequency, cell density, propagation environment, and/or traffic load. These factors may be expected to change over time. From the architecture perspective, flexibility in hop count may be desirable.

In an example, with increasing number of hops, scalability issues may limit performance and/or increase signaling load. Capturing scalability to hop count may affect system performances. IAB design may support multiple backhaul hops. In an example, IAB architecture may not limit on the number of backhaul hops. Scalability to hop-count may be supported. In an example, single hop may be considered (e.g. interpreted as) a special case of multiple backhaul hops.

In an example, wireless backhaul links may be vulnerable to blockage, e.g., due to moving objects such as vehicles, due to seasonal changes (foliage), and/or due to infrastructure changes (e.g. new buildings). Vulnerability of wireless backhaul links may apply to physically stationary IAB-nodes. In an example, traffic variations may create uneven load distribution on wireless backhaul links leading to local link and/or node congestion.

In an example, topology adaptation (e.g. adaptive routing) may refer to procedures that autonomously reconfigure backhaul network under circumstances such as blockage and/or local congestion without discontinuing services for UEs. In an example, topology adaptation for physically fixed relays may be supported to enable robust operation, e.g., mitigate blockage and/or load variation on backhaul links.

In an example, for IAB implementation, layer 2 (L2) and layer 3 (L3) relay architectures may be supported.

In an example, IAB-related features such as IAB-node integration and/or topology adaptation may affect core network operations. In an example, IAB features may create additional core-network signaling load. An amount of signaling load of core network nodes may vary among the various designs of IAB architectures.

In an example, time synchronization between IAB nodes may be implemented e.g. to support TDD system and/or some potential features which may need network synchronization. IAB may support additional implementations on network synchronization, which may include in-band wireless backhaul and/or multi-hops backhauling.

In an example, IAB architectures may comprise mobile-termination (MT), gNB-DU, gNB-CU, UPF, AMF and SMF as well as the corresponding interfaces NR Uu (between MT and gNB), F1, NG, X2 and N4. IAB architecture may be configured based on modifications or enhancements to these functions and interfaces. An mobile-termination (MT) function may be defined a component of a mobile equipment (e.g. user equipment, UE). In an example, MT may be referred to as a function residing on an IAB-node that terminates radio interface layers of a backhaul Uu interface toward an IAB-donor and/or other IAB-nodes.

Figure 16:
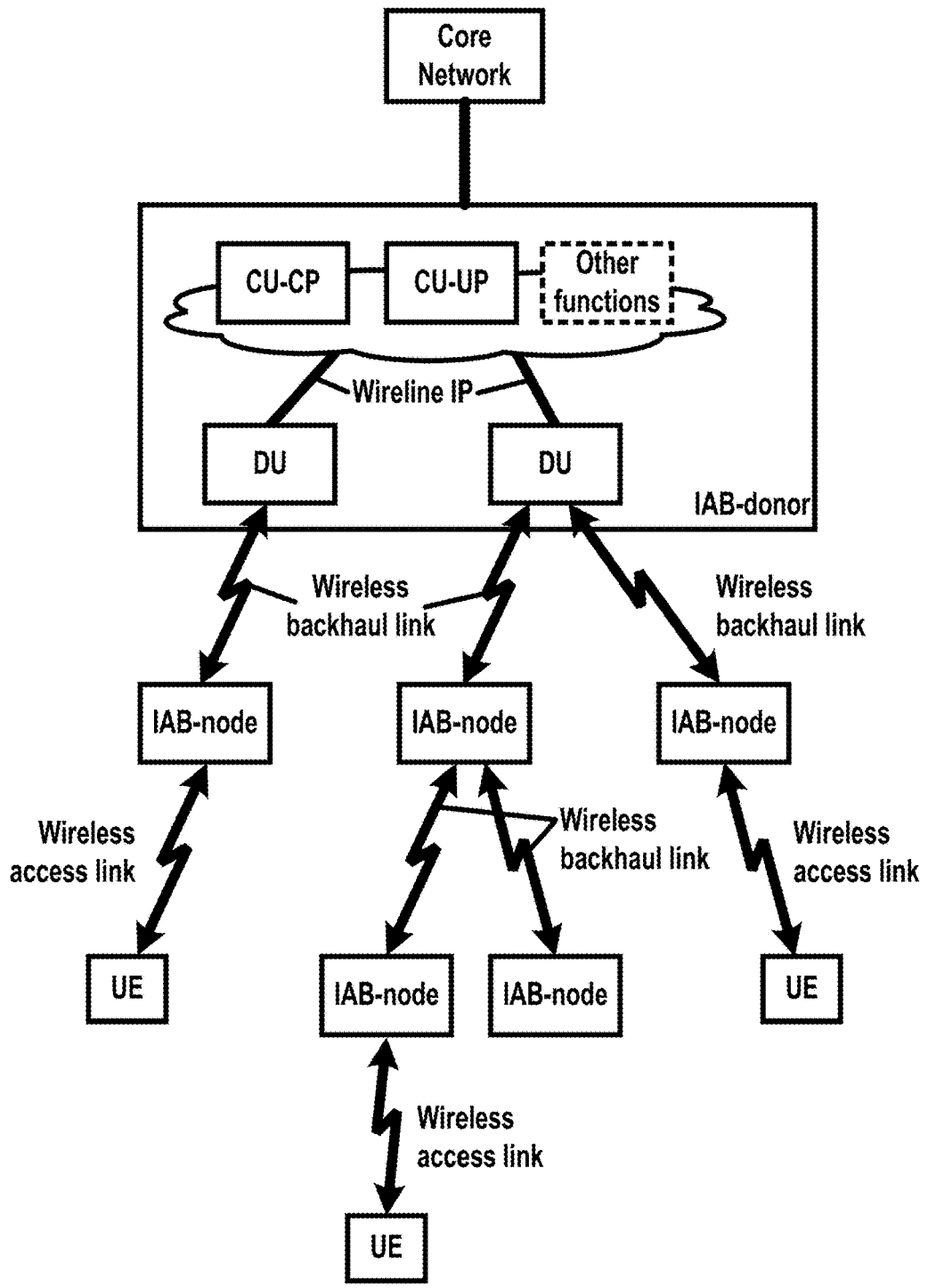
FIG. 16 is an example diagram of an aspect of an embodiment of the present disclosure.

FIG. 16 shows an example diagram for IAB in standalone mode, which may contain one IAB-donor and multiple IAB-nodes. An IAB-donor may be treated as a single logical node that may comprise a set of functions such as gNB-DU, gNB-CU-CP, gNB-CU-UP and/or potentially other functions. In a deployment, an IAB-donor may be split according to these functions, which may be collocated and/or non-collocated. IAB architectures may operate with split of these functions. In an example, some of functions associated with an IAB-donor may be moved outside of the donor in some cases.

Figure 17:
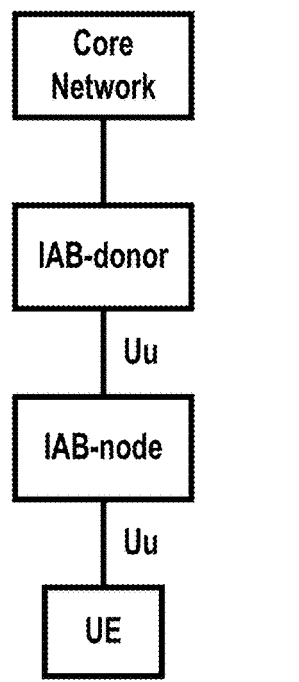
FIG. 17 is an example diagram of an aspect of an embodiment of the present disclosure.
Figure 17:
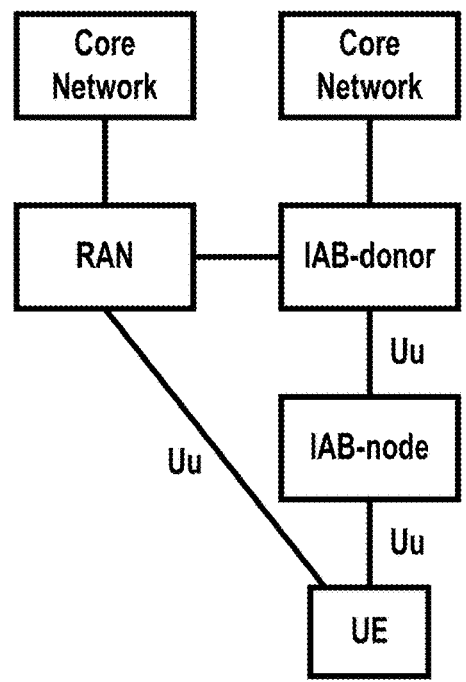
Figure 17:
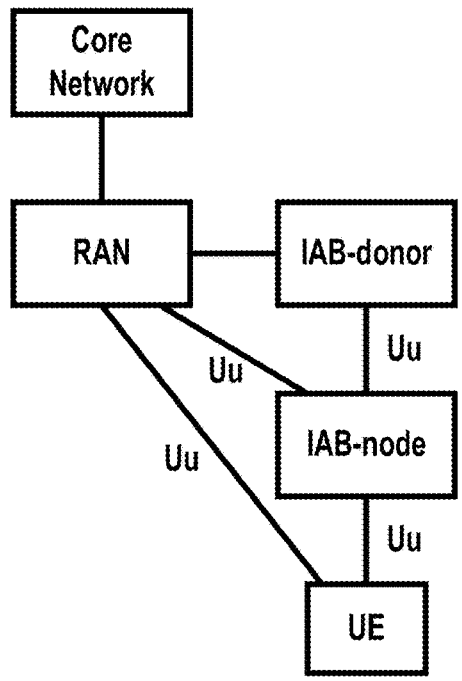

In an example, an IAB node may operate in SA mode and/or in NSA mode. When operating in NSA, an IAB-node may use other link for backhauling. In an example, a UE connecting to an IAB-node may choose a different operation mode than the IAB-node. A UE may connect to a different type of core network than an IAB-node that the UE is connected to. In this case, (e) Decor or slicing may be used for core network selection. IAB-nodes operating in NSA-mode may be connected to the same or to different base stations (e.g. gNBs, eNBs). UEs that operate in NSA-node may connect to the same or to a different base stations than an IAB-node that they are connected to. FIG. 17 shows examples for SA-mode and NSA-mode with core network(s).

In an example, IAB multi-hop designs may differ with respect to modification needed on interfaces and/or additional functionality needed, e.g. to accomplish multi-hop forwarding. Example architectures may be divided into two architecture groups.

In an example, architecture group 1 may comprise architectures 1a and/or 1b. The architecture 1a and/or 1b may leverage CU/DU split architecture. Architecture 1a may comprise backhauling of F1-U using an adaptation layer and/or GTP-U combined with an adaptation layer. Architecture 1a may employ hop-by-hop forwarding across intermediate nodes using an adaptation layer for operation with core network and/or PDN-connection-layer routing for operation with other core networks (e.g. other RAT, EPC). In an example, architecture 1b may comprise backhauling of F1-U on access node using GTP-U/UDP/IP. Architecture 1b may employ hob-by-hop forwarding across intermediate node using an adaptation layer.

In an example, architecture group 2 may comprise architectures 2a, 2b, and/or 2c. Architecture 2a may comprise backhauling of F1-U or NG-U on access node using GTP-U/UDP/IP. Architecture 2a may employ hop-by-hop forwarding across intermediate node using PDU-session-layer routing. Architecture 2b may comprise backhauling of F1-U or NG-U on access node using GTP-U/UDP/IP. Architecture 2b may employ hop-by-hop forwarding across intermediate node using GTP-U/UDP/IP nested tunneling. Architecture 2c may comprise backhauling of F1-U or NG-U on access node using GTP-U/UDP/IP. Architecture 2c may employ hop-by-hop forwarding across intermediate node using GTP-U/UDP/IP/PDCP nested tunneling.

Figure 18:
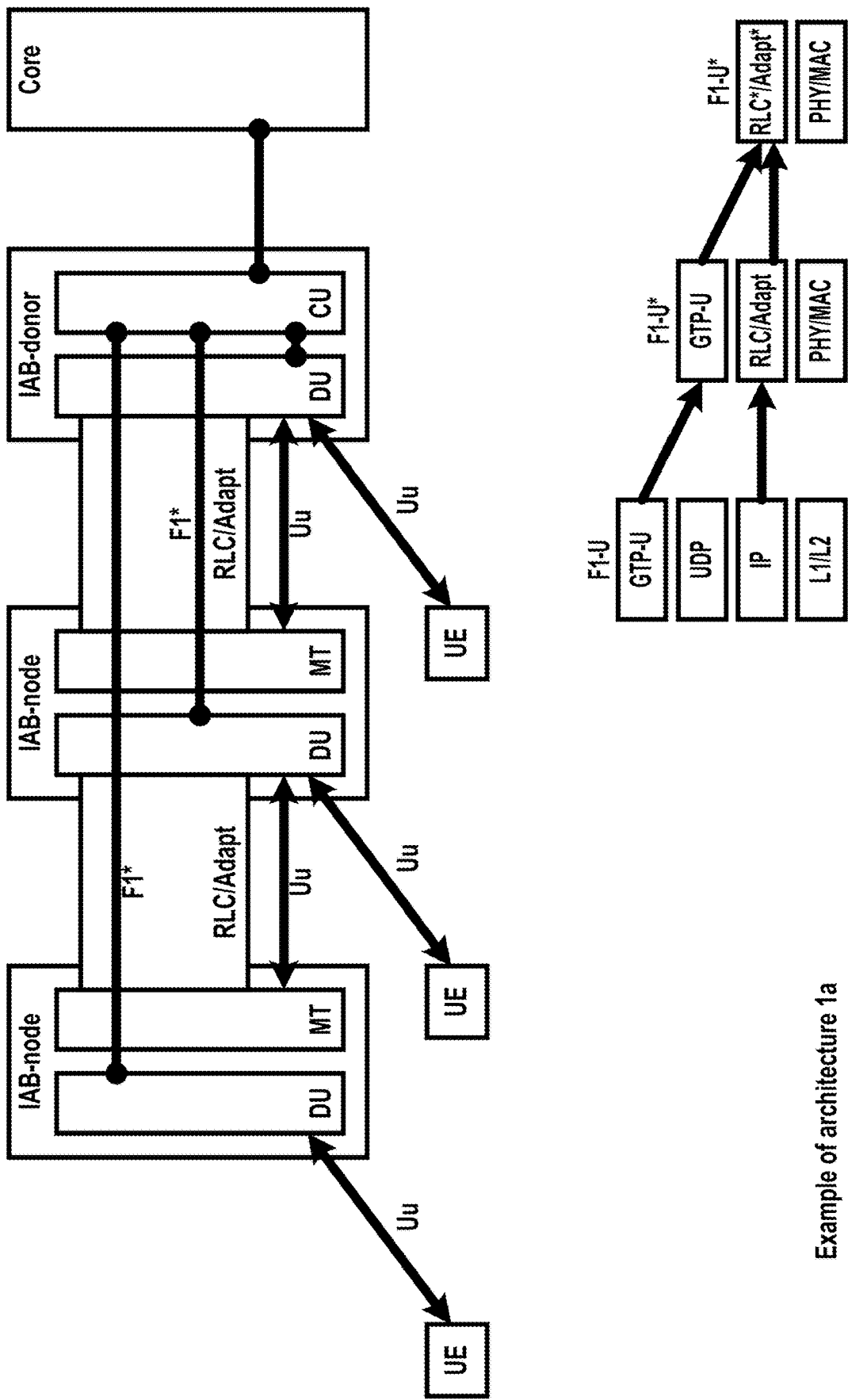
FIG. 18 is an example diagram of an aspect of an embodiment of the present disclosure.

In an example, architecture 1a may leverage CU/DU-split architecture. FIG. 18 shows an example diagram for a two-hop chain of IAB-nodes underneath an IAB-donor, where IAB-node and UE connect in SA-mode to a core network node (e.g. AMF, UPF, SMF, MME, SGW). In an architecture 1a, an IAB node may hold a DU and/or an MT. Via an MT, an IAB-node may connect to an upstream IAB-node and/or an IAB-donor. Via a DU, an IAB-node may establish RLC-channels to UEs and/or to MTs of downstream IAB-nodes. For MTs, an RLC-channel may refer to a modified RLC*. An IAB node may connect to more than one upstream IAB-node and/or IAB-donor.

In an example of an architecture 1a, a donor (IAB-donor) may hold a DU to support UEs and/or MTs of downstream IAB-nodes. An IAB-donor may hold a CU for DUs of IAB-nodes and/or for its own DU. Different CUs may serve DUs of IAB-nodes. A DU on an IAB-node may connect to a CU in an IAB-donor using a modified form of F1, which is referred to as F1*. F1*-U may run over RLC channels on a wireless backhaul between an MT on a serving IAB-node and a DU on a donor. F1*-U transport between MT and DU on a serving IAB-node and/or between DU and CU on a donor may be configured. In an example, an adaptation layer may be added, which may hold routing information, enabling hop-by-hop forwarding. An adaptation layer may replace an IP functionality of an F1-stack. F1*-U may carry a GTP-U header for end-to-end association between CU and DU. In an example, information carried via GTP-U header may be included into an adaption layer.

In an example of an architecture 1a, an RLC may apply ARQ on an end-to-end connection and/or hop-by-hop. FIG. 18 shows examples of F1*-U protocol stacks. RLC* may refer to enhancements of RLC. An MT of IAB-node may sustain NAS connectivity to a core network node (e.g. AMF, SMF, MME, and/or the like core node), e.g., for authentication of an IAB-node. An MT of IAB-node may sustain a PDU session via a core network node (e.g. UPF, SGW, PGW, and/or the like core node), e.g., to provide an IAB-node with connectivity to an operation and management (OAM). In an example, for NSA operation with core network, an MT may be dual-connected with networks (e.g. gNB, eNB, RNC, core network). IAB-node's MT may sustain a PDN connection with core network, e.g., to provide an IAB-node with connectivity to an OAM. Protocol translation between F1* and F1 in case that an IAB-donor is split may be supported.

Figure 19:
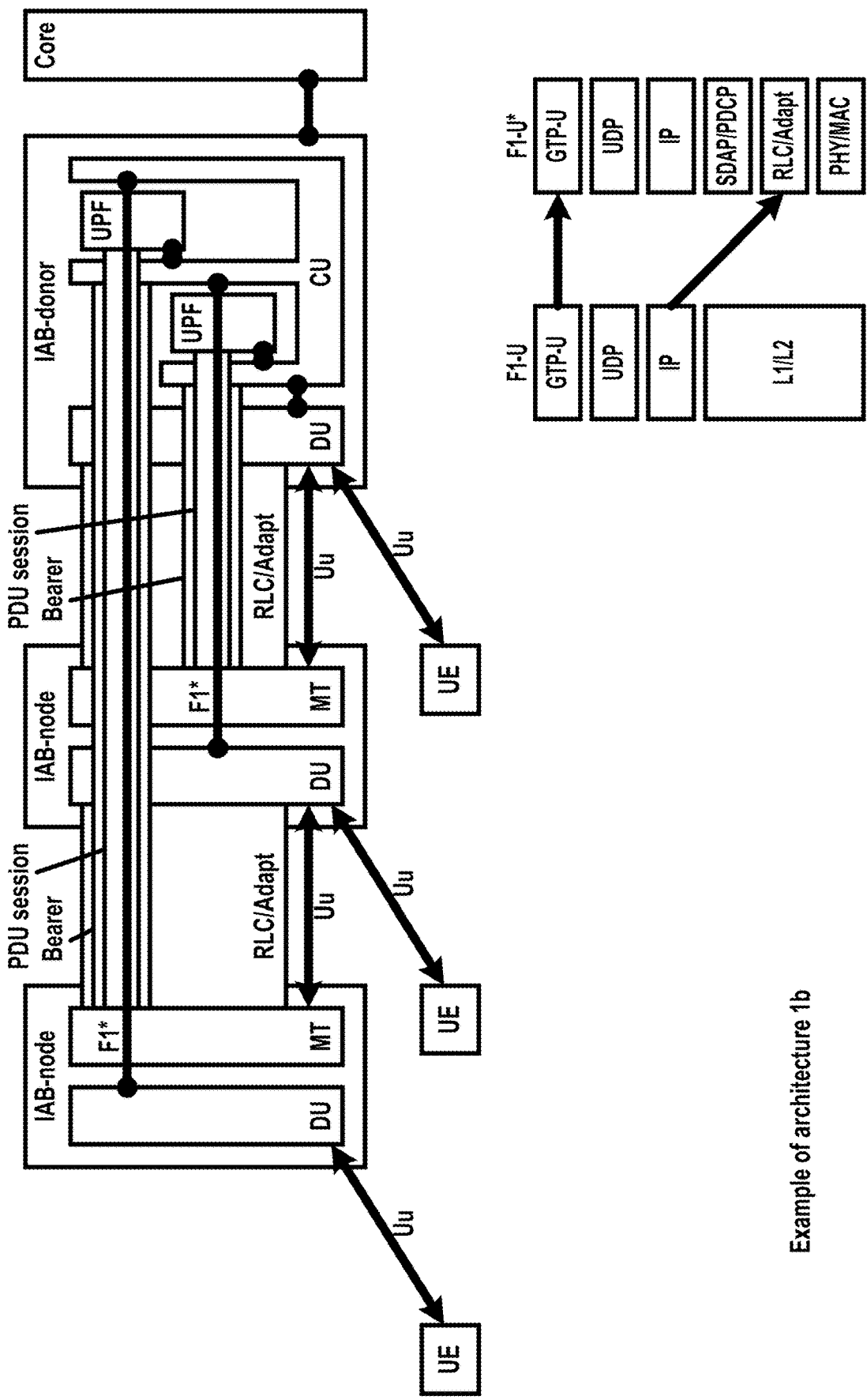
FIG. 19 is an example diagram of an aspect of an embodiment of the present disclosure.

In an example, architecture 1b may leverage CU/DU-split architecture. FIG. 19 shows an example diagram for a two-hop chain of IAB-nodes underneath an IAB-donor. An IAB-donor may hold one logical CU. An IAB node may connect to more than one upstream IAB-node and/or IAB-donor. In an example of architecture 1b, an IAB-node and/or an IAB-donor may hold the same functions as in architecture 1a. In an example, as in architecture 1a, a backhaul link may establish an RLC-channel. In architecture 1b, an adaptation layer may be inserted to enable hop-by-hop forwarding of F1*.

In an example of architecture 1b, an MT on an IAB-node may establishes a PDU session with a UPF residing on a donor (IAB-donor). MT's PDU session may carry F1* for a collocated DU. In an example, a PDU session may provide a point-to-point link between CU and DU. On intermediate hops, PDCP-PDUs of F1* may be forwarded via adaptation layer. FIG. 19 shows an example of an F1*-U protocol stack. For NSA operation with core network, an MT may be dual-connected with networks (e.g. gNB, eNB, RNC, core network). IAB-node's MT may sustain a PDN connection with a local gateway (L-GW) residing on the donor.

Figure 20:
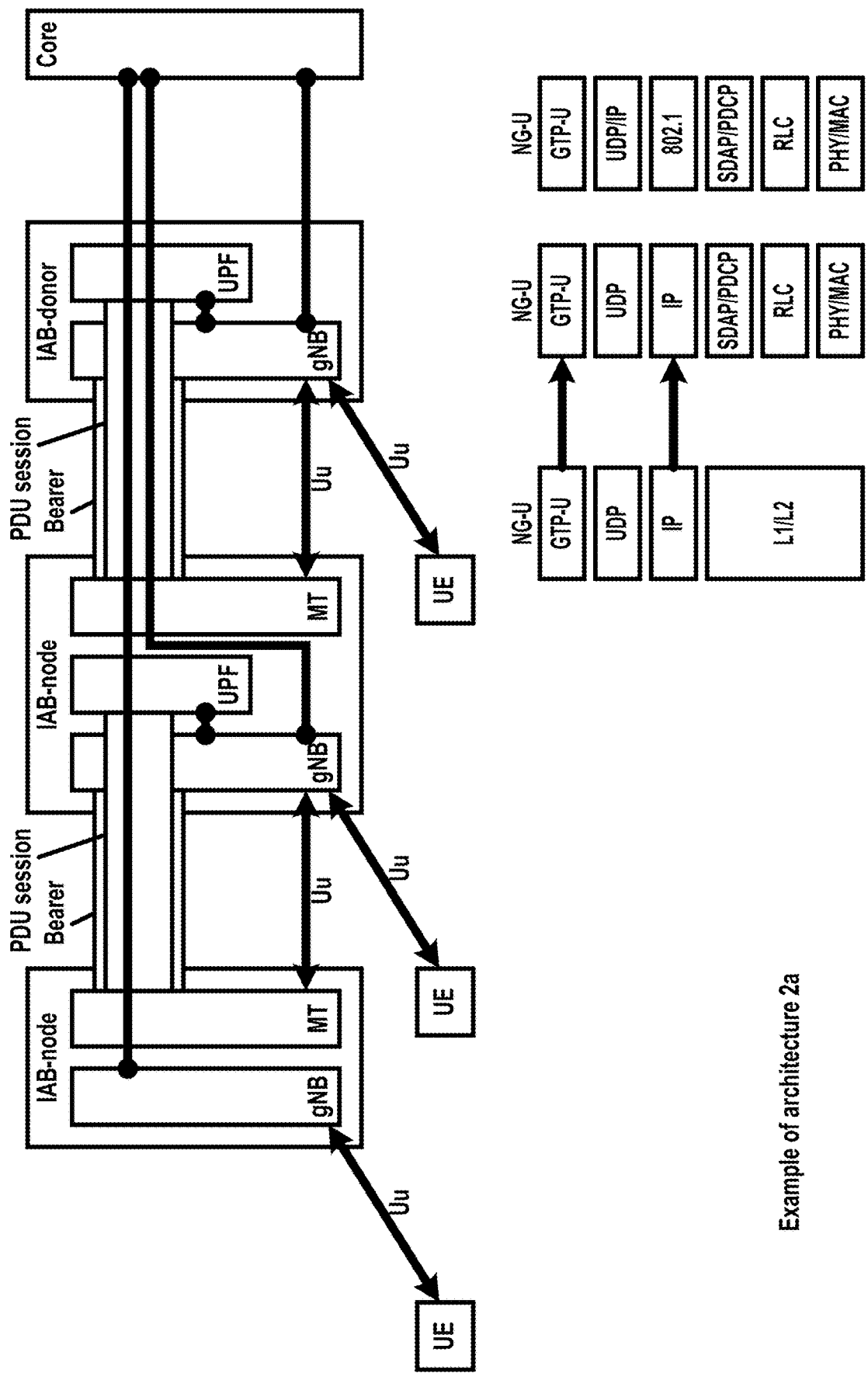
FIG. 20 is an example diagram of an aspect of an embodiment of the present disclosure.

FIG. 20 shows an example diagram for architecture 2a, where UE and/or IAB-node may use SA-mode with core network. In an example, of architecture 2a, an IAB-node may hold an MT to establish a Uu link with a gNB (base station) on a parent IAB-node and/or IAB-donor. Via a Uu link, an MT may sustain a PDU session with a UPF that may by collocated with a gNB. An independent PDU session may be created on a backhaul link (e.g. hop-by-hop). An IAB-node may support a routing function to forward data between PDU sessions of adjacent links. A routing function may create a forwarding plane across a wireless backhaul. Based on PDU session type, a forwarding plane may support IP and/or Ethernet. In case that PDU-session type is Ethernet, an IP layer may be established on top. An IAB-node may obtain IP connectivity to a wireline backhaul network. An IAB node may connect to more than one upstream IAB-node and/or IAB-donor.

In an example of architecture 2a, IP-based interfaces (e.g. NG, Xn, F1, N4, etc.) may be carried over a forwarding plane. In case of F1, a UE-serving IAB-node may contain a DU for access links in addition to a gNB and/or UPF for backhaul links. A CU for access links may reside in or beyond an IAB Donor. FIG. 20 shows an example of an NG-U protocol stack for IP-based and/or for Ethernet-based PDU-session type. In case that an IAB-node holds a DU for UE-access, PDCP-based protection on a hop may not be required since end user data may be protected using end to end PDCP between a UE and a CU. For NSA operation with core network, an MT may be dual-connected with networks (e.g. gNB, eNB, RNC, core network). IAB-node's MT may sustain a PDN-connection with a L-GW residing on a parent IAB-node and/or an IAB-donor. IP-based interfaces (e.g. NG, Xn, S1, S5, X2, etc.) may be carried over a forwarding plane.

Figure 21:
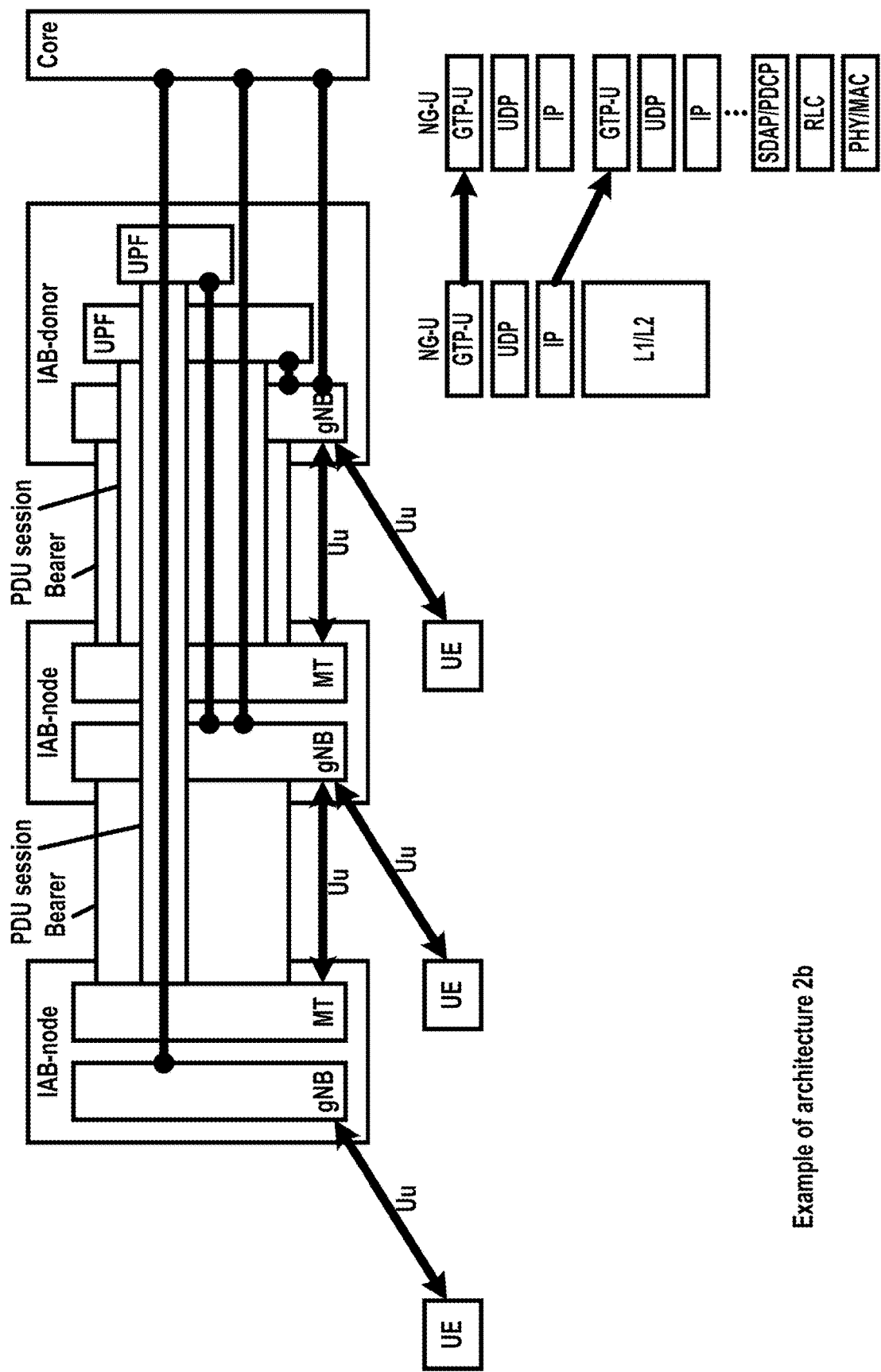
FIG. 21 is an example diagram of an aspect of an embodiment of the present disclosure.

In an example of architecture 2b, as shown in FIG. 21, an IAB-node may hold an MT to establish a Uu link with a gNB (base station) on a parent IAB-node and/or IAB-donor. Via a Uu link, an MT may sustain a PDU session with a UPF. A UPF may be located at an IAB-donor. Forwarding of PDUs across upstream IAB-nodes may be accomplished via tunneling. Forwarding across multiple hops may create a stack of nested tunnels. An IAB-node may obtain IP-connectivity to a wireline backhaul network. IP-based interfaces (e.g. NG, Xn, F1, N4, etc.) may be carried over a forwarding IP plane. FIG. 21 shows a protocol stack example for NG-U (e.g. S1-U). An IAB node may connect to more than one upstream IAB-node and/or IAB-donor. For NSA operation with core network, an MT may be dual-connected with networks (e.g. gNB, eNB, RNC, core network). IAB-node's MT may sustain a PDN-connection with a L-GW residing on an IAB-donor.

Figure 22:
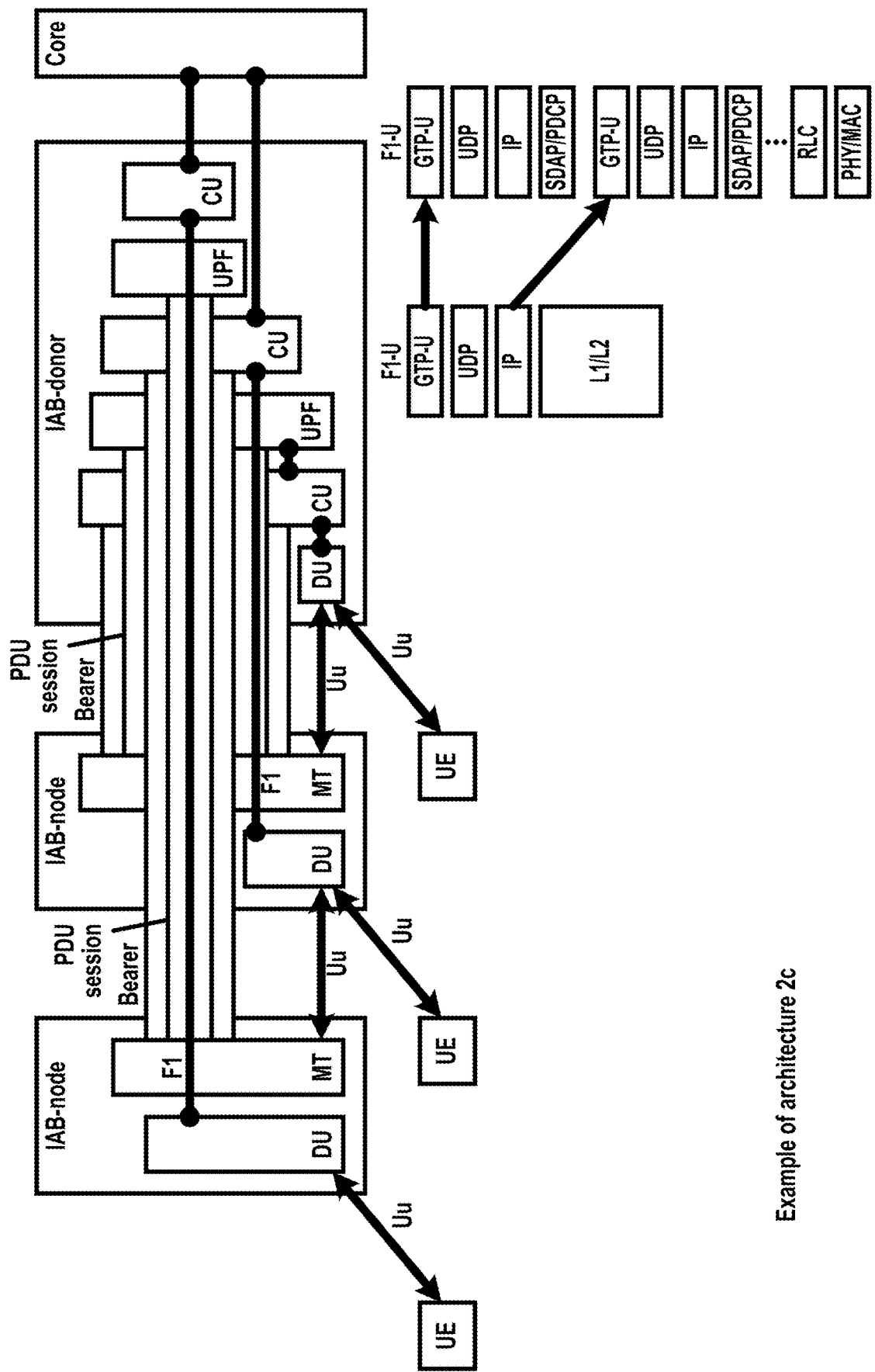
FIG. 22 is an example diagram of an aspect of an embodiment of the present disclosure.

In an example, as shown in FIG. 22, architecture 2c may leverage DU-CU split. An IAB-node may hold an MT which may sustain an RLC-channel with a DU on a parent IAB-node and/or IAB-donor. An IAB donor may hold a CU and/or a UPF for IAB-node's DU. An MT on an IAB-node may sustain a Uu link with a CU and/or a PDU session with a UPF on a donor (IAB-donor). Forwarding on intermediate nodes may be accomplished via tunneling. Forwarding across multiple hops may create a stack of nested tunnels. An IAB-node may obtain IP-connectivity to wireline backhaul network. A tunnel may include an SDAP/PDCP layer. IP-based interfaces (e.g. NG, Xn, F1, N4, etc.) may be carried over a forwarding plane. FIG. 22 shows a protocol stack example for NG-U (e.g. S1-U). An IAB node may connect to more than one upstream IAB-node and/or IAB-donor. For NSA operation with core network, an MT may be dual-connected with networks (e.g. gNB, eNB, RNC, core network). IAB-node's MT may sustain a PDN-connection with a L-GW residing on an IAB-donor.

In an example, an IAB node may follow the same initial access procedure as an UE (e.g. wireless device), comprising cell search, system information (SI) acquisition, and/or random access, to initially set up a connection to a parent IAB-node and/or a IAB-donor. An SSB/CSI-RS based RRM measurement may be supported for IAB-node discovery and/or measurement. In an example, an inter IAB-node discovery procedure subject to half-duplex constraint and/or multi-hop topologies may be supported, including how to avoid conflicting SSB configurations among IAB-nodes and/or feasibility of CSI-RS based IAB-node discovery. When considering a cell ID used by a given IAB-node, IAB-donor and IAB-node may share the same cell ID, and/or IAB-donor and IAB-node may maintain separate cell IDs. Feasibility of sharing the same cell ID by IAB-donor and IAB-node may depend on IAB architectures. Mechanisms for multiplexing of RACH transmissions from UEs and RACH transmissions from IAB-nodes may be supported.

In an example, measurements on multiple backhaul links for link management and/or route selection may be supported. To support a half-duplex constraint in an IAB-node, IAB may support detection and/or measurement of candidate backhaul links (e.g. after initial access), which may utilize resources that may be orthogonal in time from those used by access UEs for cell detection and/or measurement. To support measurement, IAB may support at least one of: TDM of SSBs (e.g. depending on hop order, cell ID, etc.); SSB muting across IAB-nodes; multiplexing of SSBs for access UEs and IABs within a half-frame and/or across half-frames; additional IAB-node discovery signal which may be TDM with SSB transmissions (e.g. CSI-RS), use of off-raster SSBs; different transmission periodicity for backhaul link detection and/or measurement compared to the periodicity used by access UEs; and/or the like. Coordination mechanisms for different solutions may be supported, including mechanisms for coordination of reference signal (RS) transmission and/or measurement occasions for IAB-nodes. Enhancements of SMTC and/or CSI-RS configurations to support RRM measurement for IAB-nodes may be considered.

In an example, an IAB-node may support mechanisms for detecting/recovering from backhaul link failure. Enhancements to RLM RS and/or associated procedures for IAB may be supported.

In an example, mechanisms for route switching and/or transmission/reception on multiple backhaul links simultaneously (e.g. multi-TRP operation and/or intra-frequency dual connectivity) may be supported. Feasibility of those mechanisms may depend on IAB architectures.

In an example, downlink IAB node transmissions (e.g. transmissions on backhaul links from an IAB-node to child IAB-nodes served by the IAB-node and transmissions on access links from an IAB-node to UEs served by the IAB-node) may be scheduled by an IAB-node. In an example, uplink IAB transmission (e.g. transmissions on a backhaul link from an IAB-node to its parent IAB-node and/or IAB-donor) may be scheduled by a parent IAB-node or an IAB-donor.

In an example, IAB may support time division multiplexing (TDM), frequency division multiplexing (FDM), and/or space division multiplexing (SDM) between access and backhaul links at an IAB-node, e.g. subject to a half-duplex constraint. Mechanisms for TDM/FDM/SDM multiplexing of access/backhaul traffic across multiple hops may consider an IAB node half-duplex constraint. In an example, IAB may support mechanisms for orthogonal partitioning of time slots and/or frequency resources between access and backhaul links across one or multiple hops. IAB may provide utilization of different DL/UL slot configurations for access and backhaul links. IAB may support DL and/or UL power control enhancements and/or timing requirements to allow for intra-panel FDM and/or SDM of backhaul and access links. In an example, IAB may provide interference management including cross-link interference.

In an example, IAB may provide mechanisms for scheduling coordination, resource allocation, and/or route selection across IAB-nodes/IAB-donors and/or multiple backhaul hops. Semi-static (e.g. on the timescale of RRC signaling) may be supported for resource (e.g. frequency, time in terms of slot/slot format, etc.) coordination between IAB-nodes. In an example, IAB may support distributed and/or centralized resource coordination mechanisms. IAB may support various resource granularity of required signaling (e.g. TDD configuration pattern). IAB-nodes and/or IAB-donors may exchange information of L1 and/or L3 measurements. In an example, IAB-nodes and/or IAB-donors may exchange topology related information (e.g. hop order) based on the backhaul link physical layer design. IAB may support may support resource (e.g. frequency, time in terms of slot/slot format, etc.) coordination which may be faster than semi-static coordination.

In an example, over-the-air (OTA) synchronization may be configured for IAB. In an example, IAB may support mechanism to adjust timing alignment of IAB-nodes. IAB may support detection and management of timing misalignment (e.g. depending on the number of hops). In an example, IAB may implement mechanisms for timing alignment across multi-hop IAB networks. IAB may support TA-based synchronization between IAB-nodes, including across multiple backhaul hops. In an example, IAB may support various cases of transmission timing alignment across IAB-nodes and/or IAB-donors: DL transmission timing alignment across IAB-nodes and/or IAB-donors; DL and UL transmission timing aligned within an IAB-node; DL and UL reception timing aligned within an IAB-node; timing alignment within an IAB-node when transmitting DL and UL and receiving DL and UL; DL transmission timing alignment across IAB-nodes and/or IAB-donors for access link; and/or timing alignment within an IAB-node when transmitting DL and UL and receiving DL and UL for backhaul link timing in different time slots.

In an example, levels of timing alignment between IAB-nodes/IAB-donors and/or within an IAB-node may comprise slot-level alignment, symbol-level alignment, and/or no alignment. IAB implementation for TDM/FDM/SDM multiplexing of access and backhaul links, cross-link interference, and/or access UEs may be supported.

In an example, IAB may control cross-link interference (CLI) on access and backhaul links (including across multiple hops) by providing interference measurement and management mechanisms.

In an example, IAB CLI mitigation techniques may support advanced receivers and transmitter coordination. CLI mitigation techniques may support interference mitigation mechanisms for inter IAB-node interference scenarios, for example: victim IAB-node is receiving in DL via its MT, interfering IAB-node is transmitting in UL via its MT; victim IAB-node is receiving in DL via its MT, interfering IAB-node is transmitting in DL via its DU; victim IAB-node is receiving in UL via its DU, interfering IAB-node is transmitting in UL via its MT; and/or victim IAB-node is receiving in UL via its DU, interfering IAB-node is transmitting in DL via its DU. IAB may implement mechanisms to resolve interference experienced at the IAB-node in case of FDM/SDM reception between access and backhaul links at an IAB-node. In an example, IAB may support CLI measurements, e.g. short-term/long term measurements, and/or multiple-antenna and beamforming based measurements, and may support CLI mitigation in IAB-nodes and/or IAB-donors.

IAB may support wireless backhaul links with high spectral efficiency. In an example, IAB may support 1024QAM for the backhaul link.

In an example, UE may establish RLC channels to a DU on UE's access IAB node. RLC-channels may be extended via a modified form of F1-U, referred to as F1*-U, between UE's access DU and an IAB donor. Information embedded in F1*-U may be carried over RLC-channels across backhaul links. Transport of F1*-U over a wireless backhaul may be enabled by an adaptation layer, which may be integrated with the RLC channel. An IAB-donor (referred to as fronthaul) may use F1-U stack. An IAB-donor DU may relay between F1-U on a fronthaul and/or F1*-U on a wireless backhaul.

In an example of architecture 1a, information carried on an adaptation layer may support one or more functions of: identification of a UE-bearer for the PDU, routing across a wireless backhaul topology, QoS-enforcement by a scheduler on DL and UL on a wireless backhaul link, mapping of UE user-plane PDUs to backhaul RLC channels, and/or the like.

In an example of architecture 1b, information carried on the adaptation layer may support one or more functions of: routing across a wireless backhaul topology, QoS-enforcement by a scheduler on DL and UL on a wireless backhaul link, mapping of UE user-plane PDUs to backhaul RLC channels, and/or the like.

In an example, information to be carried on an adaptation layer header may comprise one or more of: UE-bearer-specific Id, UE-specific Id, Route Id, IAB-node, IAB-donor address, QoS information, and/or the like.

In an example, information on an adaptation layer may be processed to support adaptation layer functions on an on-path IAB-node (e.g. hop-by-hop) and/or on UE's access-IAB-node and an IAB-donor (e.g. end-to-end).

Figure 23:
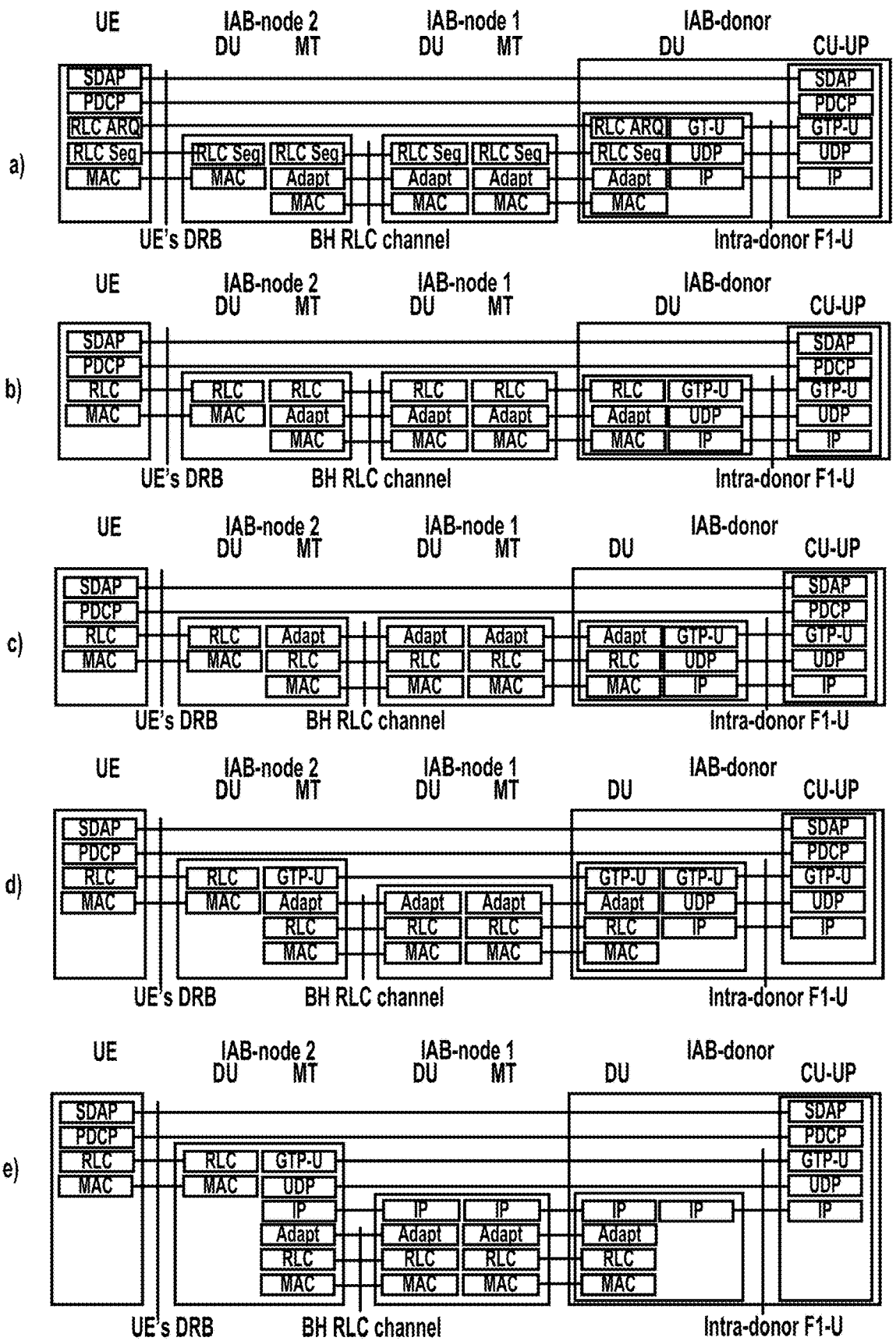
FIG. 23 is an example diagram of an aspect of an embodiment of the present disclosure.

In an example, an adaptation layer may be integrated with MAC layer or above MAC layer, as shown in FIG. 23 (e.g. a, b). In an example, an adaptation layer may be integrated with above RLC layer, as shown in FIG. 23 (e.g. c, d, e) and/or FIG. 24.

Figure 24:
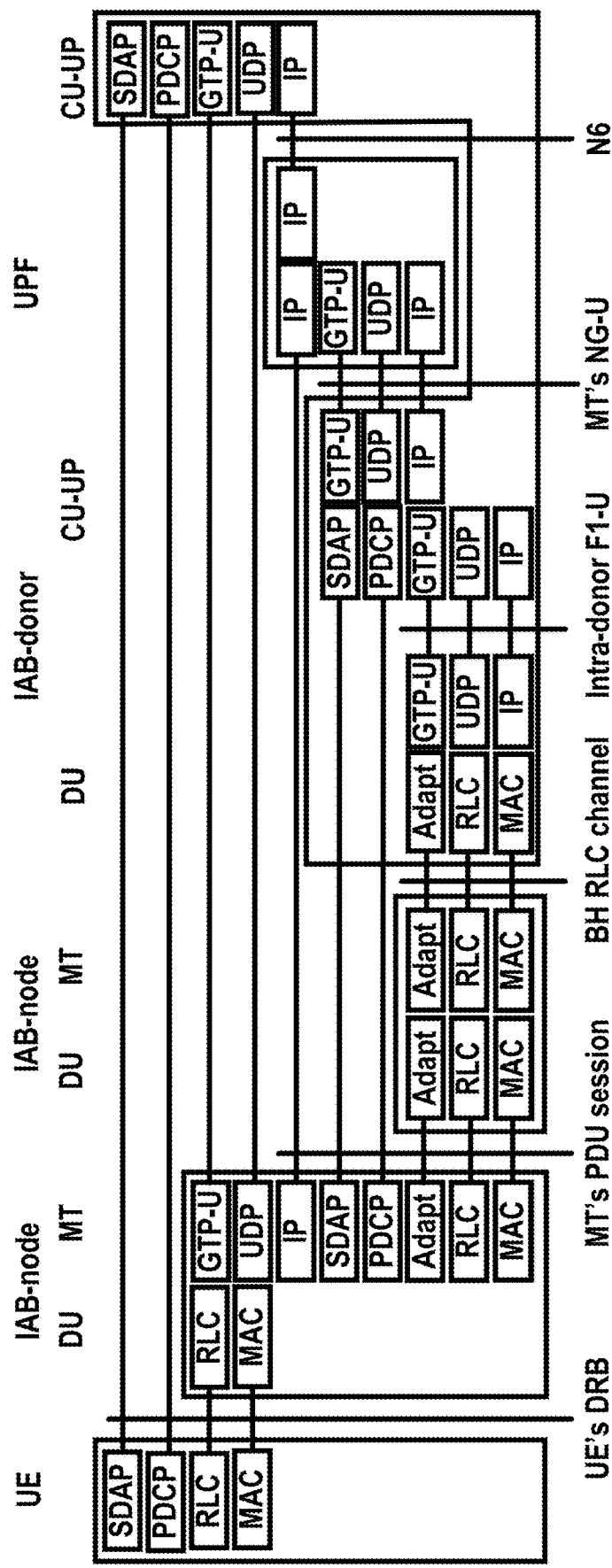
FIG. 24 is an example diagram of an aspect of an embodiment of the present disclosure.

In an example, FIG. 23 and/or FIG. 24 show example protocol stacks. While RLC channels serving for backhauling include an adaptation layer, an adaptation layer may be included in IAB-node access links.

In an example, an adaptation layer may comprise sublayers. A GTP-U header may become a part of an adaptation layer. In an example, a GTP-U header may be carried on top of an adaptation layer to carry end-to-end association between an IAB-node DU and a CU (e.g. as shown in FIG. 23 d).

In an example, an IP header may be part of an adaptation layer and/or carried on top of an adaptation layer (e.g. as shown in FIG. 23 e). In an example, an IAB-donor DU may hold an IP routing function to extend an IP-routing plane of a fronthaul to an IP-layer carried by adapt on a wireless backhaul. This may allow native F1-U to be established end-to-end, e.g. between IAB-node DUs and IAB-donor CU-UP. An IAB-node may hold an IP-address, which may be routable from a fronthaul via an IAB-donor DU. IAB-nodes' IP addresses may be used for routing on a wireless backhaul. An IP-layer on top of adapt may not represent a PDU session. MT's first hop router on an IP-layer may not hold a UPF.

In an example, an above-RLC adaptation layer may support hop-by-hop ARQ. An above-MAC adaptation layer may support both hop-by-hop and end-to-end ARQ. In an example, both adaptation layer placements may support aggregated routing, e.g. by inserting an IAB-node address into an adaptation header. In an example, both adaptation layer placements may support per-UE-bearer QoS for a large number of UE-bearers. In an example, for above-RLC adaptation layer, an LCID space may be enhanced since a UE-bearer may be mapped to an independent logical channel. In an example, for above-MAC adaptation layer, UE-bearer-related info may be carried on an adaptation header. In an example, both adaptation layer placements may support aggregated QoS handling e.g. by inserting an aggregated QoS Id into an adaptation header. In an example, aggregated QoS handling may reduce the number of queues. An aggregated QoS handling may be independent on where an adaptation layer is placed. In an example, for both adaptation layer placements, aggregation of routing and/or QoS handling may allow proactive configuration of inter-mediate on-path IAB-nodes, i.e. configuration may be independent of UE-bearer establishment/release. In an example, for both adaptation layer placements, RLC ARQ may be pre-processed on TX side.

In an example, for RLC AM, ARQ may be conducted hop-by-hop along access and backhaul links. ARQ may be supported end-to-end between UE and IAB-donor. RLC segmentation may be a just-in-time process, and/or it may be conducted in a hop-by-hop manner.

A type of multi-hop RLC ARQ and adaptation-layer placement may have interdependence: for end-to-end ARQ, adaptation layer may be integrated with MAC layer or placed above MAC layer; and/or hop-by-hop ARQ may or may not have interdependence.

In an example, different IAB architecture options may have impact on scheduling and/or QoS in downlink and/or uplink directions. In an example, adaptation layer may be placed above an RLC and/or above a MAC.

In an example, control plane (CP) signaling across wireless backhaul-link may use the same routing and/or QoS enforcement mechanisms as for user plane (UP) traffic. Priorities and/or QoS requirements of CP signaling may be different from UP traffic.

In an example, signaling between an MT on an IAB-node and a central unit control plan (CU-CP) on an IAB-donor may use RRC protocol. Signaling between DU on an IAB-node and a CU-CP on an IAB-donor may use an F1-AP protocol. IAB specific enhancements to RRC and F1-AP may be supported.

In an example, RRC and F1-AP connections may be secured over wireless backhaul links. An RRC connection may have at least the same level of protection on a wireless backhaul link as on an access link. In an example, an F1-AP connection may have at least the same level of protection on a wireless backhaul link as an RRC connection. In an example, the same level of protection for F1-AP as for RRC may be supported.

In an example, for CP signaling protection: PDCP may be used to protect RRC; and/or PDCP may be employed to protect F1-AP over a wireless backhaul. CP signaling protection based on using NDS may be supported.

In an example of architecture 1a, UE's and/or MT's UP and/or RRC traffic may be protected via PDCP over a wireless backhaul. A CP protection mechanism may be defined to protect F1-AP traffic over a wireless backhaul.

Figure 25:
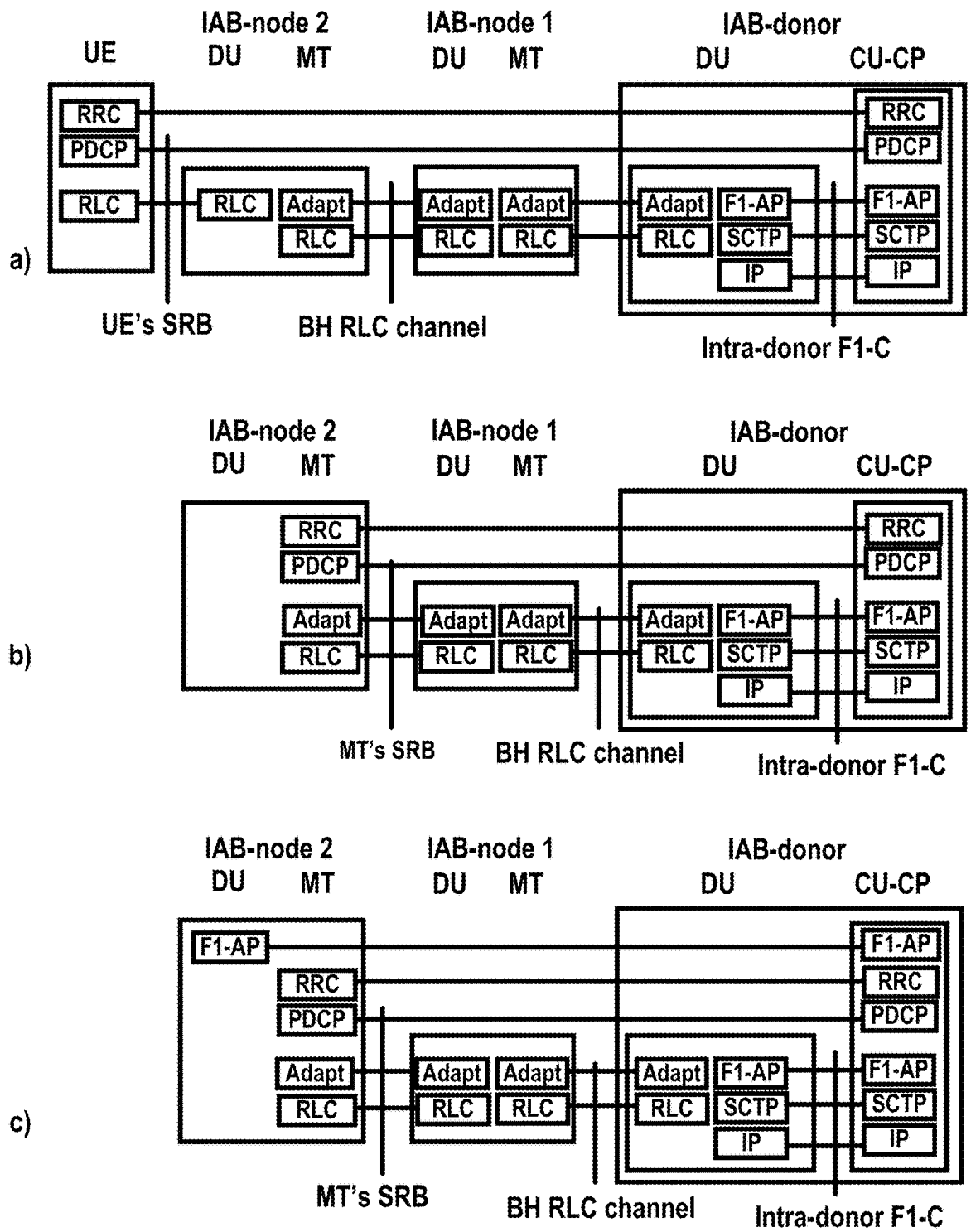
FIG. 25 is an example diagram of an aspect of an embodiment of the present disclosure.

In an example, for alternative 1 of architecture 1a, FIG. 25 shows protocol stacks for UE's RRC, MT's RRC, and/or DU's F1-AP. In an example, an adaptation layer may be placed on top of RLC. On IAB-node's access link, an adaptation layer may or may not be included. In an example of alternative 1 of architecture 1a, UE's and/or MT's RRC may be carried over SRB. On UE's and/or MT's access link, SRB may use an RLC-channel. On wireless backhaul links, SRB's PDCP layer may be carried over RLC-channels with adaptation layer. An adaptation layer placement in an RLC channel may be the same for C-plane as for U-plane. Information carried on an adaptation layer may be different for signaling radio bearer (SRB) than for data radio bearer (DRB). DU's F1-AP may be encapsulated in RRC of a collocated MT. F1-AP may be protected by PDCP of an underlying SRB. An IAB-donor may use native F1-C stack.

Figure 26:
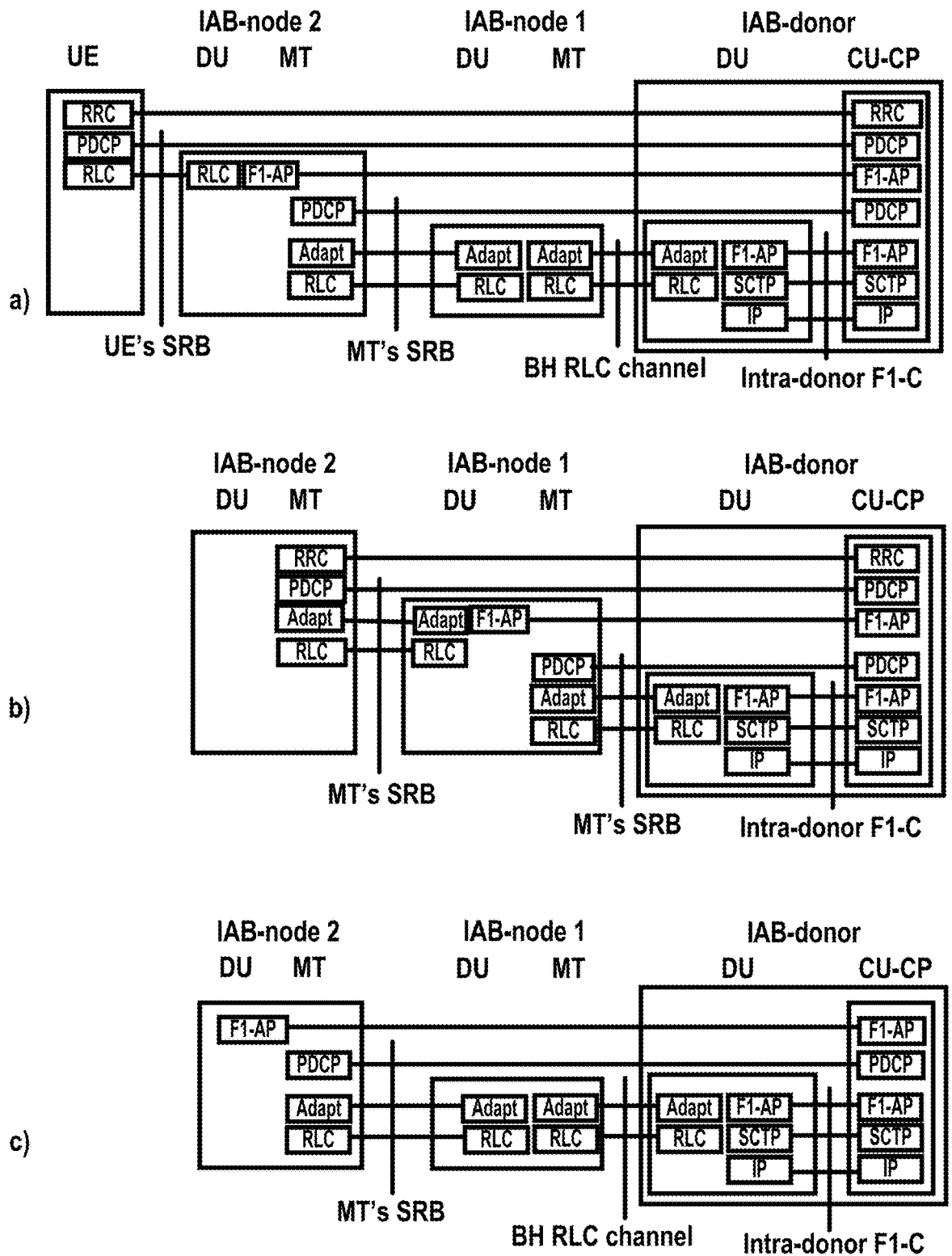
FIG. 26 is an example diagram of an aspect of an embodiment of the present disclosure.

In an example, for alternative 2 of architecture 1a, FIG. 26 shows protocol stacks for UE's RRC, MT's RRC, and/or DU's F1-AP. In an example, an adaptation layer may reside on top of RLC. On IAB-node's access link, an adaptation layer may or may not be included. In an example of alternative 2 of architecture 1a, UE's and/or MT's RRC may be carried over SRB. On UE's and/or MT's access link, an SRB may use an RLC-channel. On a wireless backhaul link, PDCP of RRC's SRB may be encapsulated into F1-AP. DU's F1-AP may carried over an SRB of a collocated MT. F1-AP may be protected by this SRB's PDCP. On wireless backhaul links, PDCP of F1-AP's SRB may be carried over RLC-channels with adaptation layer. An adaptation layer placement in an RLC channel may be the same for C-plane as for U-plane. Information carried on an adaptation layer may be different for SRB than for DRB. An IAB-donor may use native F1-C stack.

Figure 27:
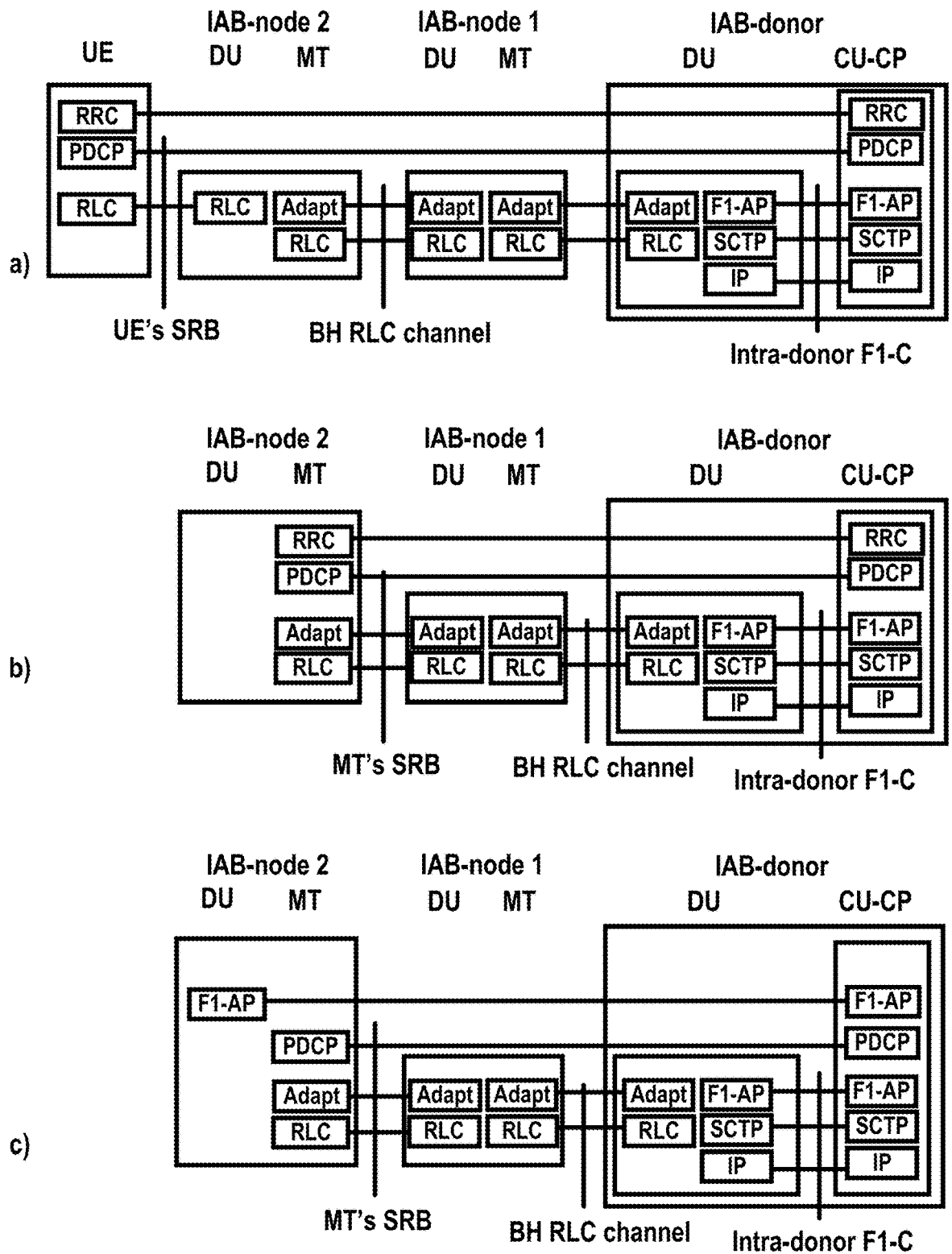
FIG. 27 is an example diagram of an aspect of an embodiment of the present disclosure.

In an example, for alternative 3 of architecture 1a, FIG. 27 shows protocol stacks for UE's RRC, MT's RRC, and/or DU's F1-AP. In an example, an adaptation layer may reside on top of RLC. On IAB-node's access link, an adaptation layer may or may not be included. In an example of alternative 3 of architecture 1a, UE's and/or the MT's RRC may be carried over SRB. On UE's and/or MT's access link, RRC's SRB may use an RLC-channel. On wireless backhaul links, SRB's PDCP layer may be carried over RLC-channels with adaptation layer. An adaptation layer placement in an RLC channel may be the same for C-plane as for U-plane. Information carried on an adaptation layer may be different for SRB than for DRB. DU's F1-AP may be carried over an SRB of a collocated MT. F1-AP may be protected by SRB's PDCP. On wireless backhaul links, PDCP of an SRB may be carried over RLC-channels with adaptation layer. An IAB-donor may use native F1-C stack.

Figure 28:
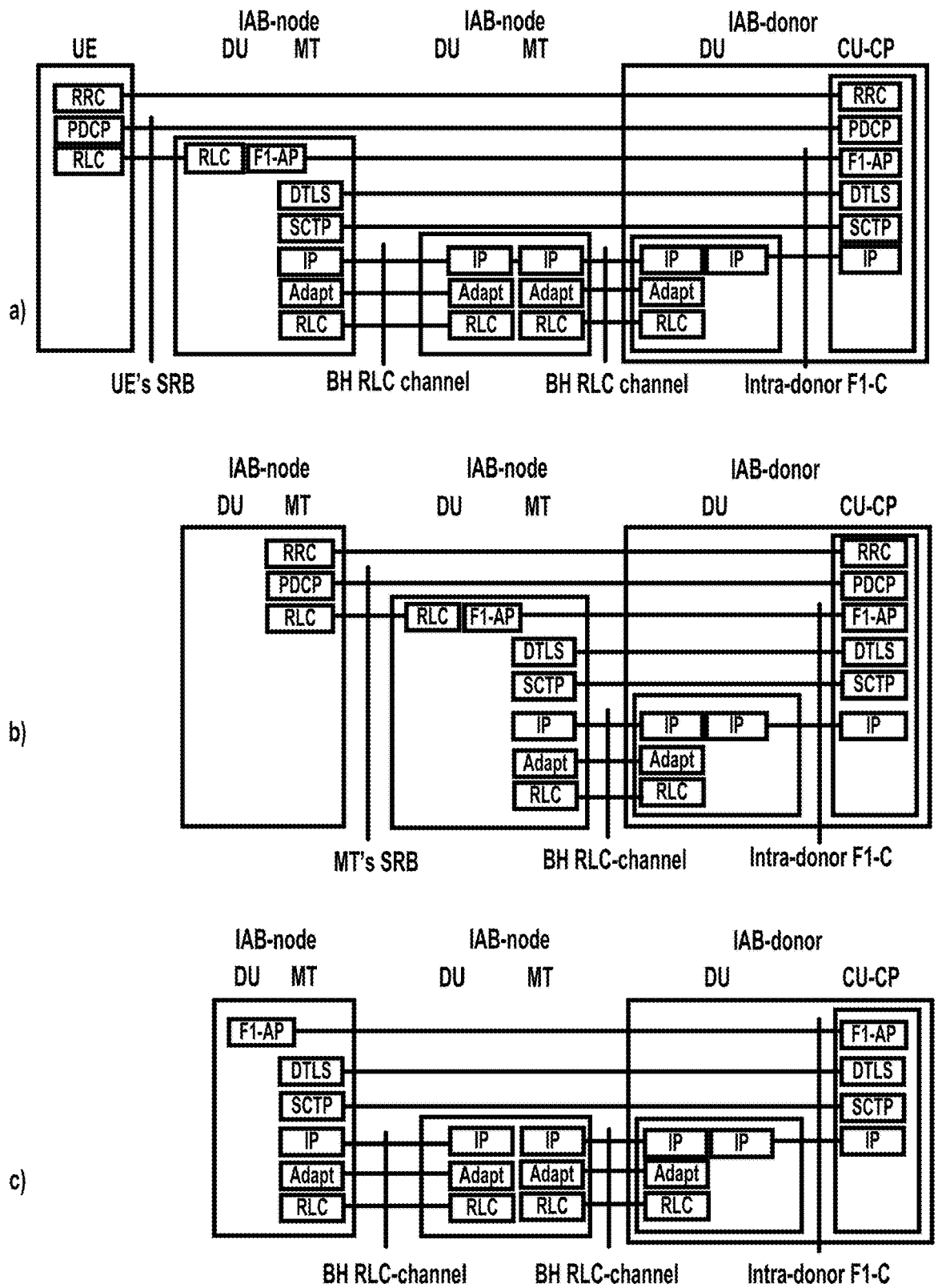
FIG. 28 is an example diagram of an aspect of an embodiment of the present disclosure.

In an example, for alternative 4 of architecture 1a, FIG. 28 shows protocol stacks for UE's RRC, MT's RRC, and/or DU's F1-AP. In an example, an adaptation layer may reside on top of RLC and/or may carry an IP-layer. In an example of alternative 4 of architecture 1a, an IP-layer carried by adapt may be connected to fronthaul's IP-plane through a routing function at an IAB-donor DU. On an IP-layer, IAB-nodes may hold IP-addresses, which may be routable from an IAB-donor CU-CP. An extended IP-plane may allow native F1-C to be used between IAB-node DU and IAB-donor CU-CP. Signaling traffic may be prioritized on an IP routing plane using DSCP markings. F1-C may be protected via NDS, e.g. via D-TLS. UE's and/or MT's RRC may use SRB, which may be carried over F1-C.

Figure 29:
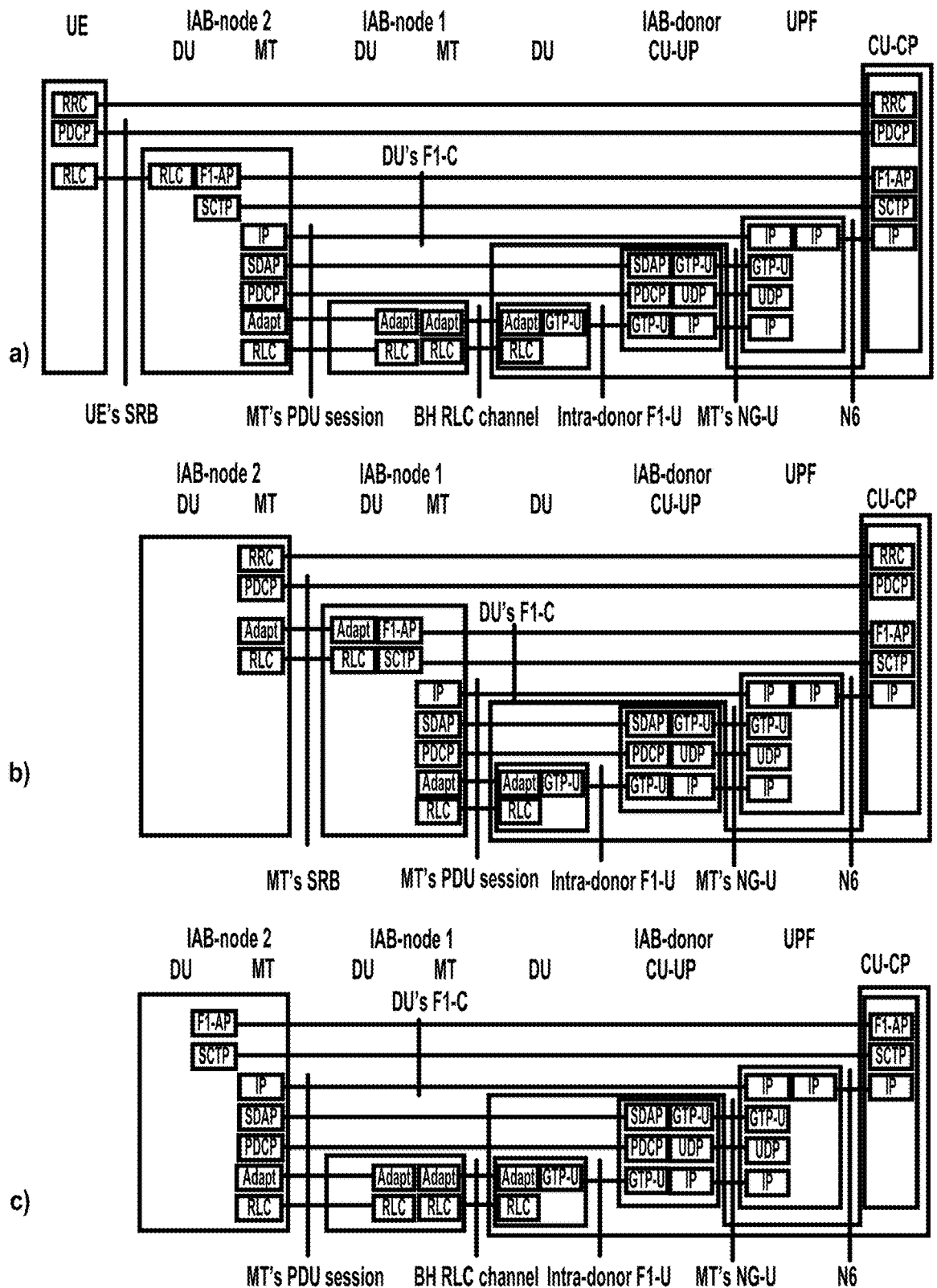
FIG. 29 is an example diagram of an aspect of an embodiment of the present disclosure.

In an example, for an alternative of architecture 1b, FIG. 29 shows protocol stacks for UE's RRC, MT's RRC, and/or DU's F1-AP. In an example, an adaptation layer carrying DRB's PDCP may reside on top of RLC. On IAB-node's access link, an adaptation layer may or may not be included. In an example of an alternative of architecture 1b, UE's and/or MT's RRC may be carried over SRB. On a wireless backhaul, SRB's PDCP may be carried over native F1-C. DUs on IAB-node and/or IAB-donor may use native F1-C stack. Over wireless backlinks, an IP-layer of native F1-C stack may be provided by a PDU session. A PDU-session may be established between an MT collocated with a DU and/or a UPF. A PDU session may be carried by a DRB between an MT and a CU-UP. Between CU-UP and UPF, a PDU-session may be carried via NG-U. IP transport between UPF and CU-CP may be provided by PDU-session's DN. IP transport may be protected. Protection of F1-C transport across a DN between UPF and CU-CP may be supported.

In an example, IAB topologies may comprise a spanning tree (ST) and/or a directed acyclic graph (DAG). Directionality of Uu-backhaul link, defined by uplink and downlink, may be aligned with the hierarchy of ST and/or DAG. For ST, an IAB-node may have one parent node, which may be an IAB-node and/or an IAB-donor. For ST, an IAB-node may be connected to one IAB-donor at a time, and/or one route may exist between IAB-node and IAB-donor. For DAG, an IAB-node may be multi-connected, i.e., an IAB-node may have links to multiple parent nodes. For DAG, an IAB-node may have multiple routes to a node, e.g. an IAB-donor. For DAG, an IAB-node may have redundant routes to a node via multiple parents. In an example, multi-connectivity (e.g. dual-connectivity) and/or route redundancy may be used. Redundant routes may be used concurrently, e.g., to achieve load balancing, reliability, etc.

Figure 30:
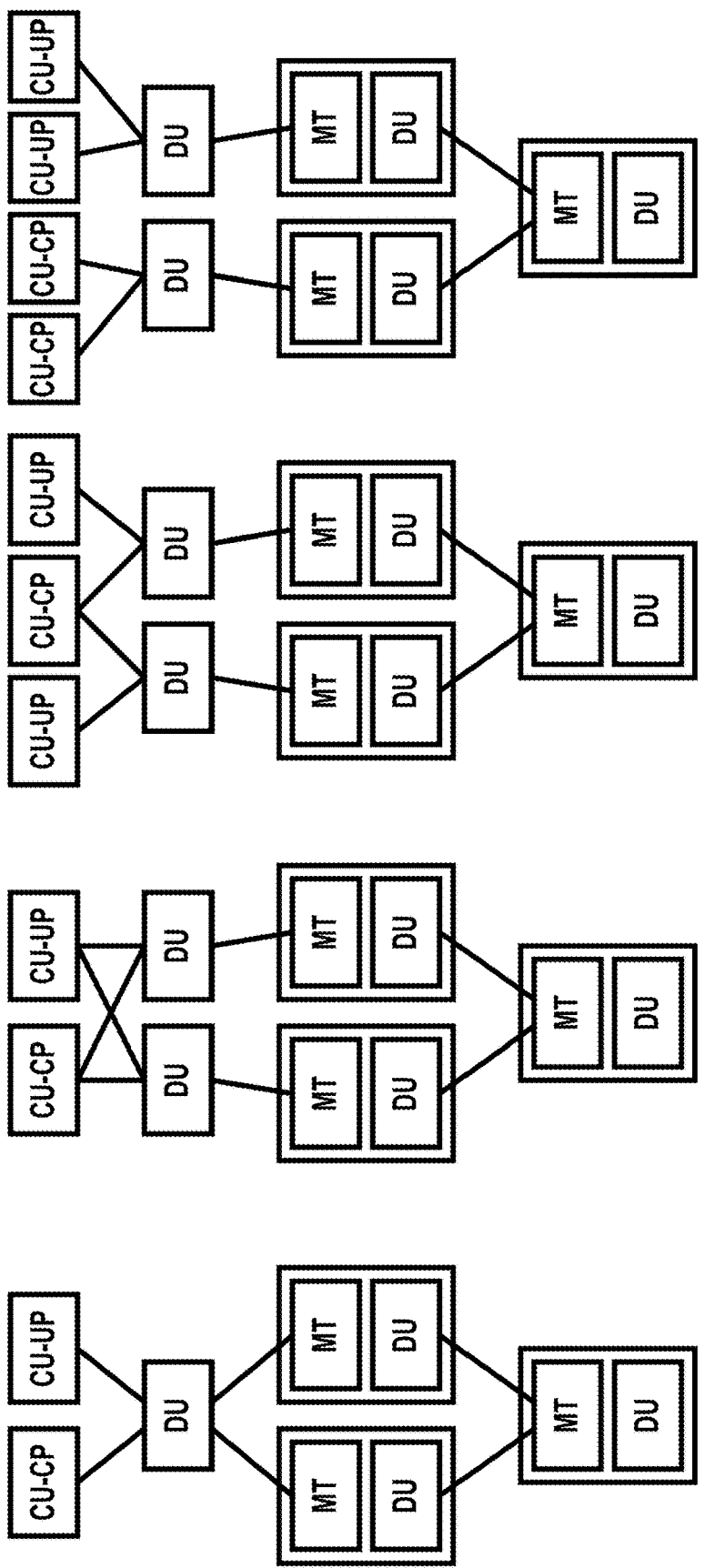
FIG. 30 is an example diagram of an aspect of an embodiment of the present disclosure.

In an example, for architecture group 1, as shown in FIG. 30, routes for an IAB-node may pertain to: the same IAB-donor DU, and the same IAB-donor CU-CP and CU-UP (FIG. 30 a); different IAB-donor DUs, and same IAB-donor CU-CP and CU-UP (FIG. 30 b); different IAB-donor DUs, different IAB-donor CU-UP, and same IAB-donor CU-CP (FIG. 30 3); different IAB-donor DUs, CU-CP and CU-UP (FIG. 30 d).

Figure 31:
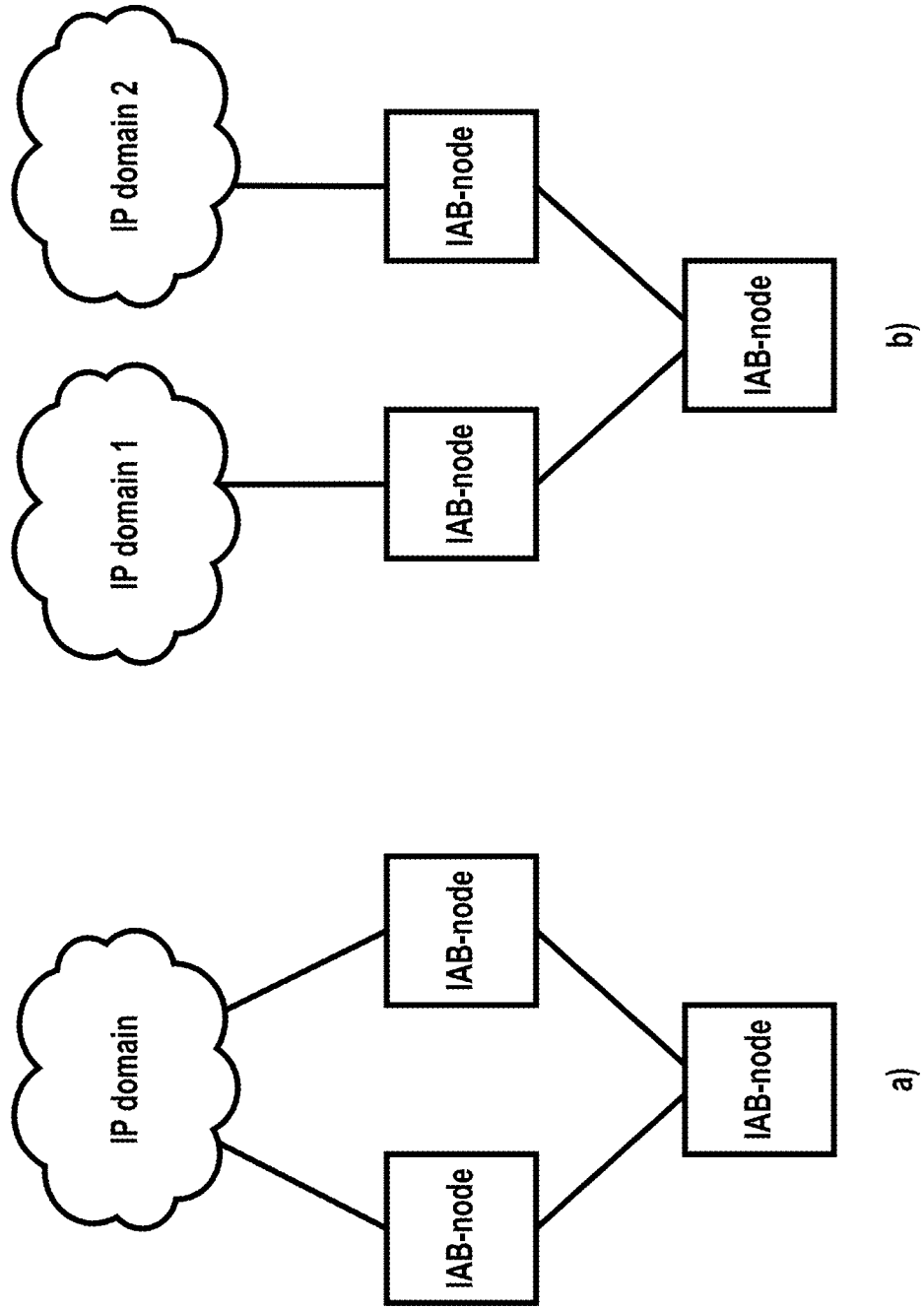
FIG. 31 is an example diagram of an aspect of an embodiment of the present disclosure.

In an example, for architecture group 2, as shown in FIG. 31, routes for an IAB-node may pertain to the same IP domain and/or different IP domains. For at least some of these topologies, IP address management and/or procedures for topology adaptation may be supported.

In an example, an IAB-node may authenticate with operator's network and/or may establish IP connectivity to reach OAM functionality for OAM configuration. The authentication phase may comprise discovery and/or selection of a serving node, which may be an IAB-donor and/or an IAB-node. An IAB-node may retrieve IAB information, e.g. from OAM and/or via RAN signaling such as OSI or RRC. The authentication phase may comprise setting up connectivity to RAN nodes and/or core network (CN). The authentication phase may involve an MT function on an IAB-node.

In an example, IAB-node's DU, gNB, and/or UPF may be set up together with interfaces to RAN-nodes and/or CN. The interface setting-up phase may be performed before an IAB node start serving UEs and/or before IAB-nodes connect. In an example, for architectures 1a and 1b, the interface setting-up phase may comprise setup of IAB-node's DU and/or F1-establishment to IAB-donor's CU-CP and/or CU-UP. In an example, for architecture 2a, the interface setting-up phase may comprise setup of IAB-node's gNB and/or UPF, and/or integration into PDU session forwarding layer across a wireless backhaul. In an example, the interface setting-up phase may comprise IAB-node's integration into topology and/or route management.

In an example, an IAB-node may provide service to UEs and/or to integrated IAB-nodes. UEs may or may not distinguish access to the IAB-node from access to gNBs (e.g. eNBs, RAN).

In an example, IAB architectures of IAB-donor DU and/or IAB-donor CU may be based on CU/DU architectures of a gNB (e.g. RAN). Modifications to the IAB-node DU that supports F1*-U over a wireless backhaul may be supported.

Figure 32:
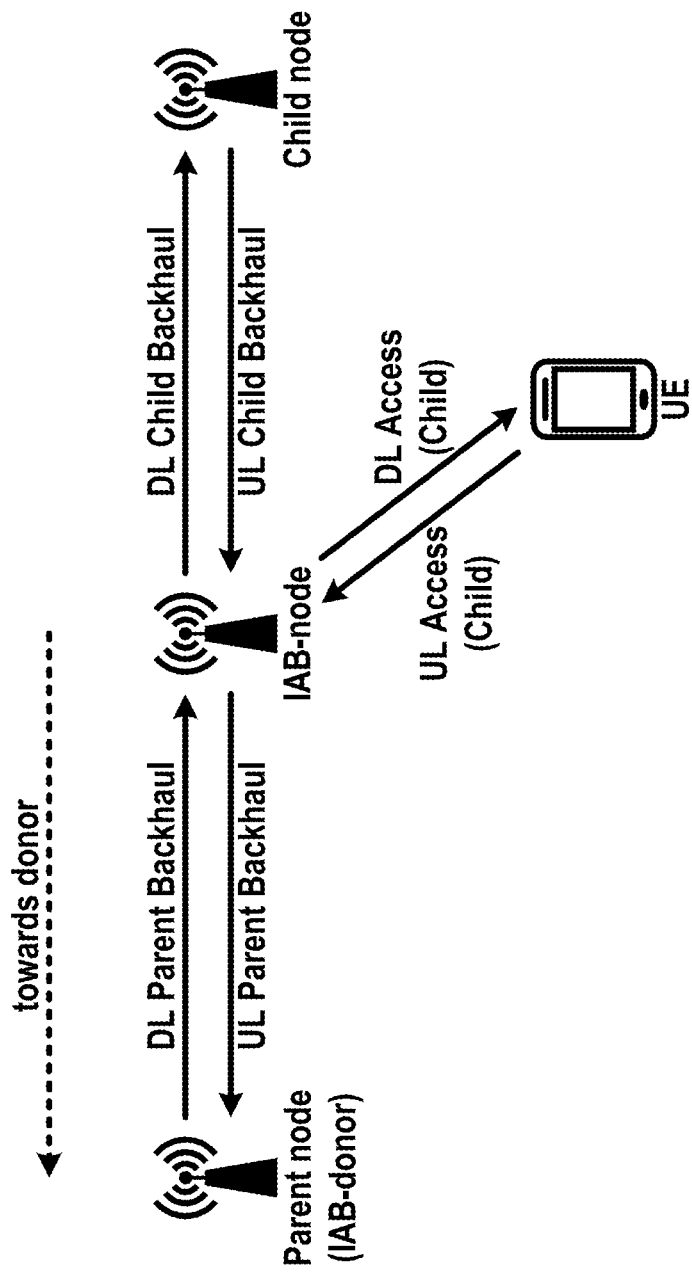
FIG. 32 is an example diagram of an aspect of an embodiment of the present disclosure.

In an example, as shown in FIG. 32, an IAB-node has connections with a parent node, child node and/or a wireless device (e.g. UE). An IAB-node may be connected to IAB-donor (e.g. parent node of the IAB-node) via a downlink parent backhaul (e.g. F1 interface, NG interface, S1 interface, Uu interface, Xn interface) and/or an uplink parent backhaul (e.g. F1 interface, NG interface, S1 interface, Uu interface, Xn interface). An IAB-node may be connected to a child node of the IAB-node via a downlink child backhaul (e.g. F1 interface, NG interface, S1 interface, Uu interface, Xn interface) and/or an uplink child backhaul (e.g. F1 interface, NG interface, S1 interface, Uu interface, Xn interface). An IAB-node may be connected to a wireless device via a downlink access (e.g. Uu interface) and/or an uplink access (e.g. Uu interface).

Example Architecture

Figure 33:
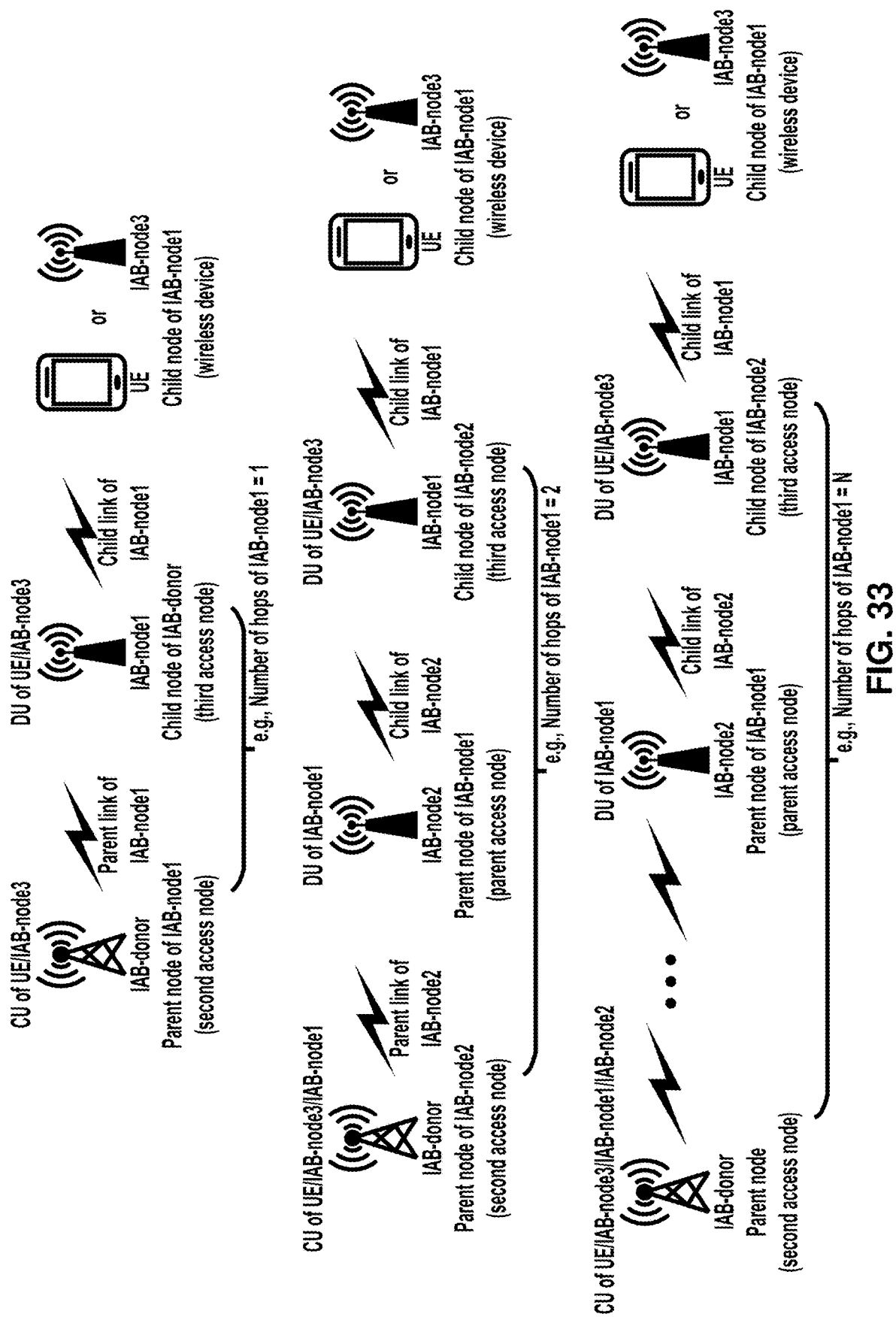
FIG. 33 is an example diagram of an aspect of an embodiment of the present disclosure.
Figure 34:
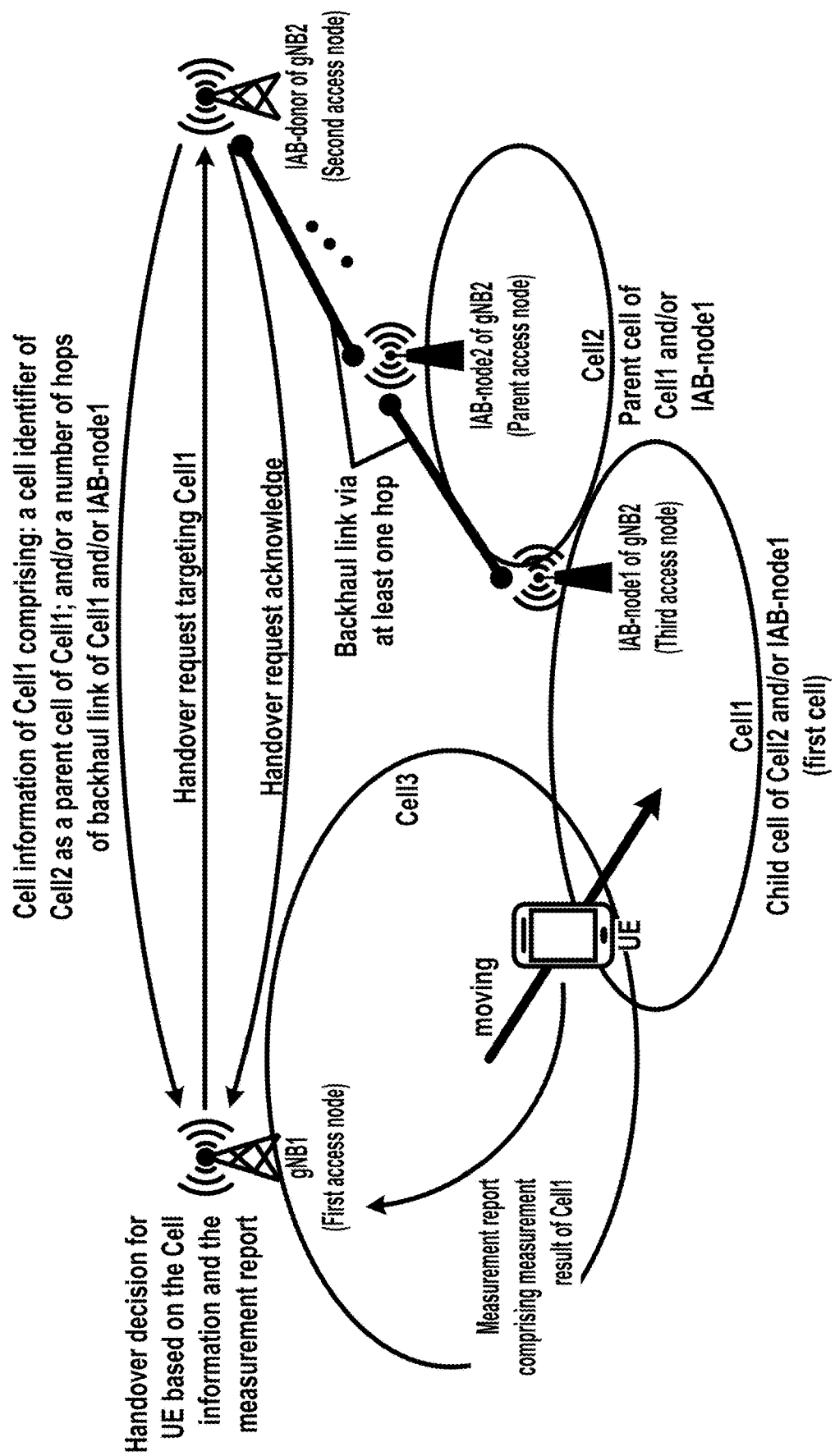
FIG. 34 is an example diagram of an aspect of an embodiment of the present disclosure.
Figure 35:
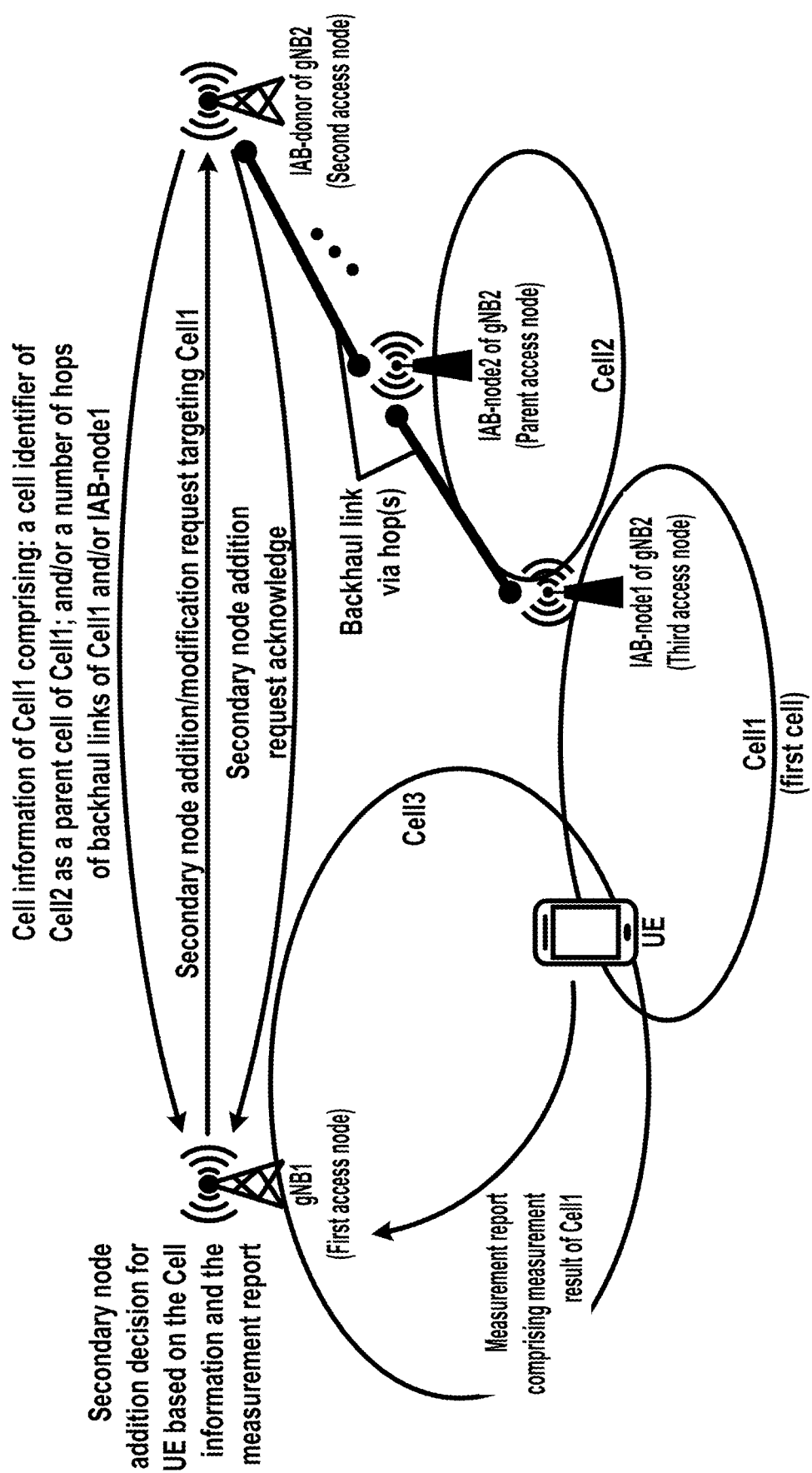
FIG. 35 is an example diagram of an aspect of an embodiment of the present disclosure.

In an example, as shown in FIG. 33, FIG. 34, and/or FIG. 35, a first access node may be a base station (e.g., a gNB, an eNB, a base station central unit, a gNB-CU, a base station distributed unit, a gNB-DU, a relay node, a relay donor node, a donor node, an IAB-donor, an IAB-node, etc.). In an example, a second access node may be an IAB-donor (e.g., a base station, a gNB, an eNB, a base station central unit, a gNB-CU, a base station distributed unit, a gNB-DU, a relay node, a relay donor node, a donor node, an IAB-node, etc.). In an example, a third access node may be an IAB-node (e.g., a gNB, an eNB, a base station distributed unit, a gNB-DU, a base station central unit, a gNB-CU, a relay node, a relay donor node, a donor node, an IAB-donor, mobile termination (MT), UE, etc.). In an example, the first access node and the second access node may be directly or indirectly connected to each other (e.g., via Xn interface, X2 interface, one or more N2 interfaces, one or more S1 interfaces, one or more F1 interfaces, etc.). In an example, the second access node may directly or indirectly serve the third access node. The second access node may serve the third access node via a child link of the second access node and/or via a backhaul link (e.g., at least one backhaul link) of the third access node. In an example, the child link of the second access node and/or the backhaul link of the third access node may comprise at least one of one or more radio interfaces, one or more cells directly or indirectly served by the second access node, F1 interface, Uu interface, RRC layer communication, adapt/PDCP layer communication protocol, RLC/MAC/physical layer communication protocol, Xn interface, X2 interface, N2 interface, S1 interface, one or more child cells served by the second access node, and/or the like.

In an example, the second access node may comprise at least one of: an integrated access and backhaul donor (IAB-donor); and/or at least one integrated access and backhaul node (IAB-node). The second access node may comprise at least one of: a base station central unit (e.g., gNB-CU) of at least one wireless device served by the first cell; and/or a base station (e.g., gNB, eNB) of at least one wireless device served by the first cell. In an example, the backhaul link (e.g. the at least one backhaul link) may comprise one or more integrated access and backhaul nodes (IAB-nodes). The third access node may be an integrated access and backhaul node (IAB-node). The third access node may comprise at least one of: a base station distributed unit (e.g., gNB-DU) of at least one wireless device served by the first cell; and/or a base station (e.g., gNB, eNB) of at least one wireless device served by the first cell. In an example, a serving cell of the third access node may be a serving cell of the second access node.

In an example, the backhaul link of the third access node may connect the third access node to the second access node. The backhaul link of the third access node may comprise a first number of hops. In an example, a number of hops of a backhaul link between two nodes may be determined based on a number of (e.g., concatenate) radio links between the two nodes. In an example, a number of hops of a backhaul link between two nodes may be a number of (e.g., concatenate) radio links between the two nodes. In an example, a number of hops of a backhaul link between two nodes may be determined based on a number of (e.g., concatenate) access nodes between the two nodes. In an example, a number of hops of a backhaul link between two nodes may be a number of (e.g., concatenate) access nodes (e.g., IAB-nodes, base stations, base station distributed units, MAC entities, PHY entities, etc.) between the two nodes or a number of (e.g., concatenate) access nodes between the two nodes plus 1 (e.g., a number of hops between two nodes: N, a number of access nodes between the two nodes: M, N=M+1).

In an example, the first number of hops of the backhaul link of the third access node may be (e.g., and/or be determined based on) a number of (e.g., concatenate) radio links between the third access node and the second access node. In an example, the first number of hops of the backhaul link of the third access node may be (e.g., and/or be determined based on) a number of (e.g., concatenate) access nodes (e.g., IAB-nodes, base stations, base station distributed units, MAC entities, PHY entities, etc.) between the third access node and the second access node or a number of (e.g., concatenate) access nodes between the third access node and the second access node plus 1 (e.g., the first number of hops of the backhaul link of the third access node: N, a number of access nodes between the third access node and the second access node: M, N=M+1). In an example, the first number of hops of the backhaul link of the third access node may be N. In an example, the backhaul link of the third access node may comprise a parent access node of the third access node. In an example, the parent access node may serve the third access node via one or more cells. The one or more cells serving the third access node may be a parent cell of the third access node. In an example, the first cell of the third access node may or may not employ a same carrier (e.g., in-band, intra-carrier, same band, wholly or partially overlapping bandwidth) to a carrier employed by the one or more cells (e.g., the parent cell of the third access node) of the parent access node. The parent access node may be an IAB-node (e.g., a gNB, an eNB, a base station distributed unit for the third access node, a gNB-DU for the third access node, a base station central unit, a gNB-CU, a relay node, a relay donor node, a donor node, an IAB-donor, mobile termination (MT), UE, etc.).

In an example, the third access node may serve (e.g., control, operate) a first cell. The third access node may provide, for the first cell, at least one of a transmission/reception point, a physical layer, and/or a MAC layer (e.g., further provide an RLC layer, an adapt layer, a PDCP layer, an SDAP layer, and/or RRC layer). The second access node may provide radio resources for the first cell. In an example, the second access node may indirectly or directly serve the first cell via the third access node. In an example, the second access node is the third access node. If the second access node is the third access node, the first number of hops of the backhaul link of the third access node may be 0 or 1. If the second access node is the third access node, the second access node may directly serve the first cell.

EXAMPLE EMBODIMENTS

Figure 37:
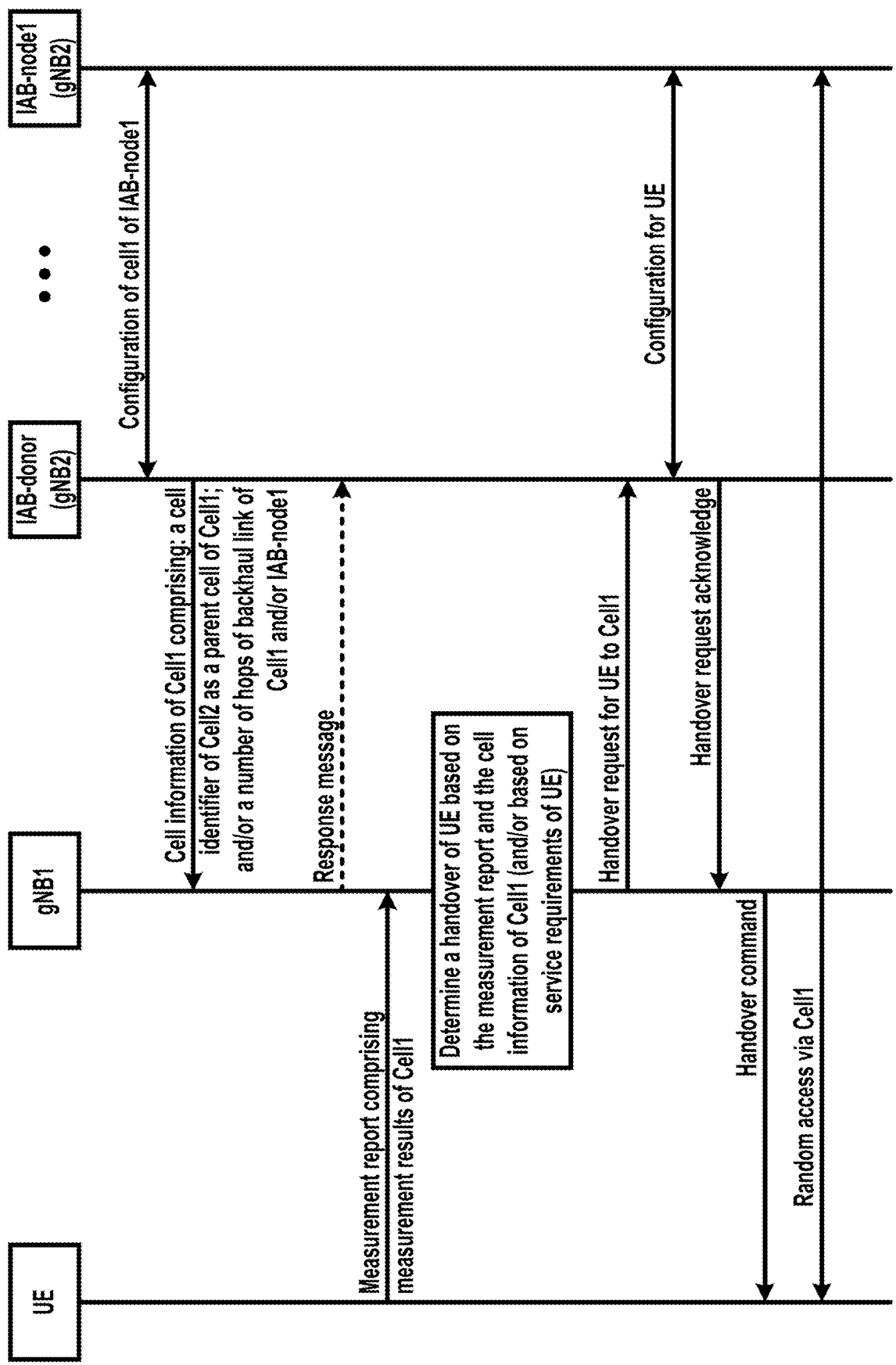
FIG. 37 is an example diagram of an aspect of an embodiment of the present disclosure.

In an example, as shown in FIG. 37, the first access node may receive, from the second access node, at least one configuration message. The at least one configuration message may comprise configuration parameters of the first cell of the second access node (e.g., the first cell served by the third access node). The configuration parameters may comprise at least one of: an identifier (e.g., cell global identifier, CGI, physical cell identifier, PCI, carrier index, carrier identifier, etc.) indicating the first cell; and/or backhaul information of the backhaul link (e.g., the at least one backhaul link) between the second access node and the third access node serving the first cell (e.g., backhaul link information of the backhaul link of the first cell). In an example, the first access node may receive the at least one configuration message via an interface (e.g., Xn interface, X2 interface, one or more N2 interfaces, one or more S1 interfaces, one or more F1 interfaces, etc.) between the first access node and the second access node.

Figure 38:
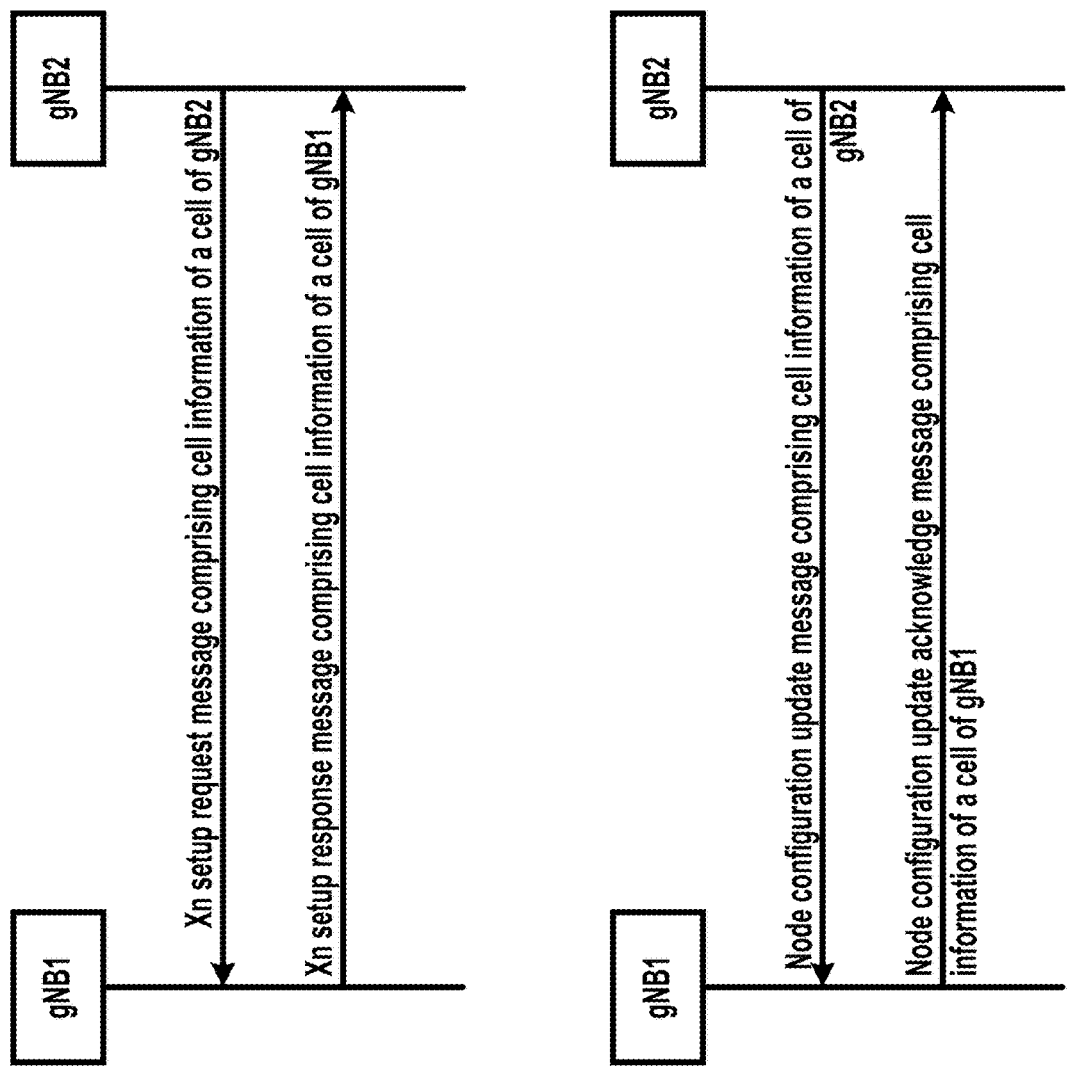
FIG. 38 is an example diagram of an aspect of an embodiment of the present disclosure.

In an example, as shown in FIG. 38, the at least one configuration message may comprise at least one of: an Xn setup request message (e.g., X2 setup request message), an Xn setup response message (e.g., X2 setup response message), an NG-RAN node configuration update message (e.g., base station configuration update message, gNB/eNB configuration update message), an NG-RAN node configuration update acknowledge message (e.g., base station configuration update acknowledge message, gNB/eNB configuration update acknowledge message), a load information message, a resource status update message, and/or the like. In an example, the at least one configuration message may comprise at least one of: an F1 setup request message, an F1 setup response message, a node configuration update message, a node configuration update acknowledge message, a load information message, a resource status update message, and/or the like.

Figure 39:
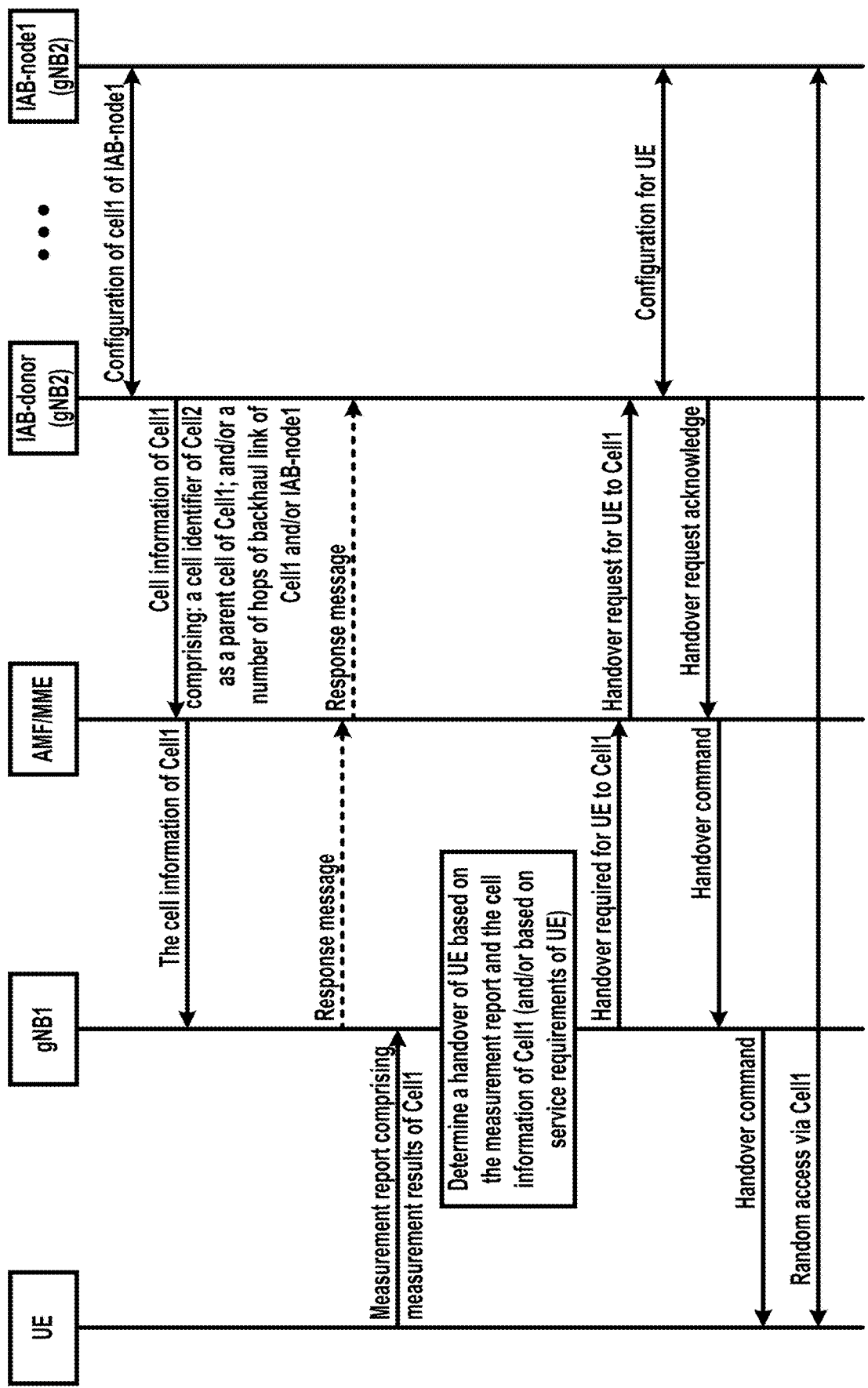
FIG. 39 is an example diagram of an aspect of an embodiment of the present disclosure.
Figure 40:
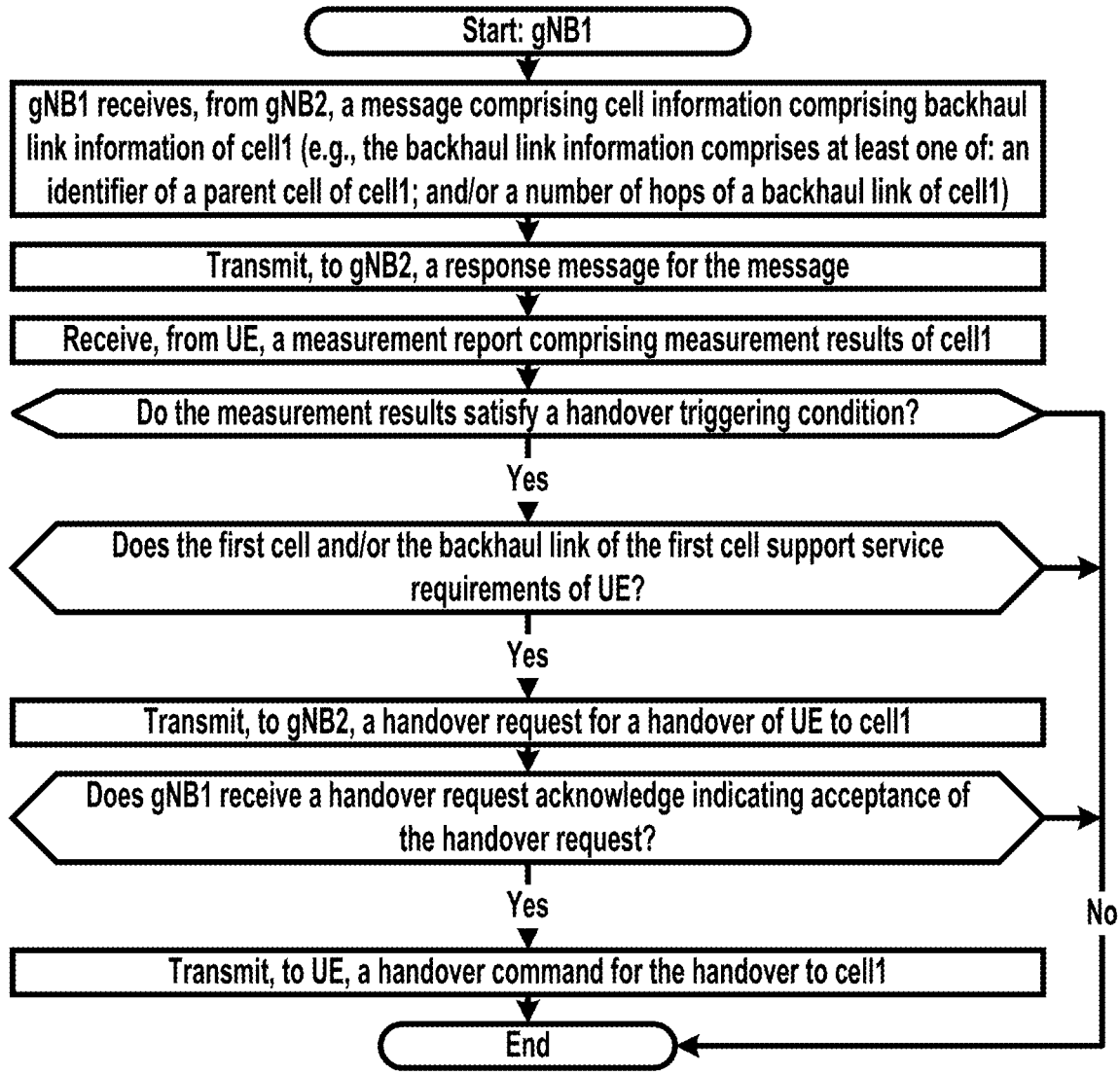
FIG. 40 is an example diagram of an aspect of an embodiment of the present disclosure.
Figure 41:
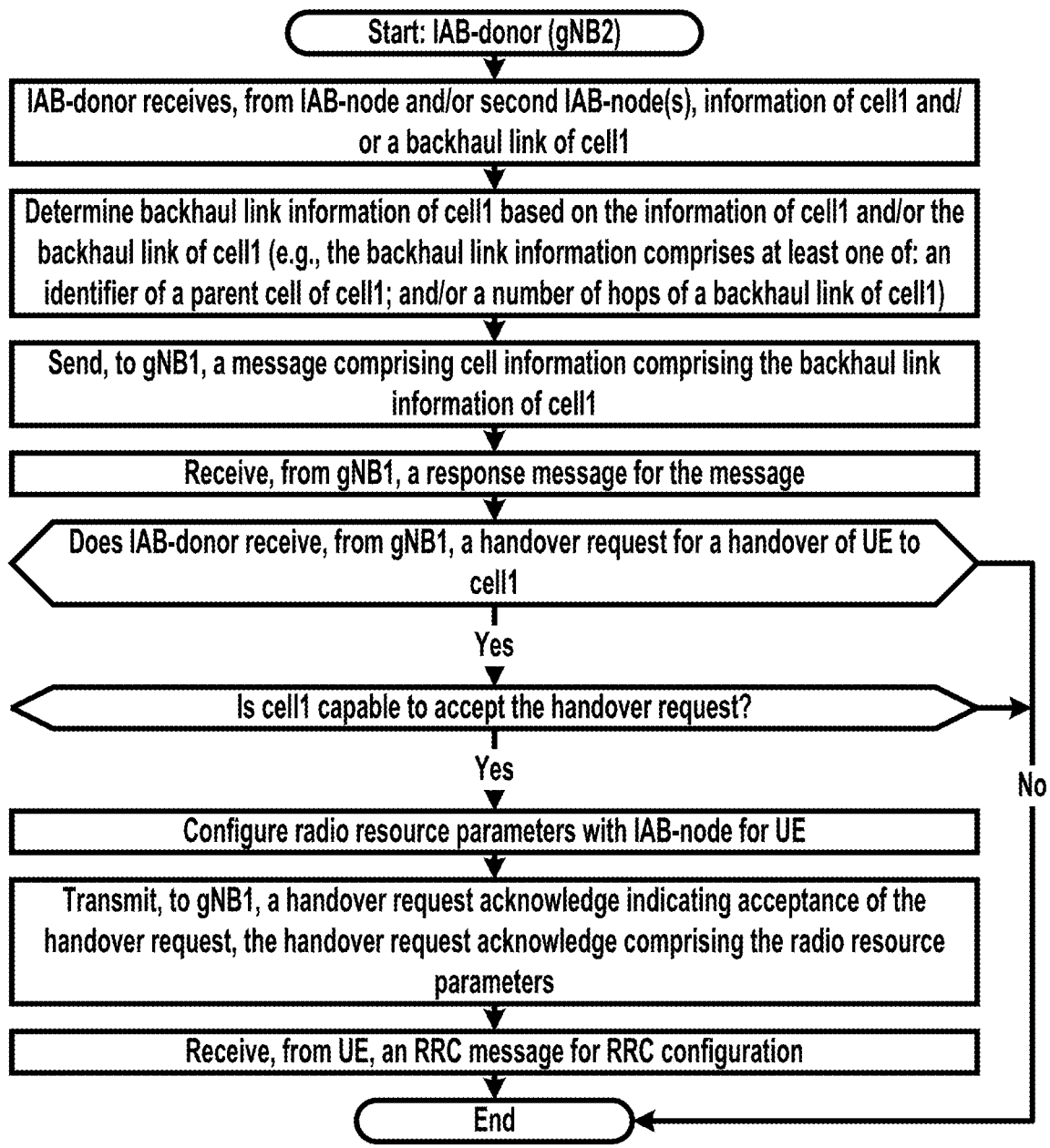
FIG. 41 is an example diagram of an aspect of an embodiment of the present disclosure.
Figure 42:
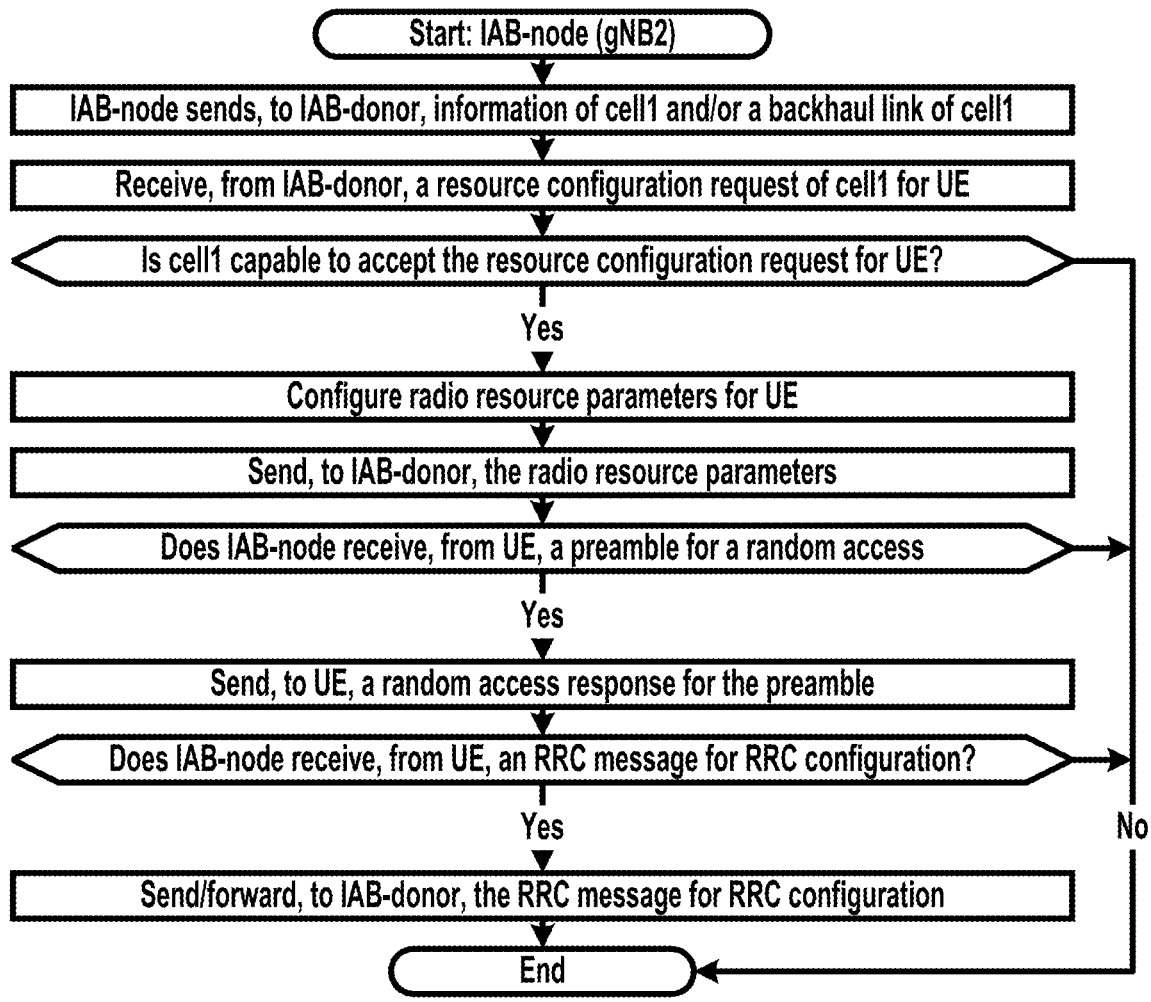
FIG. 42 is an example diagram of an aspect of an embodiment of the present disclosure.
Figure 43:
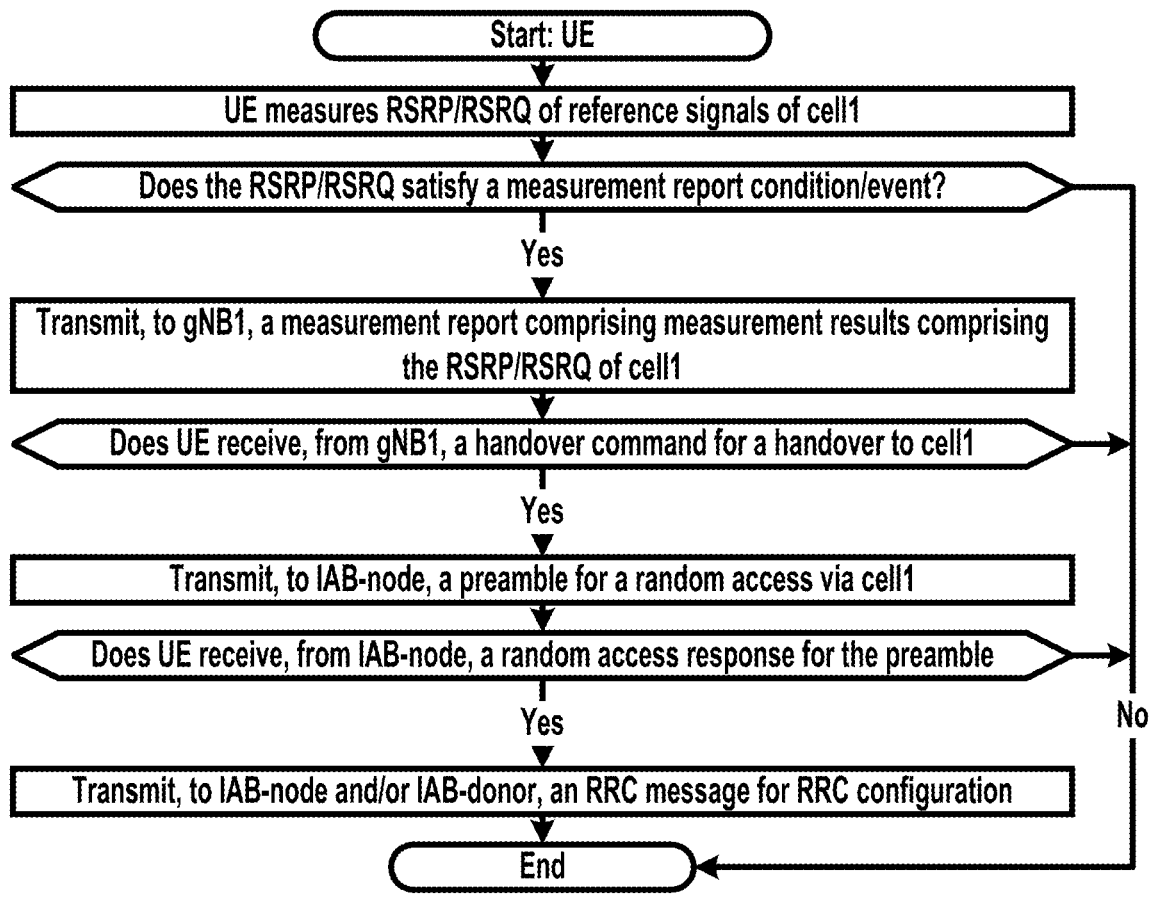
FIG. 43 is an example diagram of an aspect of an embodiment of the present disclosure.

In an example, as shown in FIG. 39, the first access node may receive the configuration parameters of the first cell of the second access node via a core network entity (e.g., core network node, AMF, MME, etc.) and/or one or more interfaces (e.g., one or more N2 interface, one or more S1 interfaces, etc.) among the first access node, the core network entity, and/or the second access node. The first access node may receive the configuration parameters of the first cell of the second access node via at least one N2 interface message (e.g., at least one S1 interface message).

In an example, the at least one configuration message may further comprise at least one of: downlink configuration parameters of a downlink of the first cell; uplink configuration parameters of an uplink of the first cell; a node identifier of the second access node (e.g. global NG-RAN node ID, a global gNB ID, a global ng-eNB ID, a global eNB ID, gNB-CU ID, IAB-donor ID, etc.); a node identifier of the third access node (e.g. global NG-RAN node ID, a global gNB ID, a global ng-eNB ID, a global eNB ID, gNB-DU ID, IAB-node ID, etc.); one or more cell identifiers (e.g., PCI, CGI) of one or more cells (e.g. other than the first cell) of the second access node, one or more cell configuration parameters of the one or more cells, one or more neighbor cell information of one or more neighbor cells of the one or more cells (e.g. NR cells and/or E-UTRA cells), a core network pool information (e.g. AMF pool information, MME pool information), tracking area information, registration area information, and/or the like. In an example, the global ng-eNB ID may comprise at least one of a macro ng-eNB ID, a short macro ng-eNB ID, and/or a long macro ng-eNB ID.

In an example, the one or more cell configuration parameters (e.g. served cells NR IE, served cell E-UTRA IE, served cell information of one or more served cell) of the one or more cells of the second access node may comprise configuration parameters of one or more served cells indicating at least one of a cell identifier (e.g. a physical cell identifier, global cell identifier), one or more PLMN identifiers, FDD configuration information (e.g. uplink ARFCN, downlink ARFCN, uplink transmission bandwidth, downlink transmission bandwidth), TDD configuration information (e.g. ARFCN, transmission bandwidth), SUL information (e.g. SUL ARFCN, SUL transmission bandwidth), and/or the like.

In an example, the one or more neighbor cell information (e.g. neighbor information NR IE, neighbor information E-UTRA IE) of the one or more neighbor cells of the one or more cells may comprise configuration parameters of one or more neighbor cells indicating at least one of a cell identifier (e.g. a physical cell identifier, global cell identifier), one or more PLMN identifiers, FDD configuration information (e.g. uplink ARFCN, downlink ARFCN, uplink transmission bandwidth, downlink transmission bandwidth), TDD configuration information (e.g. ARFCN, transmission bandwidth), SUL information (e.g. SUL ARFCN, SUL transmission bandwidth), and/or the like.

In an example, the at least one configuration message may comprise a PRACH frequency offset for one or more of plurality of BWPs. The PRACH frequency offset may be for transmission of random access preambles.

In an example, the configuration parameters of the first cell may further comprise at least one of: one or more PLMN identifiers of the first cell, FDD configuration information (e.g. uplink ARFCN, downlink ARFCN, uplink transmission bandwidth, downlink transmission bandwidth) of the first cell, TDD configuration information (e.g. ARFCN, transmission bandwidth) of the first cell, SUL information (e.g. SUL ARFCN, SUL transmission bandwidth) supported by the first cell, BWP configuration parameters (e.g., initial BWP, bandwidth information of BWPs, frequency information of BWPs), beam configuration parameters (e.g., for SSBs, CSI-RS beams, DMRS, etc.), beam measurement parameters (e.g., beam timing offset, beam periodicity information, etc.), and/or the like.

In an example, the backhaul information of the backhaul link may comprise at least one of: an identifier indicating a parent cell (e.g., identifier(s) of one or more parent cells) of the first cell (e.g., and/or of the third access node); an identifier indicating a child cell (e.g., identifier(s) of one or more child cells) of the first cell (e.g., and/or of the third access node); a node identifier (e.g., base station identifier, central unit identifier, distributed unit identifier, IAB-node identifier, IAB-donor identifier, etc.) indicating the third access node; a node identifier indicating a parent node (e.g., node identifier(s) of one or more parent nodes) of the third access node (e.g., and/or of the first cell); a node identifier indicating a child node (e.g., node identifier(s) of one or more child nodes) of the third access node (e.g., and/or of the first cell); a node identifier (e.g., base station identifier, central unit identifier, distributed unit identifier, IAB-node identifier, IAB-donor identifier, etc.) indicating the second access node; a field indicating a number of hops (e.g., hierarchy level) of the backhaul link (e.g., the at least one backhaul link); a field indicating a maximum number of hops (e.g., lowest hierarchy level) of the backhaul link (e.g., the at least one backhaul link); a field indicating a minimum number of hops (e.g., highest hierarchy level) of the backhaul link (e.g., the at least one backhaul link); information of latency supported (e.g., guaranteed, latency class information indicating low/medium/high latency) by the first cell and/or by the backhaul link); information of reliability supported (e.g., guaranteed, reliability class information indicating low/medium/high reliability) by the first cell (e.g., and/or by the backhaul link); a list of services supported by the first cell and/or by the backhaul link); a list of network slices (e.g., S-NSSAI, NSSAI, network slice identifier, vehicle, drone, V2X, device-to-device communication device, URLLC, etc.) supported by the first cell and/or by the backhaul link); a list of capabilities (e.g., supported transmission modulation order, IoT, URLLC, beamforming, multiple BWP support, unlicensed spectrum support, IAB-node device support, etc.) of the first cell and/or of the backhaul link); information of load/traffic load (e.g., resource status, low/medium/high, 78 percent employed, etc.) of the first cell and/or the backhaul link of the first cell, information of interference (e.g., downlink RSRQ/RSRP, low/medium/high, etc.) of the first cell and/or the backhaul link of the first cell, and/or the like.

In an example, the parent cell of the first cell (and/or third access node) may comprise a serving cell serving (e.g., employed by) the third access node. The third access node may access to a parent node of the third access node via the parent cell. The parent cell of the first cell may be a parent cell of the third access node. In an example, the parent cell of the first cell may comprise at least one of: a primary cell of the third access node; and/or a secondary cell of the third access node. In an example, the identifier of the parent cell of the first cell may comprise at least one of a CGI, a PCI, a cell index (e.g., 3 bits or 8 bits) configured for the third access node, and/or the like. In an example, the at least one configuration message may further comprise second configuration parameters of a second cell of the second access node and/or third configuration parameters of the parent cell of the first cell. The second configuration parameters may comprise an identifier of the second cell and/or an identifier of a parent cell of the second cell. The third configuration parameters may comprise an identifier of the parent cell of the first cell and/or an identifier of a parent cell of the parent cell of the first cell. Based on a list of sets of an identifier of a serving cell and identifier(s) of parent cell(s) of the serving cell (e.g., [ID of cell1, ID(s) of parent cell(s) of cell1], [ID of cell2, ID(s) of parent cell(s) of cell2], [ID of cell3, ID(s) of parent cell(s) of cell3], etc.), the first access node may determine a number of hops of the backhaul link of the first cell. Based on a list of sets of an identifier of a serving cell and identifier(s) of parent cell(s) of the serving cell, the first access node may determine parent relations among serving cells of the second access node and/or determine a number of hops of a backhaul link of a serving cell (e.g., cell1 is a parent cell of cell2, cell2 is a parent cell of cell3, cell3 is a parent cell of cell4: if cell 1 is a direct serving cell of the second access node and/or if cell1 has no parent cell, a number of hops of cell4 is 3 or 4). In an example, by counting (e.g., concatenate) parent cells of the first cell (e.g., number of: a parent cell of the first cell, a parent cell of the parent cell of the first cell, a parent cell of the parent cell of the parent cell of the first cell, etc.), the first access node may determine a number of hops of the backhaul link of the first cell.

In an example, the child cell of the first cell (and/or third access node) may comprise a serving cell served by an access node employing the first cell. The child cell of the first cell may be a child cell of the access node employing the first cell. In an example, the identifier of the child cell of the first cell may comprise at least one of a CGI, a PCI, a cell index (e.g., 3 bits or 8 bits), and/or the like. In an example, the at least one configuration message may further comprise second configuration parameters of a second cell of the second access node and/or fourth configuration parameters of the child cell of the first cell. The second configuration parameters may comprise an identifier of the second cell and/or an identifier of a child cell of the second cell. The fourth configuration parameters may comprise an identifier of the child cell of the first cell and/or an identifier of a child cell of the child cell of the first cell. Based on a list of sets of an identifier of a serving cell and identifier(s) of child cell(s) of the serving cell (e.g., [ID of cell1, ID(s) of child cell(s) of cell1], [ID of cell2, ID(s) of child cell(s) of cell2], [ID of cell3, ID(s) of child cell(s) of cell3], etc.), the first access node may determine a number of hops of the backhaul link of the first cell. Based on a list of sets of an identifier of a serving cell and identifier(s) of child cell(s) of the serving cell, the first access node may determine child relations among serving cells of the second access node and/or determine a number of hops of a backhaul link of a serving cell (e.g., cell1 is a child cell of cell2, cell2 is a child cell of cell3, cell3 is a child cell of cell4: if cell4 is a direct serving cell of the second access node and/or if cell4 is not a child cell of any serving cell of the second access node, a number of hops of cell1 is 3 or 4). In an example, by counting (e.g., concatenate) child cells of a direct serving cell of the second access node to the first cell (e.g., number of: a child cell of the direct serving cell, a child cell of the child cell of the direct serving cell, a child cell of the child cell of the child cell of the direct serving cell, the first cell=a child cell of a child cell of . . . of the child cell of the child cell of the direct serving cell, etc.), the first access node may determine a number of hops of the backhaul link of the first cell.

In an example, the parent node of the third access node (and/or the first cell) may comprise an access node serving (e.g., employed by) the third access node. In an example, the parent node of the third access node may comprise at least one of: a master access node (e.g., MgNB, MeNB) of the third access node; and/or a secondary access node (e.g., SgNB, SeNB) of the third access node. In an example, the identifier of the parent node of the third access node may comprise at least one of a gNB identifier, an eNB identifier, an IAB-node identifier, an IAB-donor identifier, a central unit (e.g., gNB-CU) identifier, a distributed unit (e.g., gNB-DU) identifier, and/or the like. In an example, the at least one configuration message may further comprise second configuration parameters of a second cell of the second access node and/or third configuration parameters of the parent cell (e.g., parent node) of the first cell. The second configuration parameters may comprise an identifier of the second cell and/or an identifier of a parent node of the second cell (e.g., the third access node). The third configuration parameters may comprise an identifier of the parent cell of the first cell and/or an identifier of a parent node of the parent cell of the first cell. Based on a list of sets of an identifier of a serving cell and identifier(s) of parent node(s) of the serving cell (and/or of an access node of the serving cell) (e.g., [ID of cell1, ID(s) of parent node(s) of cell1], [ID of cell2, ID(s) of parent node(s) of cell2], [ID of cell3, ID(s) of parent node(s) of cell3], etc.) and/or an identifier of an access node serving each cell (e.g., ID(s) of an access node of cell1/cell2/cell3), the first access node may determine a number of hops of the backhaul link of the first cell. Based on a list of sets of an identifier of a serving cell, identifier(s) of parent node(s) of the serving cell, and/or an identifier of an access node serving the serving cell, the first access node may determine parent relations among serving cells (e.g., access node of serving cell) of the second access node and/or determine a number of hops of a backhaul link of a serving cell (e.g., access node of a serving cell) (e.g., node1 is a parent node of node2/cell2, node2 is a parent node of node3/cell3, node3 is a parent node of node4/cell4: if node1 is the second access node and/or if node1 has no parent node, a number of hops of cell4/node4 is 3 or 4). In an example, by counting (e.g., concatenate) parent nodes of the first cell (and/or the third access node), the first access node may determine a number of hops of the backhaul link of the first cell (and/or the third access node).

In an example, the child node of the third access node (and/or the first cell) may comprise an access node served by (e.g., employing) the third access node. In an example, the child node of the third access node may employ the third access node as at least one of: a master access node (e.g., MgNB, MeNB); and/or a secondary access node (e.g., SgNB, SeNB). In an example, the identifier of the child node of the third access node may comprise at least one of a gNB identifier, an eNB identifier, an IAB-node identifier, an IAB-donor identifier, a central unit (e.g., gNB-CU) identifier, a distributed unit (e.g., gNB-DU) identifier, and/or the like. In an example, the at least one configuration message may further comprise second configuration parameters of a second cell of the second access node and/or third configuration parameters of the child cell (e.g., child node) of the first cell. The second configuration parameters may comprise an identifier of the second cell and/or an identifier of a child node of the second cell (and/or the third access node). The third configuration parameters may comprise an identifier of the child cell of the first cell and/or an identifier of a child node of the first cell. Based on a list of sets of an identifier of a serving cell and identifier(s) of child node(s) of the serving cell (and/or of an access node of the serving cell) (e.g., [ID of cell1, ID(s) of child node(s) of cell1], [ID of cell2, ID(s) of child node(s) of cell2], [ID of cell3, ID(s) of child node(s) of cell3], etc.) and/or an identifier of an access node serving each cell (e.g., ID(s) of an access node of cell1/cell2/cell3), the first access node may determine a number of hops of the backhaul link of the first cell. Based on a list of sets of an identifier of a serving cell, identifier(s) of child node(s) of the serving cell, and/or an identifier of an access node serving the serving cell, the first access node may determine child relations among serving cells (e.g., access node of serving cell) of the second access node and/or determine a number of hops of a backhaul link of a serving cell (e.g., access node of a serving cell) (e.g., node1 serving cell1 is a child node of node2/cell2, node2 is a child node of node3/cell3, node3 is a child node of node4/cell4: if node4 is the second access node and/or if node4 is not a child node of any access node served by the second access node, a number of hops of cell1/node1 is 3 or 4). In an example, by counting (e.g., concatenate) child nodes of the second access node to an access node serving the first cell (e.g., number of: a child node of the second access node, a child node of the child node of the second access node, a child node of the child node of the child node of the second access node, the third access node=a child node of a child node of . . . of the child node of the child node of the second access node, etc.), the first access node may determine a number of hops of the backhaul link of the first cell and/or the third access node.

In an example, the field indicating the number of hops (e.g., hierarchy level) of the backhaul link (e.g., the at least one backhaul link) between the second access node and the third access node serving the first cell (e.g., the backhaul link of the first cell) may indicate a number of (e.g., concatenate) radio links between the second access node and the third access node. the field indicating the number of hops may indicate a number (e.g., and/or the number plus 1) of (e.g., concatenate) access nodes (e.g., IAB-nodes, base stations, base station distributed units, MAC entities, PHY entities, etc.) between the second access node and the third access node (e.g., the number of hops of the backhaul link: N, a number of access nodes of the backhaul link: M, N=M+1).

In an example, the field indicating the maximum number of hops (e.g., lowest hierarchy level) of the backhaul link (e.g., the at least one backhaul link) may indicate a largest number of (e.g., concatenate) radio links between the second access node and the third access node when the backhaul link (e.g. the at least one backhaul link) comprises multiple paths (e.g., when the third access node is connected to the second access node via multiple paths). In an example, the field indicating the maximum number of hops may indicate a largest number (e.g., and/or the largest number plus 1) of (e.g., concatenate) access nodes (e.g., IAB-nodes, base stations, base station distributed units, MAC entities, PHY entities, etc.) between the second access node and the third access node (e.g., the maximum number of hops of the backhaul link: N, a largest number of (e.g., concatenate)

access nodes of the backhaul link: M, N=M+1) when the backhaul link (e.g. the at least one backhaul link) comprises multiple paths (e.g., when the third access node is connected to the second access node via multiple paths).

In an example, the field indicating the minimum number of hops (e.g., highest hierarchy level) of the backhaul link (e.g., the at least one backhaul link) may indicate a smallest number of (e.g., concatenate) radio links between the second access node and the third access node when the backhaul link (e.g. the at least one backhaul link) comprises multiple paths (e.g., when the third access node is connected to the second access node via multiple paths). In an example, the field indicating the minimum number of hops may indicate a smallest number (e.g., and/or the smallest number plus 1) of (e.g., concatenate) access nodes (e.g., IAB-nodes, base stations, base station distributed units, MAC entities, PHY entities, etc.) between the second access node and the third access node (e.g., the minimum number of hops of the backhaul link: N, a smallest number of (e.g., concatenate) access nodes of the backhaul link: M, N=M+1) when the backhaul link (e.g. the at least one backhaul link) comprises multiple paths (e.g., when the third access node is connected to the second access node via multiple paths).

In an example, the information of the latency supported (e.g., guaranteed; latency class information indicating medium/low/high latency) by the first cell (e.g., and/or by the backhaul link) may indicate a packet transmission latency via the at least one backhaul link and/or the first cell/the third access node. The packet transmission latency may be a (e.g., average) latency (e.g., 5 ms, low/medium/ high, etc.), a (e.g., average) longest latency (e.g., average latency of packets traveling a path with maximum hops between the third access node and the second access node), a (e.g., average) shortest latency (e.g., average latency of packets traveling a path with minimum hops between the third access node and the second access node), a (e.g., average) guaranteed packet transmission latency, and/or the like. In an example, the second access node and/or the third access node may determine the packet transmission latency based on at least one of: a packet processing delay at each access node of the backhaul link of the first cell, a packet transmission delay (e.g., buffer queuing time duration, size of resource slot/transport block/subframe, TTI, etc.) at each (e.g., concatenate) cell of the backhaul link, a number of hops of the backhaul link of the first cell, a sum/combination of delay at each access node/cell of the backhaul link of the first cell, and/or the like. The second access node may receive one or more of the packet processing delay and/or the packet transmission delay from an intermediate access node (e.g., IAB-node, base station, etc.) on the backhaul link of the first cell. In an example, the second access node and/or the third access node (and/or an intermediate access node on the backhaul link of the first cell) may determine the packet transmission delay by measuring (e.g., RLC layer, adapt layer) packet response time (e.g., by measuring a time duration between transmitting a packet and receiving an acknowledge for the packet), a (e.g., PDCP layer, adapt layer) packet transmission time (e.g., by measuring a time duration between a packet arrival time and a packet transmission time based on a time stamp information indicated in a packet header). The second access node may receive information of the packet transmission delay from the third access node and/or an intermediate access node (e.g., IAB-node, base station, etc.) on the backhaul link of the first cell. The packet transmission latency may comprise information of a separate packet transmission latency of each intermediate access node and/or each intermediate cell on the backhaul link of the first cell.

In an example, the information of the reliability supported (e.g., guaranteed, reliability class information indicating medium/low/high reliability) by the first cell (e.g., and/or by the backhaul link) may indicate a packet transmission reliability of the at least one backhaul link and/or the first cell/the third access node. The packet transmission reliability may comprise at least one of: a packet loss rate (e.g., 0.005, 0.5 percent, low/medium/high, etc.); a packet retransmission rate/number (e.g., 0.01, 1 percent, 1012 times per minutes, 95 times per second, low/medium/high, etc.); a packet error rate (e.g., block error rate, 0.02 percent, low/ medium/high, etc.); and/or the like. The packet transmission reliability may comprise an average reliability (e.g., average packet loss rate, average packet retransmission rate/number, average packet error rate, etc.), an average longest path reliability (e.g., average reliability of packets traveling a path with maximum hops between the third access node and the second access node), an average shortest path reliability (e.g., average reliability of packets traveling a path with minimum hops between the third access node and the second access node), an average guaranteed packet transmission reliability, and/or the like. In an example, the second access node and/or the third access node may determine the packet transmission reliability based on at least one of: a packet loss rate/packet error rate at each access node of the backhaul link of the first cell, a packet retransmission rate/number (e.g., buffer queuing time duration, size of resource slot/ transport block/subframe, TTI, etc.) at each (e.g., concatenate) cell of the backhaul link, a number of hops of the backhaul link of the first cell, a sum/combination of packet transmission reliability at each access node/cell of the backhaul link of the first cell, and/or the like. The second access node may receive one or more of a packet loss rate, a packet error rate, and/or a packet retransmission rate/number from an intermediate access node (e.g., IAB-node, base station, etc.) on the backhaul link of the first cell. In an example, the second access node and/or the third access node (and/or an intermediate access node on the backhaul link of the first cell) may determine the packet transmission reliability by measuring (e.g., RLC layer, adapt layer) packet response rate (e.g., by measuring a receiving rate of an acknowledge for a transmitted packet), a (e.g., PDCP layer, adapt layer) packet loss/error rate (e.g., by detecting lost/errored packets based on a packet sequence number indicated in a packet header). The second access node may receive information of the packet transmission reliability from the third access node and/or an intermediate access node (e.g., IAB-node, base station, etc.) on the backhaul link of the first cell. The packet transmission reliability may comprise information of a separate packet transmission reliability of each intermediate access node and/or each intermediate cell on the backhaul link of the first cell.

In an example, the list of services may comprise an identifier of a service supported by the first cell and/or the third access node. The list of services may comprise an Internet of things (IoT) service, a vehicle to everything (V2X) (e.g., V2V, V2P, V2I, etc.), ultra-reliable and low-latency communication (URLLC) service, a direct communication (e.g., ProSe, D2D, PC5 interface, etc.), an IMS service, a flying object service (e.g., drone control), an emergency service, a mission critical service, and/or the like. In an example, the list of network slices may comprise at least one of a network slice identifier, a network slice selection assistance information (NSSAI), a single-NSSAI (S-NSSAI) of one or more network slices supported by the first cell and/or the third access node. In an example, the list of capabilities may indicate whether the first cell and/or the third access node supports at least one of: unlicensed spectrum, citizens broadband radio service (CBRS) band, control plane cellular IoT (CIoT), user plane CIoT, early data transmission (EDT), 2-step random access, numerology configurations, beam configurations, BWP configurations, and/or the like. The second access node may receive information of one or more of the list of capabilities from the third access node and/or an intermediate access node (e.g., IAB-node, base station, etc.) on the backhaul link of the first cell. The list of capabilities may comprise separate capabilities of each intermediate access node and/or each intermediate cell on the backhaul link of the first cell.

In an example, the information of load/traffic load (e.g., resource status, low/medium/high, 78 percent employed, etc.) of the first cell and/or the backhaul link of the first cell may indicate at least one of load information (e.g., 35 percent, low/medium/high), resource utilization information (e.g., 27 percent, low/medium/high), hardware (e.g., CPU, RAM, BUS, link, storage, hard drive, buffer, etc.; low/medium/high) load status, interface (e.g., F1, Xn, N2, N3, Uu, etc.) load status, and/or the like. The second access node may receive one or more of the information of load/traffic load from the third access node and/or an intermediate access node (e.g., IAB-node, base station, etc.) on the backhaul link of the first cell. The information of load/traffic load may comprise information of separate load/traffic load of each intermediate access node and/or each intermediate cell on the backhaul link of the first cell.

In an example, the information of interference (e.g., downlink RSRQ/RSRP, dB, low/medium/high, etc.) of the first cell and/or the backhaul link of the first cell may indicate at least one of an interference level (e.g., downlink RSRP/RSRQ of resource blocks/slot/subframe/subcarrier, low/medium/high, etc.) received by an access node (e.g., the third access node, an intermediate access node of the backhaul link, IAB-node, etc.) as a mobile terminal (MT) (e.g., when the access node is served by a parent node and/or a parent cell), an interference level (e.g., uplink RSRP/RSRQ of resource blocks/slot/subframe/subcarrier, low/medium/high, etc.) received by an access node (e.g., the third access node, an intermediate access node of the backhaul link, IAB-node, etc.) as a base station (e.g., when the access node serves wireless devices), an interference level (e.g., RSRP/RSRQ of resource blocks/slot/subframe/subcarrier, low/medium/high, etc.) received by one or more wireless device served by the first cell and/or by the second access node or third access node, and/or the like. The second access node may receive one or more of the information of interference from the third access node and/or an intermediate access node (e.g., IAB-node, base station, etc.) on the backhaul link of the first cell. The information of interference may comprise information of separate interference of each intermediate access node and/or each intermediate cell on the backhaul link of the first cell.

In an example, the at least one configuration message may further comprise second configuration parameters of a second cell of the second access node. The second configuration parameters may comprise at least one of: an identifier indicating the second cell; second backhaul information of at least one second backhaul link between the second access node and a fourth access node serving the second cell; and/or an identifier indicating a second parent cell of the second cell. The second configuration parameters may comprise parameters for the second cell as configured (e.g., the configuration parameters of the first cell) for the first cell of the third access node. The at least one configuration message may comprise multiple sets of configuration parameters of serving cells of the second access node.

In an example, the second access node may transmit, to the first access node periodically and/or event-based, one or more elements of the at least one configuration message. In an example, if a parent cell or a child cell of the first cell (and/or a serving cell of the second access node) is changed (e.g., the third access node employs a cell different from the previous parent cell; and/or the third access node serves an access node (e.g., IAB-node) different from the previous child node), the second access node may transmit, to the first access node, information of a new parent cell or a new child cell of the first cell (and/or the third access node). In an example, if the backhaul link (e.g., intermediate node, intermediate cell, number of hops, etc.) of the first cell is updated, the second access node may transmit, to the first access node, information of updated backhaul link of the first cell. In an example, the second access node may periodically transmit information of latency and/or information of reliability of the first cell and/or the backhaul link (e.g., based on report configuration requested by the first access node via a status report request message). In an example, the second access node may transmit information of latency and/or information of reliability of the first cell and/or the backhaul link when a configured condition/event occurs based on report configuration parameters (e.g., latency threshold value: 5 ms, reliability threshold value: packet loss rate 0.002) requested by the first access node via a status report request message. In an example, if latency of the first cell and/or backhaul link becomes larger than or equal to the latency threshold value (e.g., latency>5 ms), the second access node may transmit, to the first access node, information of latency of the first cell and/or the backhaul link. In an example, if reliability of the first cell and/or backhaul link becomes smaller/worse than or equal to the reliability threshold value (e.g., packet loss rate>0.002), the second access node may transmit, to the first access node, information of reliability of the first cell and/or the backhaul link.

In an example, the second access node may periodically transmit information of traffic load and/or information of interference of the first cell and/or the backhaul link (e.g., based on report configuration requested by the first access node via a status report request message). In an example, the second access node may transmit information of traffic load and/or information of interference of the first cell and/or the backhaul link when a configured condition/event occurs based on report configuration parameters (e.g., load threshold value: 90 percent, interference threshold value: RSRQ-17 dB) requested by the first access node via a status report request message. In an example, if a load of the first cell and/or backhaul link becomes higher than or equal to the load threshold value (e.g., load>90 percent), the second access node may transmit, to the first access node, information of load/traffic load of the first cell and/or the backhaul link. In an example, if interference of the first cell and/or backhaul link becomes larger/worse than or equal to the interference threshold value (e.g., RSRQ<-17 dB), the second access node may transmit, to the first access node, information of interference of the first cell and/or the backhaul link.

In an example, the first access node may transmit/send, to the second access node, a response message (e.g., at least one response message) for the at least one configuration message. In an example, the first access node may send, to the second access node, the response message (e.g., the at least one response message) in response to the at least one configuration message. In an example, the first access node may send/transmit the response message via the interface (e.g., Xn interface, X2 interface, one or more N2 interfaces, one or more S1 interfaces, one or more F1 interfaces, etc.) between the first access node and the second access node. In an example, the response message may comprise at least one of: an Xn setup response message (e.g., X2 setup response message), an Xn setup request message (e.g., X2 setup request message), an NG-RAN node configuration update acknowledge message (e.g., base station configuration update acknowledge message, gNB/eNB configuration update acknowledge message), an NG-RAN node configuration update message (e.g., base station configuration update message, gNB/eNB configuration update message), a load information message, a resource status update message, and/or the like. In an example, the response message may comprise at least one of: an F1 setup response message, an F1 setup request message, a node configuration update acknowledge message, a node configuration update message, a load information message, a resource status update message, and/or the like. The response message may indicate that the configuration parameters of the first cell received via the at least one configuration message are received/updated/confirmed at the first access node.

The response message may comprise third configuration parameters of a third cell of the first access node. The third configuration parameters may comprise at least one of: an identifier indicating the third cell; and/or third backhaul information of at least one third backhaul link of the third cell. The at least one third backhaul link of the third cell may be a link between the first access node and a fifth access node serving the third cell. In an example, the fifth access node may be an IAB-node (e.g., a gNB, an eNB, a base station distributed unit, a gNB-DU, a base station central unit, a gNB-CU, a relay node, a relay donor node, a donor node, an IAB-donor, mobile termination (MT), UE, etc.).

In an example, the second access node may send/transmit the third configuration parameters of the third cell of the fifth access node via the core network entity (e.g., AMF, MME, etc.) and/or one or more interfaces (e.g., one or more N2 interface, one or more S1 interfaces, etc.) among the second access node, the core network entity, and/or the first access node. The second access node may receive the third configuration parameters of the third cell of the fifth access node via at least one N2 interface message (e.g., at least one S1 interface message).

The third configuration parameters may comprise at least one of: an identifier (e.g., cell global identifier, CGI, physical cell identifier, PCI, carrier index, carrier identifier, etc.) indicating the third cell; and/or third backhaul information of the at least one third backhaul link (e.g., the third backhaul link) between the first access node and the fifth access node serving the third cell (e.g., third backhaul link information of the at least one third backhaul link of the third cell).

In an example, the third backhaul information of the at least one third backhaul link may comprise at least one of: an identifier indicating a parent cell (e.g., identifier(s) of one or more parent cells) of the third cell (e.g., and/or of the fifth access node); an identifier indicating a child cell (e.g., identifier(s) of one or more child cells) of the third cell (e.g., and/or of the fifth access node); a node identifier (e.g., base station identifier, central unit identifier, distributed unit identifier, IAB-node identifier, IAB-donor identifier, etc.) indicating the fifth access node; a node identifier indicating a parent node (e.g., node identifier(s) of one or more parent nodes) of the fifth access node (e.g., and/or of the third cell); a node identifier indicating a child node (e.g., node identifier(s) of one or more child nodes) of the fifth access node (e.g., and/or of the third cell); a node identifier (e.g., base station identifier, central unit identifier, distributed unit identifier, IAB-node identifier, IAB-donor identifier, etc.) indicating the first access node; a field indicating a number of hops (e.g., hierarchy level) of the at least one third backhaul link (e.g., the third backhaul link); a field indicating a maximum number of hops (e.g., lowest hierarchy level) of the at least one third backhaul link (e.g., the third backhaul link); a field indicating a minimum number of hops (e.g., highest hierarchy level) of the at least one third backhaul link (e.g., the third backhaul link); information of latency supported (e.g., guaranteed, latency class information indicating low/medium/high latency) by the third cell and/or by the at least one third backhaul link); information of reliability supported (e.g., guaranteed, reliability class information indicating low/medium/high reliability) by the third cell (e.g., and/or by the at least one third backhaul link); a list of services supported by the third cell and/or by the at least one third backhaul link); a list of network slices (e.g., S-NSSAI, NSSAI, network slice identifier) supported by the third cell and/or by the at least on third backhaul link); a list of capabilities (e.g., supported transmission modulation order, IoT, URLLC, beamforming, multiple BWP support, unlicensed spectrum support, etc.) of the third cell and/or of the at least one third backhaul link); information of load/traffic load (e.g., resource status, low/medium/high, 78 percent employed, etc.) of the third cell and/or the at least one third backhaul link of the third cell, information of interference (e.g., downlink RSRQ/RSRP, low/medium/high, etc.) of the third cell and/or the at least one third backhaul link of the third cell, and/or the like.

In an example, the first access node may receive, from the wireless device, a measurement report comprising measurement results of the first cell. In an example, the measurement report may comprise at least one RRC message (e.g., measurement report message). In an example, the first access node may transmit/send, to the wireless device, measurement configuration parameters (e.g., MeasConfig). The first access node may transmit/send, to the wireless device, the measurement configuration parameters via at least one RRC message (e.g., RRC reconfiguration message, RRC connection reconfiguration message, etc.). In an example, the wireless device may transmit/send, to the first access node, the measurement report based on the measurement configuration parameters. The measurement configuration parameters may comprise at least one of: reference signal information (e.g., SSB configuration parameters, CSI-RS configuration parameters, etc.) of one or more cells, RSRP range information, RSRQ range information, measurement gap configuration parameters (e.g., measGapConfig, measGapSharingConfig), measurement target cell information (e.g., cell identifier, cell index, PCI, CGI, etc.), configuration information of measurement report events (e.g., A1, A2, A3, A4, A5, A6, . . . , B1, B2, . . . , etc.) and/or the like.

In an example, the measurement results of the first cell may comprise at least one of: a reference signal received power (RSRP) of the first cell; a reference signal received quality (RSRQ) of the first cell and/or one or more cells (e.g., the third cell, a current serving cell of the wireless device, primary/secondary cell of the wireless device, neighboring cells of the current serving cell of the wireless device); a reference signal received power (RSRP) of a neighboring cell of the first cell; and/or a reference signal received quality (RSRQ) of a neighboring cell of the first cell. In an example, the measurement results further comprise RSRP and/or RSRQ of at least one reference signal associated with one or more beams (e.g., SSB, CSI-RS beams, etc.) of cells. In an example, the wireless device may determine RSRP and/or RSRQ of cells (e.g., the first cell, the one or more cells, and/or the neighboring cell) by combining (e.g., averaging, summing, etc.) RSRP and/or RSRQ of at least one reference signal associated with one or more beams of cells. In an example, the wireless device may transmit/send, to the first access node, the measurement report in response to at least one of the measurement report events being satisfied (e.g., RSRP/RSRQ of the first cell is equal to or larger than RSRP/RSRQ (or RSRP/RSRQ plus a offset value) of the current serving cell of the wireless device; RSRP/RSRQ of the first cell is equal to or larger than a power/quality value).

In an example, the first access node may determine a handover of the wireless device to the first cell. The first access node may determine the handover of the wireless device based on the measurement results of the first cell received from the wireless device via the measurement report. The first access node may determine, based on the backhaul information of the first cell and/or the third access node, the handover of the wireless device to the first cell. The first access node may determine, based on service requirements (e.g., latency, packet loss rate, UE capability, priority, traffic volume, throughput, etc.) of the wireless device (e.g., QoS requirement of at least one PDU session, at least one QoS flow, at least one bearer, and/or at least one network slice of the wireless device), the handover of the wireless device to the first cell. The first access node may determine, based on a device type (e.g., IoT device, sensor device, delay tolerant device, URLLC device, mission critical service device, V2X device, vehicle, drone, device-to-device communication device, IAB-node, ethernet session device, mobile oriented (MO) only device, mobile initiated connection only (MICO) mode device, restricted local operator service (RLOS) device, etc.) of the wireless device, the handover of the wireless device to the first cell.

In an example, the first access node may further determine, based on the identifier indicating the parent cell of the first cell, the number of hops of the at least one backhaul link. The first access node may determine the handover of the wireless device further based on the number of hops of the at least one backhaul link.

In an example, if the first cell supports/meets at least one of the service requirements of the wireless device and/or requirements for the device type of the wireless device and/or if the measurement results for the first cell satisfy/meets handover initiation conditions (e.g., RSRP of the first cell is larger than a power value: −11 dB), the first access node may determine to initiate the handover of the wireless device to the first cell. In an example, if the first cell and/or the backhaul link of the first cell supports the service requirements (e.g., network slice, URLLC, IoT, beamforming, multiple BWP, etc.) of the wireless device and/or the device type (e.g., vehicle, drone, mission critical service device, IAB-node, etc.) of the wireless device, the first access node may decide/determine to initiate the handover of the wireless device to the first cell.

In an example, if the number of hops (and/or the maximum number of hops, the minimum number of hops) of the first cell (and/or the third access node) and/or the backhaul link (e.g., the at least one backhaul link) of the first cell is equal to or less than a first value (e.g., 2 hops), the first access node may determine to initiate the handover of the wireless device (e.g., URLLC device, V2X device, vehicle, drone, mission critical service device, etc.) to the first cell. In an example, if the number of hops (and/or the maximum number of hops, the minimum number of hops) of the first cell (and/or the third access node) and/or the backhaul link (e.g., the at least one backhaul link) of the first cell is equal to or less than a first value (e.g., 2 hops), and/or if the latency and/or the reliability supported by the first cell and/or the backhaul link meet/support the service requirements of the wireless device (e.g., latency supported by the first cell: 2 ms<service requirement latency of the wireless device: 5 ms; and/or reliability supported by the first cell: packet loss rate 0.0001<service requirement reliability of the wireless device: required packet loss rate: 0.0002), the first access node may determine to initiate the handover of the wireless device to the first cell.

In an example, if the wireless device is at least one of IoT device, sensor device, delay tolerant device, and/or the like, and/or if the wireless device supports large latency (e.g., 100 ms) and/or low reliability (e.g., packet loss rate: 0.05), the first access node may determine to initiate the handover of the wireless device to the first cell when the number of hops, the maximum/minimum number of hops of the backhaul link of the first cell is larger than a value (e.g., the number of hops of the backhaul link: 5 hops>2 hops). In an example, if the wireless device supports large latency (e.g., 100 ms) and/or low reliability (e.g., packet loss rate: 0.05), the first access node may determine to initiate the handover of the wireless device to the first cell when the latency and/or the reliability supported by the first cell and/or by the backhaul link of the first cell is relatively large latency and/or low reliability (e.g., latency supported by the first cell: 20 ms and/or reliability supported by the first cell: packet loss rate: 0.001).

Figure 36:
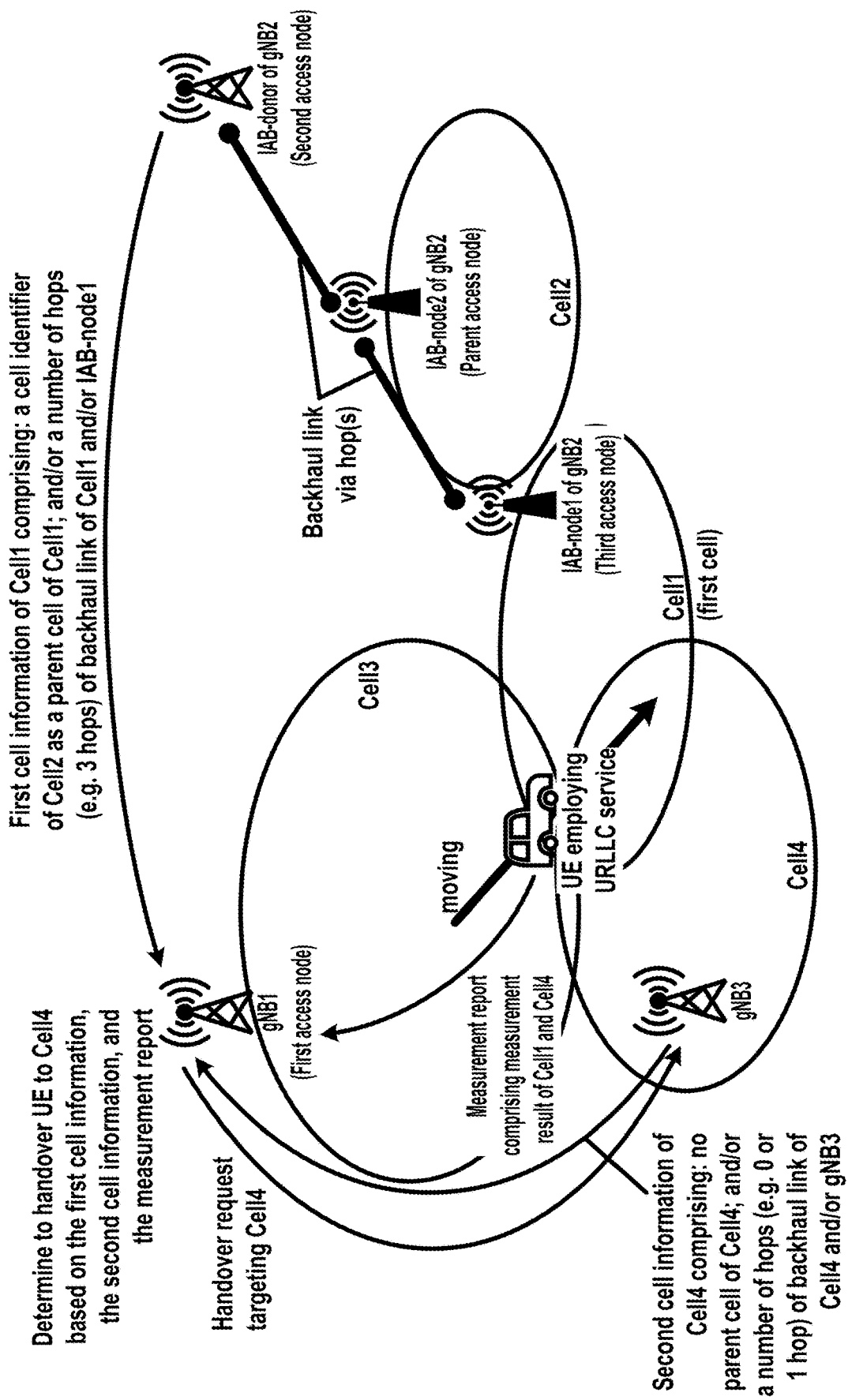
FIG. 36 is an example diagram of an aspect of an embodiment of the present disclosure.

In an example, FIG. 36, if the first cell does not supports/meets at least one of the service requirements (e.g., URLLC service) of the wireless device and/or requirements for the device type (e.g., vehicle, V2X, drone, etc.) of the wireless device and/or if the measurement results for the first cell does not satisfy/meets handover initiation conditions (e.g., RSRP of the first cell is larger than a power value: −11 dB), the first access node may determine not to initiate the handover of the wireless device to the first cell.

In an example, if the load/traffic load of the first cell is less than a load value (e.g., the load of the first cell: medium load and/or 40 percent<75 percent), the first access node may decide/determine to initiate the handover of the wireless device to the first cell. In an example, if the interference of the first cell is less than a power/interference value (e.g., the interference of the first cell: medium/low interference and/or −17 dB<−15 dB), the first access node may decide/determine to initiate the handover of the wireless device to the first cell.

In an example, if the load/traffic load of the first cell is equal to or larger than a load value (e.g., the load of the first cell: high load and/or 90 percent>75 percent), the first access node may decide/determine not to initiate the handover of the wireless device to the first cell. In an example, if the interference of the first cell is equal to or larger than a power/interference value (e.g., the interference of the first cell: high interference and/or −12 dB>−15 dB), the first access node may decide/determine to initiate the handover of the wireless device to the first cell.

In an example, the first access node may transmit/send, to the second access node, a handover request message requesting the handover to the first cell for the wireless device. In an example, the first access node may transmit, to the second access node, the handover request message in response to determining the handover for the wireless device to the first cell. In an example, the first access node may transmit the handover request message in response to determining the handover based on at least one of: the backhaul information of the backhaul link (e.g., the at least one backhaul link) of the first cell (e.g., the backhaul link between the second access node and the third access node serving the first cell); and/or the measurement report received from the wireless device. In an example, the handover request message may comprise at least one of an identifier (e.g., PCI, CGI) of the first cell and/or an identifier of the wireless device (e.g., IMSI, TMSI, Xn UE identifier, etc.).

In an example, the first access node may transmit/send, to the second access node, the handover request message via the interface (e.g., Xn interface, X2 interface, one or more N2 interfaces, one or more S1 interfaces, one or more F1 interfaces, etc.) between the first access node and the second access node. In an example, the first access node may transmit/send, to the second access node and in response to determining the handover for the wireless device, a handover request indication via the core network entity (e.g., AMF, MME, etc.) and/or the one or more interfaces (e.g., one or more N2 interface, one or more S1 interfaces, etc.) among the first access node, the core network entity, and/or the second access node. The first access node may send, to the core network entity, a handover required message comprising the handover request indication. The core network entity may send, to the second access node and based on the handover required message, a (N2) handover request message comprising the handover request indication.

In an example, the first access node may receive, from the second access node, a handover request acknowledge message in response to sending the handover request message. In an example, the first access node may receive, from the second access node, the handover request acknowledge message indicating acceptance of the request of the handover to the first cell for the wireless device. In an example, the first access node may receive, from the second access node, the handover request acknowledge message via the interface (e.g., Xn interface, X2 interface, one or more N2 interfaces, one or more S1 interfaces, one or more F1 interfaces, etc.) between the first access node and the second access node. In an example, the core network entity may receive, from the second access node, a handover request acknowledge indication (e.g., via an (N2) handover request acknowledge message) indicating acceptance of the request of the handover for the wireless device. In an example, the core network entity may send, to the first access node, the handover request acknowledge indication (e.g., via an (N2) handover command message) indicating the acceptance of the request of the handover for the wireless device.

In an example, in response to receiving the handover request acknowledge message and/or the handover request acknowledge indication, the first access node may transmit, to the wireless device, a handover command message indicating the handover to the first cell.

In an example, a core network entity may receive, from the second access node, the configuration parameters of the first cell. The core network entity may receive a handover required message requesting a second handover of a second wireless device to the first cell. The core network entity may determine, based on the configuration parameters of the first cell and/or based on the service requirements of the wireless device and/or the device type of the wireless device, whether to proceed a procedure of the second handover. In an example, if the first cell supports/meets at least one of the service requirements of the wireless device and/or requirements for the device type of the wireless device, the core network entity may determine to send a handover request message for the second handover of the wireless device to the first cell. The core network entity may send, to the second access node and based on the determining for the second handover, a handover request message requesting the second handover of the wireless device.

In an example, the first access node may receive, from a second wireless device, a second measurement report comprising second measurement results of the first cell. The first access node may determine, based on the configuration parameters and/or the second measurement results, a secondary access node addition and/or a secondary access node modification for the second wireless device with the second access node.

The first access node may determine, based on the backhaul information of the first cell and/or the third access node, the secondary access node addition/modification of the second wireless device with the first cell. The first access node may determine, based on service requirements (e.g., latency, packet loss rate, UE capability, priority, traffic volume, throughput, etc.) of the second wireless device (e.g., QoS requirement of at least one PDU session, at least one QoS flow, at least one bearer, and/or at least one network slice of the wireless device), the secondary access node addition/modification of the second wireless device with the first cell. The first access node may determine, based on a device type (e.g., IoT device, sensor device, delay tolerant device, URLLC device, mission critical service device, V2X device, vehicle, drone, device-to-device communication device, IAB-node, ethernet session device, mobile oriented (MO) only device, mobile initiated connection only (MICO) mode device, restricted local operator service (RLOS) device, etc.) of the second wireless device, the secondary access node addition/modification of the second wireless device with the first cell.

In an example, the first access node may further determine, based on the identifier indicating the parent cell of the first cell, the number of hops of the at least one backhaul link. The first access node may determine the secondary access node addition/modification of the second wireless device further based on the number of hops of the at least one backhaul link.

In an example, if the first cell supports/meets at least one of the service requirements of the second wireless device and/or requirements for the device type of the second wireless device and/or if the measurement results for the first cell satisfy/meets secondary access node addition/modification initiation conditions (e.g., RSRP of the first cell is larger than a power value: −11 dB), the first access node may determine to initiate the secondary access node addition/modification of the second wireless device with the first cell. In an example, if the first cell and/or the backhaul link of the first cell supports the service requirements (e.g., network slice, URLLC, IoT, beamforming, multiple BWP, etc.) of the second wireless device and/or the device type (e.g., vehicle, drone, mission critical service device, IAB-node, etc.) of the second wireless device, the first access node may decide/determine to initiate the secondary access node addition/modification of the second wireless device with the first cell. In an example, if the first cell does not supports/meets at least one of the service requirements of the second wireless device and/or requirements for the device type of the second wireless device and/or if the measurement results for the first cell does not satisfy/meets secondary access node addition/modification initiation conditions (e.g., RSRP of the first cell is larger than a power value: −11 dB), the first access node may determine not to initiate the secondary access node addition/modification of the wireless device with the first cell.

In an example, if the load/traffic load of the first cell is less than a load value (e.g., the load of the first cell: medium load and/or 40 percent<75 percent), the first access node may decide/determine to initiate the secondary access node addition/modification of the second wireless device with the first cell. In an example, if the interference of the first cell is less than a power/interference value (e.g., the interference of the first cell: medium/low interference and/or −17 dB<−15 dB), the first access node may decide/determine to initiate the secondary access node addition/modification of the second wireless device with the first cell.

In an example, if the load/traffic load of the first cell is equal to or larger than a load value (e.g., the load of the first cell: high load and/or 90 percent>75 percent), the first access node may decide/determine not to initiate the secondary access node addition/modification of the second wireless device with the first cell. In an example, if the interference of the first cell is equal to or larger than a power/interference value (e.g., the interference of the first cell: high interference and/or −12 dB>−15 dB), the first access node may decide/determine to initiate the secondary access node addition/modification of the second wireless device with the first cell.

The first access node may send, to the second access node, a request message (e.g., secondary node (S-NODE) addition request message, SgNB/SeNB addition request message, secondary node (S-NODE) modification request message, SgNB/SeNB modification request message) for the secondary access node addition and/or the secondary access node modification. The first access node may receive, from the second access node, a response message (e.g., secondary node (S-NODE) addition request acknowledge message, SgNB/SeNB addition request acknowledge message, secondary node (S-NODE) modification request acknowledge message, SgNB/SeNB modification request acknowledge message) for the request message requesting the secondary access node addition and/or the secondary access node modification. The response message may indicate acceptance of the request for the secondary access node addition and/or the secondary access node modification for the wireless device.

EXAMPLES

In an example, a first access node may receive, from a second access node, at least one configuration message comprising configuration parameters of a first cell of the second access node. The configuration parameters may comprise at least one of: an identifier indicating the first cell; and/or backhaul information of at least one backhaul link between the second access node and a third access node serving the first cell. The first access node may transmit, to the second access node, a response message for the at least one configuration message. The first access node may determine, based on the backhaul information, a handover of a wireless device to the first cell. The first access node may transmit, to the second access node, a handover request message requesting the handover to the first cell.

In an example, the backhaul information may comprise at least one of: an identifier indicating a parent cell of the first cell (e.g., and/or of the third access node); an identifier indicating a child cell of the first cell (e.g., and/or of the third access node); a node identifier (CU/DU ID, IAB ID) indicating the third access node; a node identifier indicating a parent node of the third access node; a node identifier indicating a child node of the third access node; a node identifier (gNB ID, CU ID, donor ID) indicating the second access node; a field indicating a number of hops (e.g. hierarchy level) of the at least one backhaul link; a field indicating a maximum number of hops of the at least one backhaul link; a field indicating a minimum number of hops of the at least one backhaul link; information of latency supported (guaranteed, latency class info: medium/low/high) by the first cell; information of reliability supported by the first cell; a list of services supported by the first cell; a list of network slices supported by the first cell (S-NSSAI, NSSAI, . . . ); a list of capabilities (e.g., IoT, . . . ) of the first cell; information of interference of the first cell or the backhaul link of the first cell; information of a traffic load status of the first cell or the backhaul link of the first cell; and/or the like.

In an example, the parent cell of the first cell may comprise a serving cell serving (e.g., employed by) the third access node. The parent cell of the first cell may be a parent cell of the third access node. In an example, the parent cell of the first cell may comprise at least one of: a primary cell of the third access node; and/or a secondary cell of the third access node.

In an example, the child cell of the first cell may comprise a serving cell served by an access node employing the first cell. The number of hops of the at least one backhaul link may indicate a number of (e.g. concatenate) radio links between the second access node and the third access node.

In an example, the first access node may further determine, based on the identifier indicating the parent cell of the first cell, the number of hops of the at least one backhaul link. The first access node may determine the handover of the wireless device further based on the number of hops of the at least one backhaul link.

In an example, the latency supported by the first cell may be a packet transmission latency via the at least one backhaul link. The reliability supported by the first cell may be a packet transmission reliability via the at least one backhaul link. The packet transmission reliability may comprise at least one of: a packet loss rate; a packet retransmission rate/number; a packet error rate (e.g., block error rate); and/or the like.

In an example, the at least one backhaul link may comprise one or more integrated access and backhaul nodes. The third access node may be an integrated access and backhaul node. The third access node may comprise at least one of: a base station distributed unit of at least one wireless device served by the first cell; and/or a base station of at least one wireless device served by the first cell.

In an example, the first access node may receive, from the wireless device, a measurement report comprising measurement results of the first cell, wherein the determining of the handover is further based on the measurement results of the first cell.

In an example, the measurement results of the first cell may comprise at least one of: a reference signal received power of the first cell; a reference signal received quality of the first cell; a reference signal received power of a neighboring cell of the first cell; and/or a reference signal received quality of a neighboring cell of the first cell. The at least one configuration message may further comprise second configuration parameters of a second cell of the second access node. The second configuration parameters may comprise at least one of: an identifier indicating the second cell; second backhaul information of at least one second backhaul link between the second access node and a fourth access node serving the second cell; and/or an identifier indicating a second parent cell of the second cell. The second access node may comprise at least one of: an integrated access and backhaul donor; and/or at least one integrated access and backhaul node. The second access node may comprise at least one of: a base station central unit of at least one wireless device served by the first cell; and/or a base station of at least one wireless device served by the first cell.

In an example, a core network entity may receive, from the second access node, the configuration parameters of the first cell. The core network entity may receive a handover required message requesting a second handover of a second wireless device to the first cell. The core network entity may determine, based on the configuration parameters of the first cell, whether to proceed a procedure of the second handover. The core network entity may send, to the second access node and based on the determining for the second handover, a handover request message requesting the second handover of the wireless device.

In an example, the first access node may receive, from a second wireless device, a second measurement report comprising second measurement results of the first cell. The first access node may determine, based on the configuration parameters and/or the second measurement results, a secondary access node addition and/or a secondary access node modification for the second wireless device with the second access node. The first access node may send, to the second access node, a request message for the secondary access node addition and/or the secondary access node modification.

In an example, the first access node may further send, to the second access node and in response to the at least one configuration message, a response message comprising third configuration parameters of a third cell of the first access node. The third configuration parameters may comprise at least one of: an identifier indicating the third cell; and/or third backhaul information of at least one third backhaul link between the first access node and a fifth access node serving the third cell. In an example, the at least one configuration message may comprise at least one of: an Xn setup request message; and/or a node configuration update message. In an example, the response message may comprise at least one of: an Xn setup response message; and/or a node configuration update acknowledge message. In an example, the first access node may receive, from the second access node, a handover request acknowledge message indicating acceptance of the request of the handover to the first cell.

In an example, a first access node may receive, from a second access node, at least one configuration message comprising configuration parameters of a first cell of the second access node. The configuration parameters may comprise at least one of: a first identifier indicating the first cell; and/or a second identifier indicating a parent cell of the first cell. The first access node may transmit, to the second access node, at least one response message for the at least one configuration message. The first access node may determine, based on the configuration parameters, a handover of a wireless device to the first cell. The first access node may transmit, to the second access node, a handover request message requesting the handover to the first cell. In an example, the first cell may be served by a third access node connected to the second access node via at least one backhaul link comprising one or more integrated access and backhaul nodes. The third access node may be an integrated access and backhaul node. The parent cell of the first cell may comprise a serving cell employed by the third access node.

In an example, the parent cell of the first cell may comprise at least one of: a primary cell of the third access node; and/or a secondary cell of the third access node. The first access node may determine, based on the second identifier indicating the parent cell, a number of hops of the at least one backhaul link. The first access node may determine the handover of the wireless device further based on the number of hops of the at least one backhaul link. In an example, the first access node may receive, from the wireless device, a measurement report comprising measurement results of the first cell. The determining of the handover of the wireless device may be further based on the measurement results of the first cell. The measurement results of the first cell may comprise at least one of: a reference signal received power of the first cell; a reference signal received quality of the first cell; a reference signal received power of a neighboring cell of the first cell; and/or a reference signal received quality of a neighboring cell of the first cell.

In an example, the at least one configuration message may further comprise second configuration parameters of a second cell of the second access node. The second configuration parameters may comprise at least one of: an identifier indicating the second cell; and/or an identifier indicating a second parent cell of the second cell. The second access node may comprise at least one of: an integrated access and backhaul donor; and/or at least one integrated access and backhaul node.

In an example, a core network entity may receive, from the second access node, the configuration parameters of the first cell. The core network entity may receive, a handover required message requesting a second handover of a second wireless device to the first cell. In an example, the core network entity may determine, based on the configuration parameters of the first cell, whether to proceed a procedure of the second handover. The core network entity may send, to the second access node and based on the determining for the second handover, a handover request message requesting the second handover of the wireless device.

In an example, the first access node may receive, from a second wireless device, a second measurement report comprising second measurement results of the first cell. The first access node may determine, based on the configuration parameters and the second measurement results, a secondary access node addition and/or a secondary access node modification for the second wireless device with the second access node. The first access node may send, to the second access node, a request message for the secondary access node addition and/or the secondary access node modification.

In an example, a first access node may receive, from a second access node, a configuration message comprising configuration parameters of a first cell of the second access node. The configuration parameters may comprise at least one of: an identifier indicating the first cell; and/or a number of hops (e.g., latency information (e.g., 2 ms), reliability (e.g., low/medium/high), supported service list) for a backhaul link of the first cell. The first access node may send, to the second access node, a response message for the configuration message. The first access node may determine, based on the configuration parameters, a handover of a wireless device to the first cell. The first access node may transmit, to the second access node, a handover request message requesting the handover to the first cell. The backhaul link may comprise one or more integrated access and backhaul nodes.

In an example, the first access node may receive, from the wireless device, a measurement report comprising measurement results of the first cell. The determining of the handover may be further based on the measurement results of the first cell. The second access node may comprise at least one of: an integrated access and backhaul donor; and/or at least one integrated access and backhaul node. In an example, the first access node may receive, from a second wireless device, a measurement report comprising measurement results of the first cell. The first access node may determine, based on the configuration parameters, a secondary base station addition and/or a secondary base station modification for the second wireless device with the second access node. The first access node may transmit, to the second access node, a request message for the secondary base station addition and/or the secondary base station modification.

In an example, a first access node may receive, from a second access node, configuration parameters of a first cell of the second access node. The configuration parameters may comprise at least one of: a first identifier indicating the first cell; and/or a second identifier indicating a parent cell of the first cell. The first access node may send, to the second access node, a response message for the configuration message. The first access node may determine, based on the configuration parameters, a handover of a wireless device to the first cell. The first access node may transmit, to the second access node, a handover request message requesting the handover to the first cell. The first access node may receive the configuration parameters from the second access node via a core network entity.

In an example, a first access node may receive, from a second access node, configuration parameters of a first cell of the second access node. The configuration parameters may comprise at least one of: a first identifier indicating the first cell; and/or backhaul information of at least one backhaul link between the second access node and a third access node serving the first cell. The first access node may transmit, to the second access node, a response message for the configuration message. The first access node may determine, based on the backhaul information, a handover of a wireless device to the first cell. The first access node may send, to the second access node, a handover request message requesting the handover to the first cell.

In an example, a first access node may receive, from a second access node, at least one message comprising configuration parameters of a first cell of a third access node. The third access node may be a child node associated with the second access node. The third access node may communicate with the second access node via at least one backhaul link. The configuration parameters may comprise an identifier indicating the first cell and backhaul information of the at least one backhaul link. The first access node may determine, based on the backhaul information, a handover of a wireless device to the first cell. The first access node may transmit, to the second access node, a message requesting the handover of the wireless device to the first cell.

In an example, the backhaul information may comprise at least one of: an identifier indicating a parent cell of the first cell; an identifier indicating a child cell of the first cell; a node identifier indicating the third access node; a node identifier indicating a parent node of the third access node; a node identifier indicating a child node of the third access node; a node identifier indicating the second access node; a field indicating a number of hops of the at least one backhaul link; information of supported latency of the first cell; information of supported reliability of the first cell; a list of services supported by the first cell; a list of network slices supported by the first cell; a list of wireless device types supported by the first cell; information of interferences that the at least one backhaul link suffers from; and/or information of traffic load of the at least one backhaul link.

In an example, the parent cell of the first cell may comprise at least one of: a parent cell of the third access node; a serving cell serving the third access node; a primary cell of the third access node; and/or a secondary cell of the third access node. In an example, the child cell of the first cell may comprise a serving cell served by an access node using the first cell. In an example, the number of hops of the at least one backhaul link may comprise at least one of: a number of concatenate radio links between the second access node and the third access node; a number of integrated access and backhaul nodes between the second access node and the third access node; and/or a number of access nodes between the second access node and the third access node.

In an example, the supported latency of the first cell may be a packet transmission latency over the at least one backhaul link. In an example, the supported reliability of the first cell may be a packet transmission reliability over the at least one backhaul link. The packet transmission reliability may comprise at least one of: a packet loss rate; a packet retransmission rate; a packet error rate; and/or a block error rate. In an example, the at least one backhaul link may comprise at least one of: one or more integrated access and backhaul nodes; and/or one or more radio links.

In an example, the second access node may comprise at least one of: an integrated access and backhaul donor; at least one integrated access and backhaul node; a base station central unit of at least one wireless device using the first cell; and/or a base station of at least one wireless device using the first cell. In an example, the third access node may comprise at least one of: an integrated access and backhaul node; a base station distributed unit of at least one wireless device using the first cell; and/or a base station of at least one wireless device using the first cell.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A second access node comprising:
one or more processors; and
memory storing instructions that, when executed by the one or more processors, cause the second access node to:
send, to a first access node, at least one message comprising:
an identifier indicating a first cell of a third access node, wherein the second access node communicates with the third access node via a parent node of the third access node; and
at least one parameter indicating that a second cell is of the parent node of the third access node, wherein the at least one parameter comprises an identifier indicating the second cell; and
receive, from the first access node, a message requesting a handover of a wireless device to the first cell.

2. The second access node of claim 1, wherein the instructions further cause the second access node to receive, from the first access node, an acknowledgement message in response to the at least one message.

3. The second access node of claim 1, wherein the message requesting the handover of the wireless device to the first cell further comprises at least one of:
a cell global identifier (CGI) of the first cell; or
an identifier of the wireless device.

4. The second access node of claim 1, wherein the at least one message is sent via at least one of:
one or more F1 interfaces;
an Xn interface;
an X2 interface;
one or more N2 interfaces; or
one or more S1 interfaces.

5. The second access node of claim 1, wherein the at least one message further comprises at least one of:
time division duplex (TDD) configuration information of the first cell; or
frequency division duplex (FDD) configuration information of the first cell.

6. The second access node of claim 1, wherein the identifier indicating the second cell further comprises a CGI.

7. The second access node of claim 1, wherein the at least one message further comprises at least one second parameter indicating a child node of the third access node.

8. A first access node comprising:
one or more processors; and
memory storing instructions that, when executed by the one or more processors, cause the first access node to:
receive, from a second access node, at least one message comprising:
an identifier indicating a first cell of a third access node, wherein the second access node communicates with the third access node via a parent node of the third access node; and
at least one parameter indicating that a second cell is of the parent node of the third access node, wherein the at least one parameter comprises an identifier indicating the second cell; and
send, to the second access node, a message requesting a handover of a wireless device to the first cell.

9. The first access node of claim 8, wherein the instructions further cause the first access node to send, to the second access node, an acknowledgement message in response to the at least one message.

10. The first access node of claim 8, wherein the message requesting the handover of the wireless device to the first cell further comprises at least one of:
a cell global identifier (CGI) of the first cell; or
an identifier of the wireless device.

11. The first access node of claim 8, wherein the at least one message is received via at least one of:
one or more F1 interfaces;
an Xn interface;
an X2 interface;
one or more N2 interfaces; or
one or more S1 interfaces.

12. The first access node of claim 8, wherein the at least one message further comprises at least one of:
time division duplex (TDD) configuration information of the first cell; or
frequency division duplex (FDD) configuration information of the first cell.

13. The first access node of claim 8, wherein the identifier indicating the second cell further comprises a CGI.

14. The first access node of claim 8, wherein the at least one message further comprises at least one second parameter indicating a child node of the third access node.

15. A non-transitory computer-readable medium comprising instructions that, when executed by one or more processors of a second access node, cause the second access node to:
send, to a first access node, at least one message comprising:
an identifier indicating a first cell of a third access node, wherein the second access node communicates with the third access node via a parent node of the third access node; and
at least one parameter indicating that a second cell is of the parent node of the third access node, wherein the at least one parameter comprises an identifier indicating the second cell; and
receive, from the first access node, a message requesting a handover of a wireless device to the first cell.

16. The non-transitory computer-readable medium of claim 15, wherein the instructions further cause the second access node to receive, from the first access node, an acknowledgement message in response to the at least one message.

17. The non-transitory computer-readable medium of claim 15, wherein the message requesting the handover of the wireless device to the first cell further comprises at least one of:
a cell global identifier (CGI) of the first cell; or
an identifier of the wireless device.

18. The non-transitory computer-readable medium of claim 15, wherein the at least one message is sent via at least one of:

one or more F1 interfaces;
an Xn interface;
an X2 interface;
one or more N2 interfaces; or
one or more S1 interfaces.

19. The non-transitory computer-readable medium of claim 15, wherein the at least one message further comprises at least one of:
 time division duplex (TDD) configuration information of the first cell; or
 frequency division duplex (FDD) configuration information of the first cell.

20. The non-transitory computer-readable medium of claim 15, wherein the at least one message further comprises at least one second parameter indicating a child node of the third access node.

\* \* \* \* \*